United States Patent [19]
Kakumu et al.

[11] Patent Number: 5,996,660
[45] Date of Patent: Dec. 7, 1999

[54] PNEUMATIC TIRE INCLUDING PITCH SEQUENCE

[75] Inventors: Kiichiro Kakumu; Chieko Aoki, both of Kobe, Japan

[73] Assignee: Sumitomo Rubber Industries, Ltd., Hyogo-ken, Japan

[21] Appl. No.: 08/632,446

[22] PCT Filed: Aug. 14, 1995

[86] PCT No.: PCT/JP95/01631

§ 371 Date: Apr. 18, 1996

§ 102(e) Date: Apr. 18, 1996

[87] PCT Pub. No.: WO96/05973

PCT Pub. Date: Feb. 29, 1996

[30] Foreign Application Priority Data

Aug. 18, 1994 [JP] Japan .................................. 6-218099
Aug. 26, 1994 [JP] Japan .................................. 6-225649

[51] Int. Cl.⁶ .......................... B60C 11/03; B60C 113/00
[52] U.S. Cl. ........................................................ 152/209 R
[58] Field of Search ............................. 152/209 R, 209 D

[56] References Cited

U.S. PATENT DOCUMENTS

| | | | |
|---|---|---|---|
| 1,956,011 | 4/1934 | Evans | 152/209 R |
| 2,124,821 | 7/1938 | Hubach | 152/209 R |
| 2,878,852 | 3/1959 | Lippmann et al. | 152/209 R |
| 4,178,199 | 12/1979 | Lippman et al. | 152/209 R |
| 4,442,499 | 4/1984 | Sekula et al. | 152/209 R |
| 4,474,223 | 10/1984 | Landers | 152/209 R |
| 5,371,685 | 12/1994 | Bandel et al. | 152/209 R |

FOREIGN PATENT DOCUMENTS

| | | | |
|---|---|---|---|
| 268436 | 5/1988 | European Pat. Off. | 152/209 R |
| 20402 | 3/1975 | Japan . | |
| 8904 | 1/1980 | Japan . | |
| 114706 | 7/1982 | Japan . | |
| 60011 | 4/1985 | Japan | 152/209 R |
| 86814 | 3/1992 | Japan . | |
| 221937 | 8/1992 | Japan . | |
| 335730 | 11/1992 | Japan . | |
| 363234 | 12/1992 | Japan . | |
| 44294 | 2/1994 | Japan . | |

OTHER PUBLICATIONS

Title for Japan 54–115801.

*Primary Examiner*—Steven D. Maki
*Attorney, Agent, or Firm*—Birch, Stewart, Kolasch & Birch, LLP

[57] ABSTRACT

A tread pattern of tire tread is formed by an alignment (sequence) of pattern composing units of s types different in pitch P that is a circumferential length. The pattern composing units are allocated to sections of the axes of abscissa and ordinate from the origin in the order of lower pitch P. Out of all regions present in a certain section of the axis of abscissa and aligned in the longitudinal direction, a defined region defining a chaotic function is determined for respective sections of abscissa. The chaotic function is represented by $X(n+1)=fc(Xn)$, where $Xn$ is the axis of abscissa, and $X(n+1)$ the axis of ordinate. An alignment of pattern composing units is obtained according to a sequence of numbers sequentially obtained by the chaotic function. The alignment of pattern composing units is further verified before employment. In such manner, discomfort due to noises caused by a tire during a travel is reduced.

9 Claims, 42 Drawing Sheets

FIG. 1(a)
FIG. 1(b)
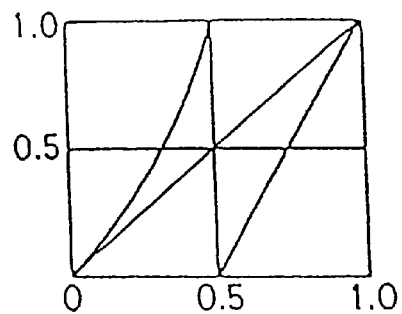
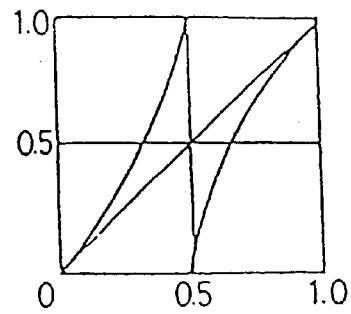
FIG. 2
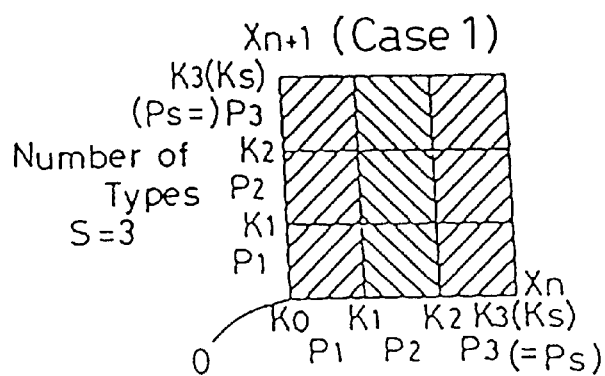

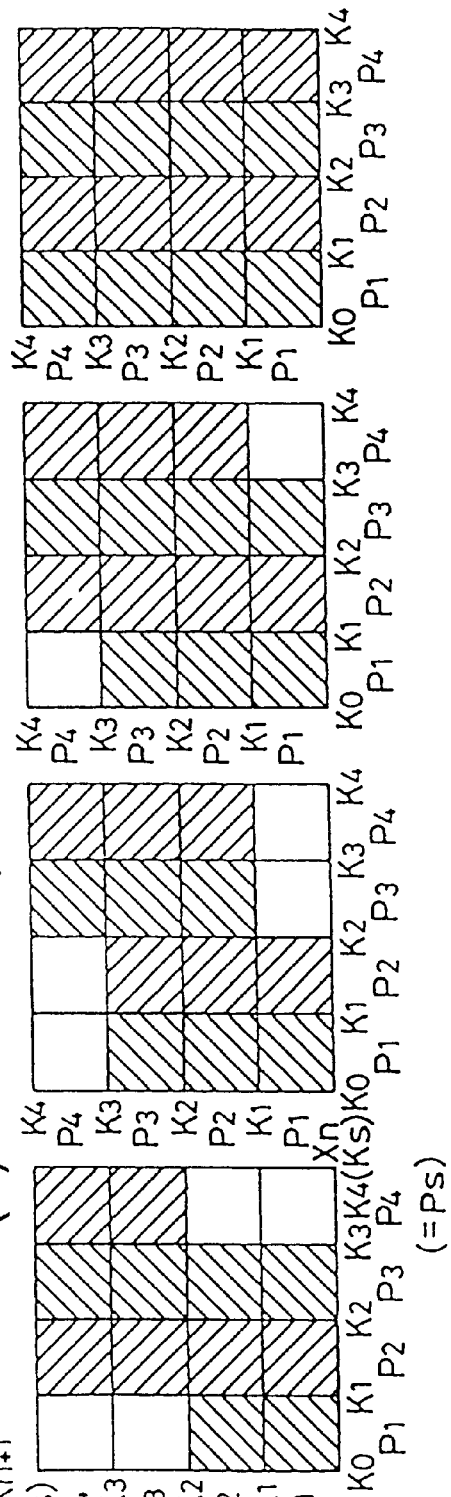

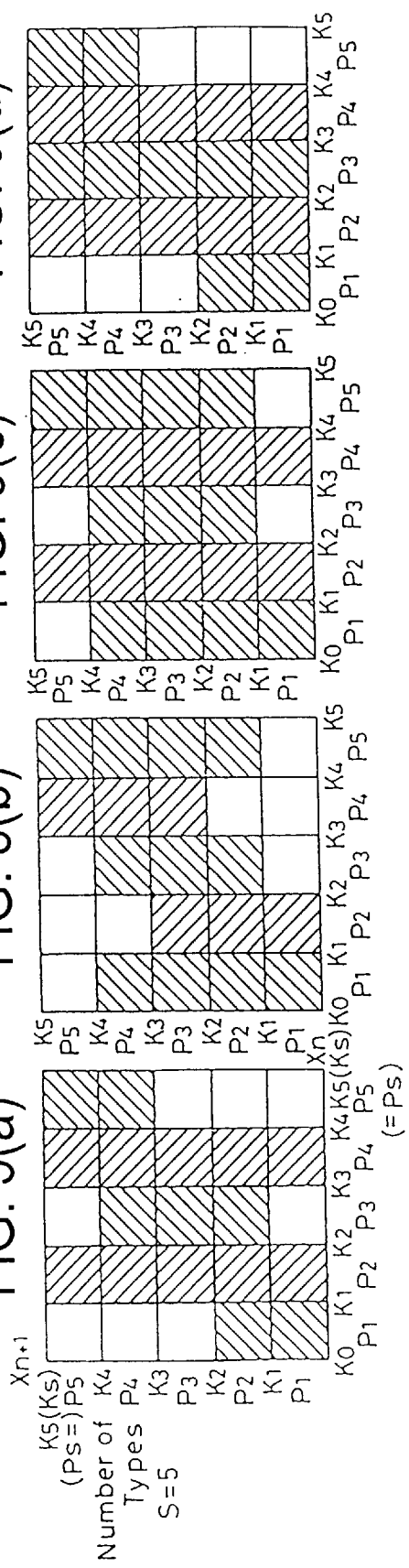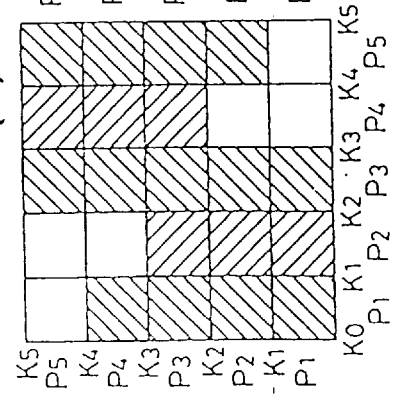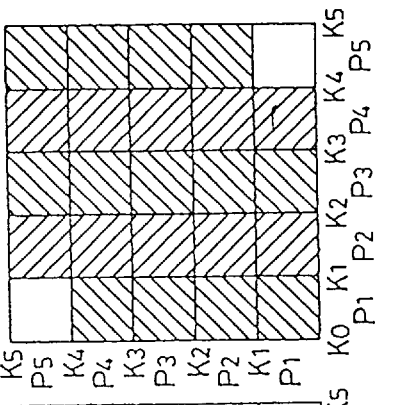
FIG. 5(a) FIG. 5(b) FIG. 5(c) FIG. 5(d) FIG. 5(e) FIG. 5(f) FIG. 5(g)

(Number of pattern composing units of single shortest pitch + number of pattern composing units of single longest pitch) / (number of pattern composing units of shortest pitch + number of pattern composing units of longest pitch)

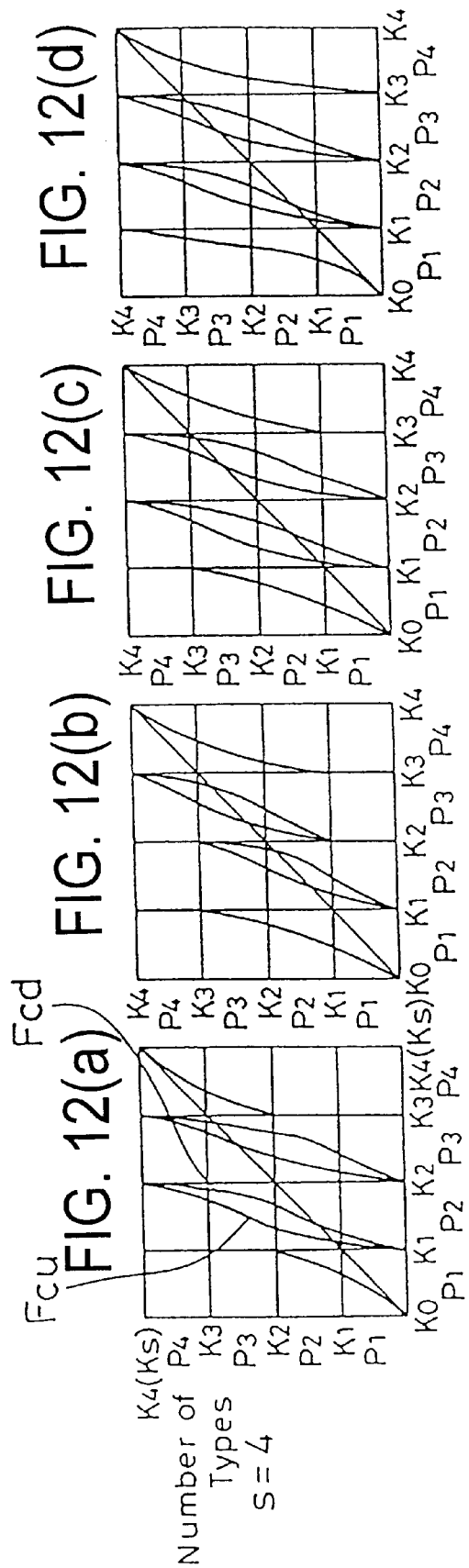

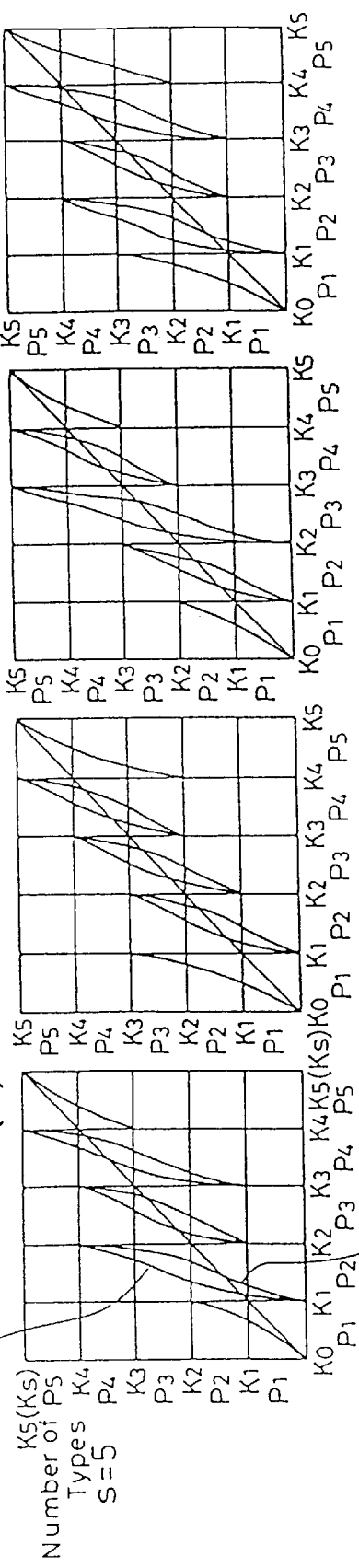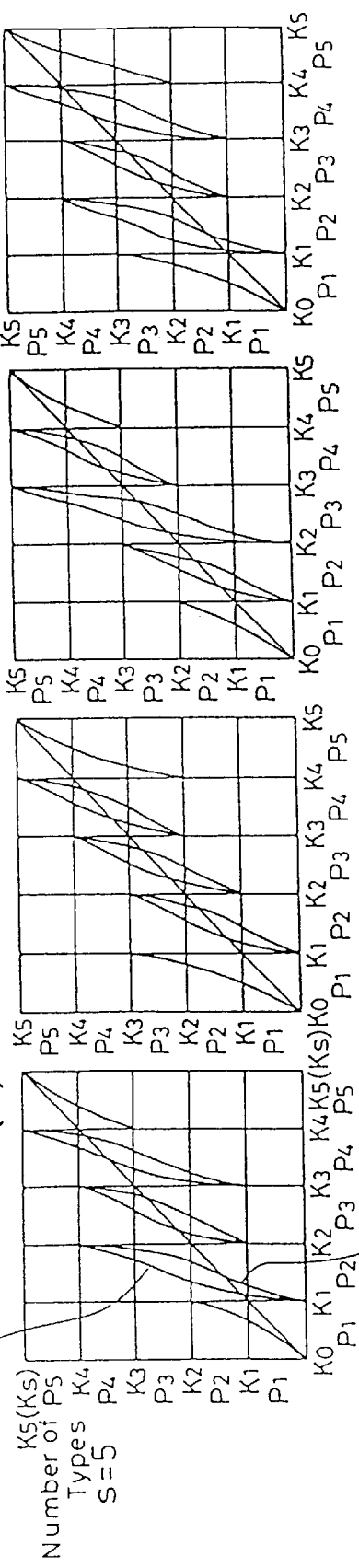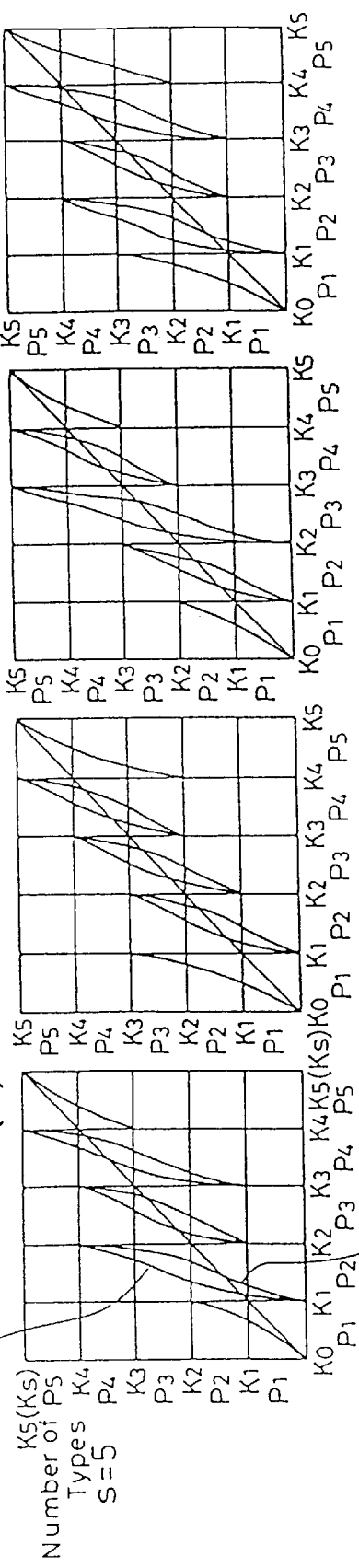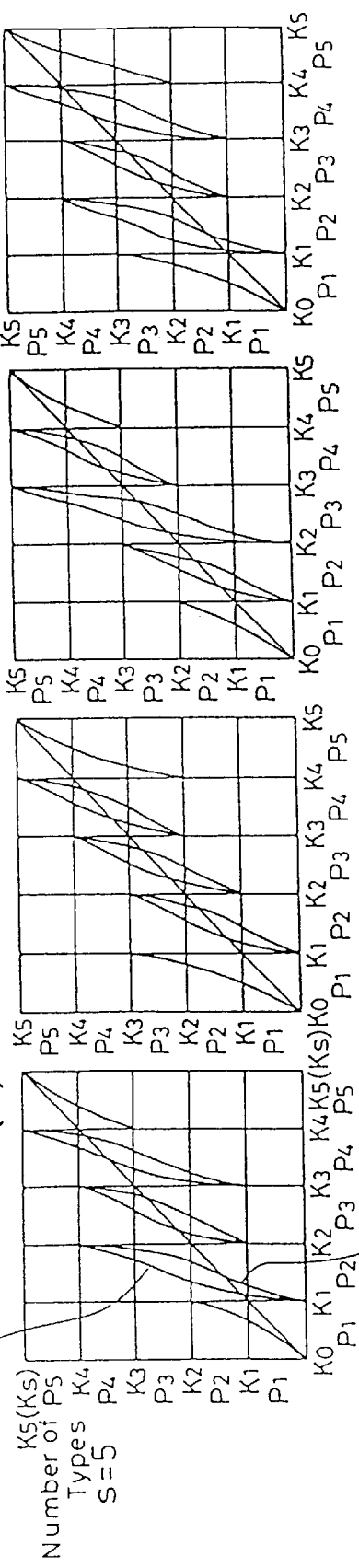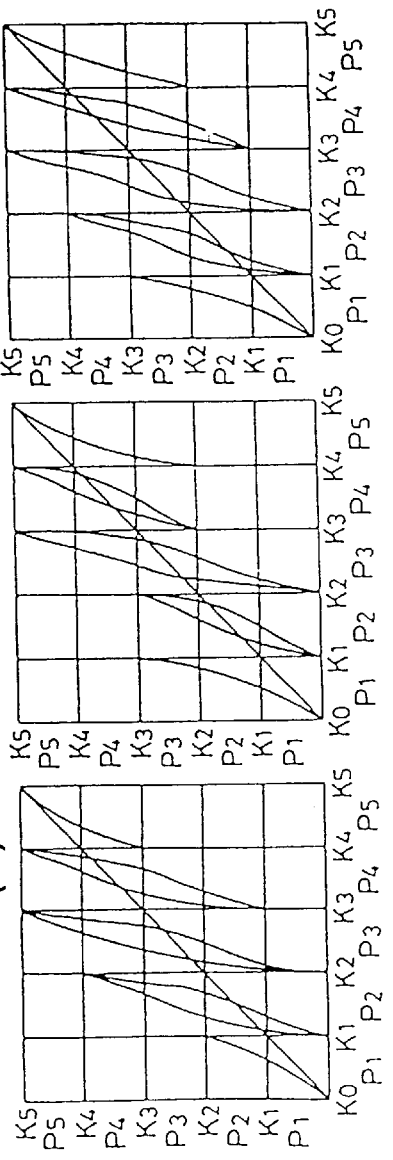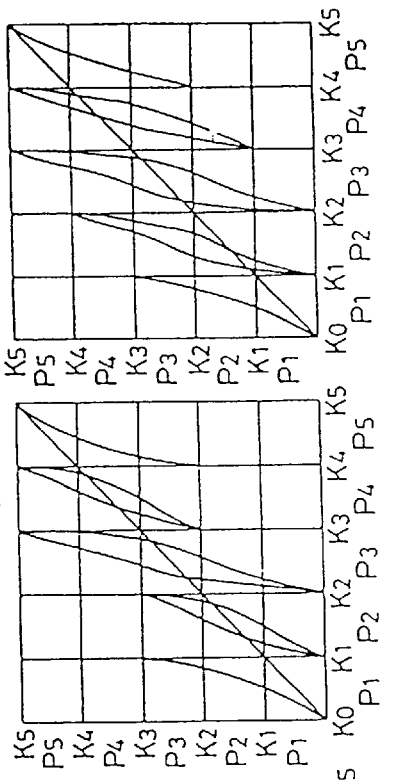

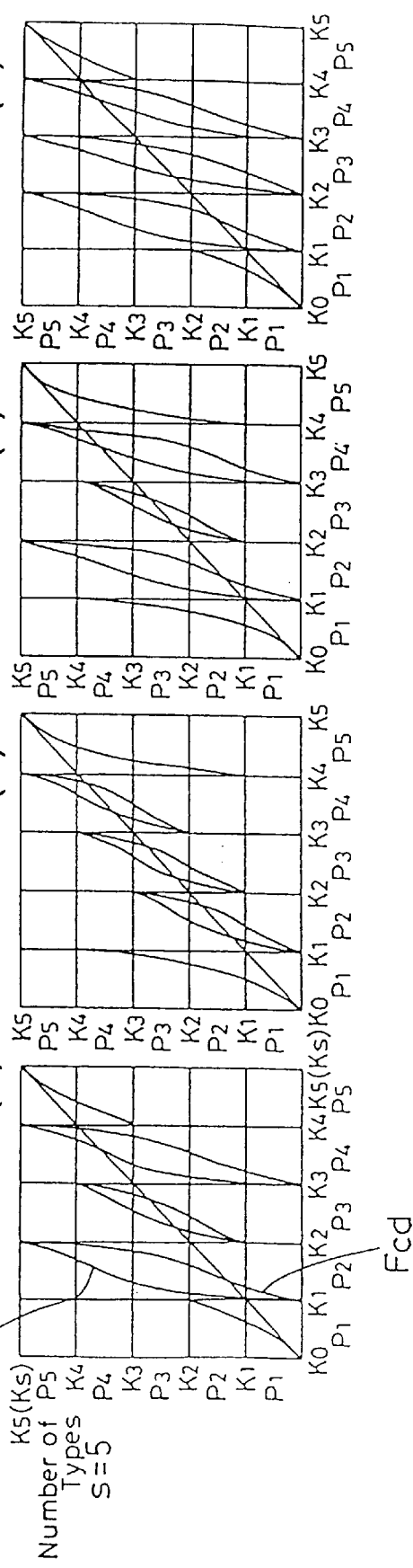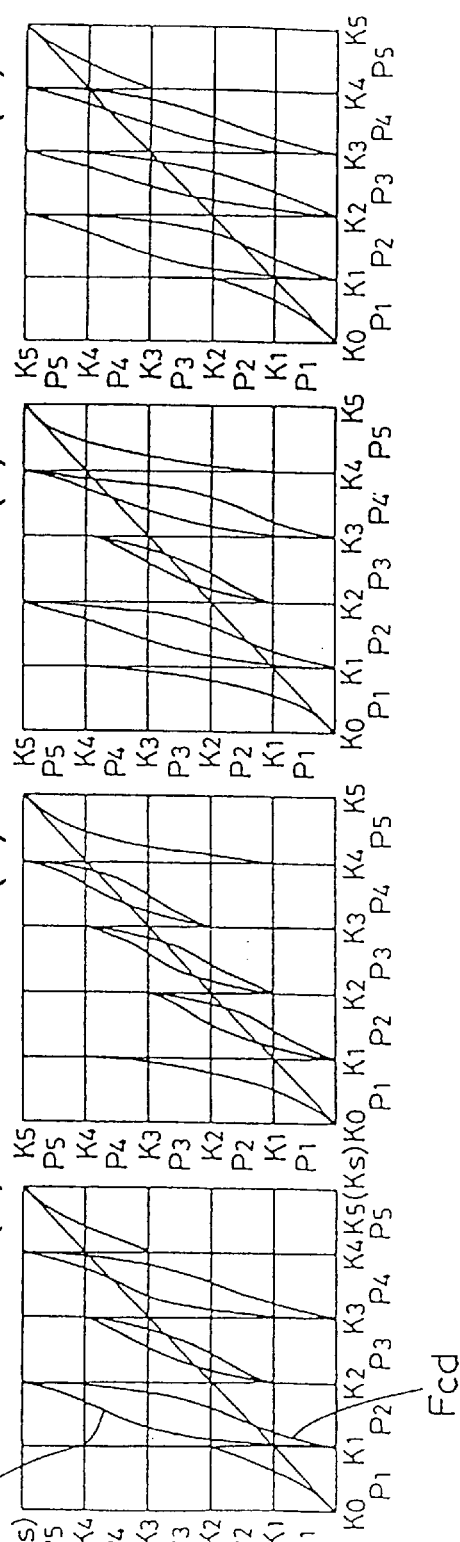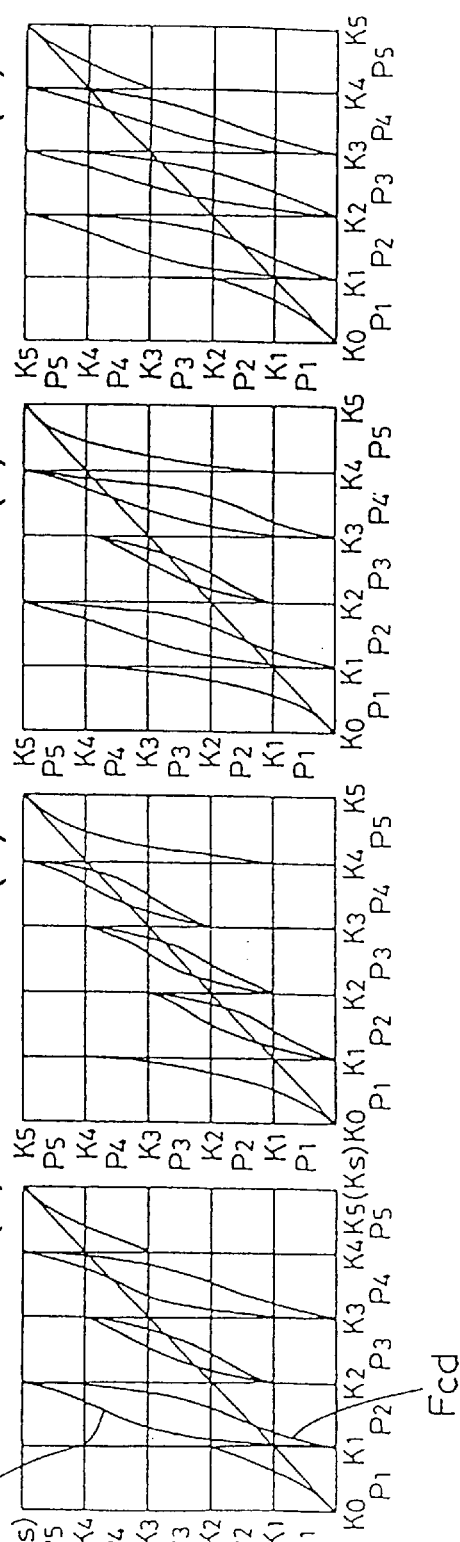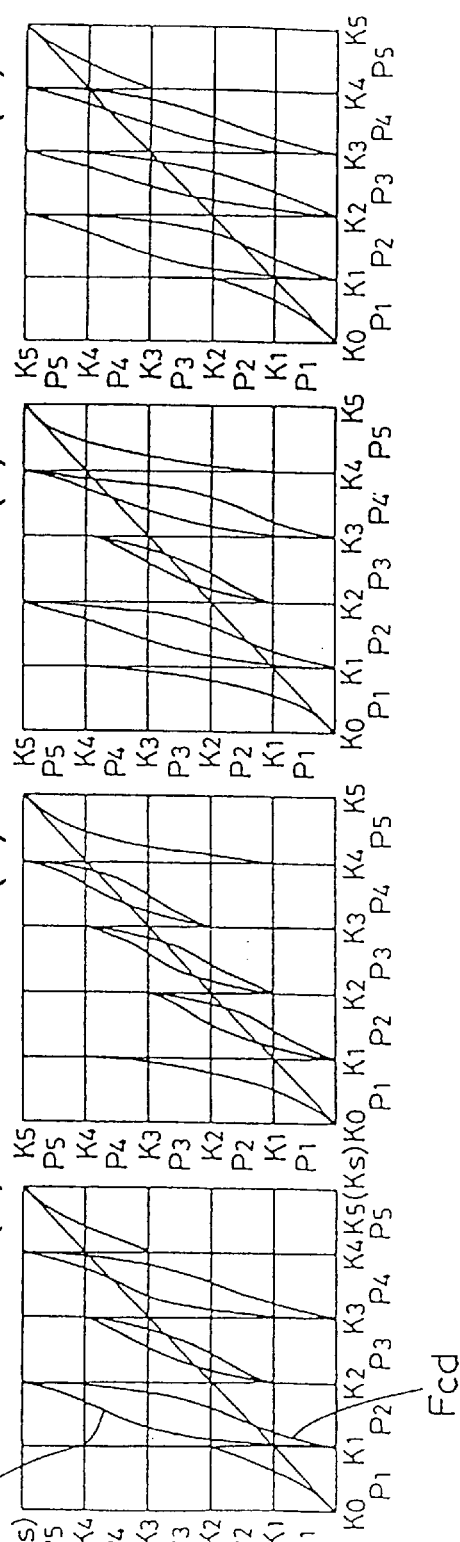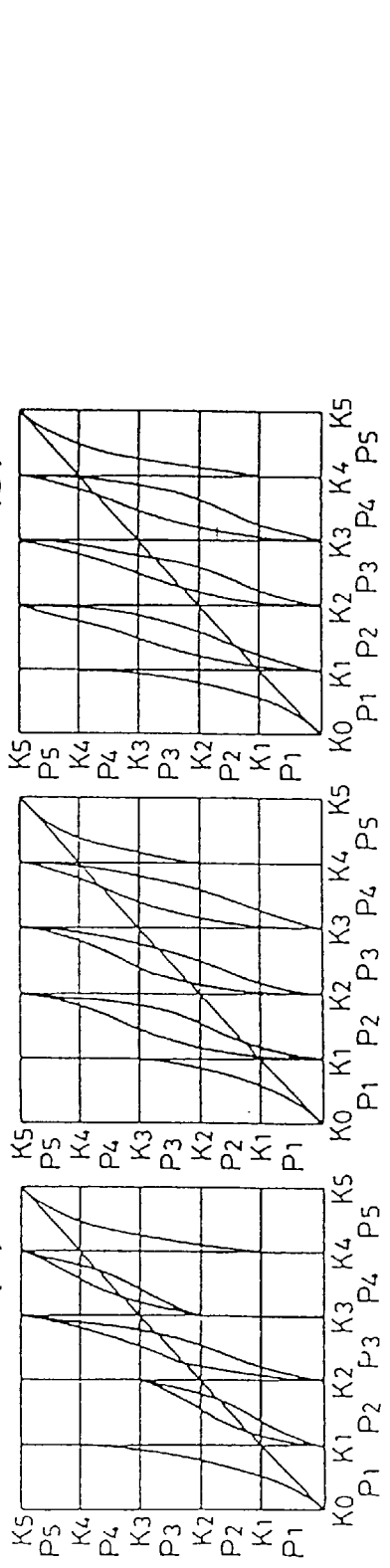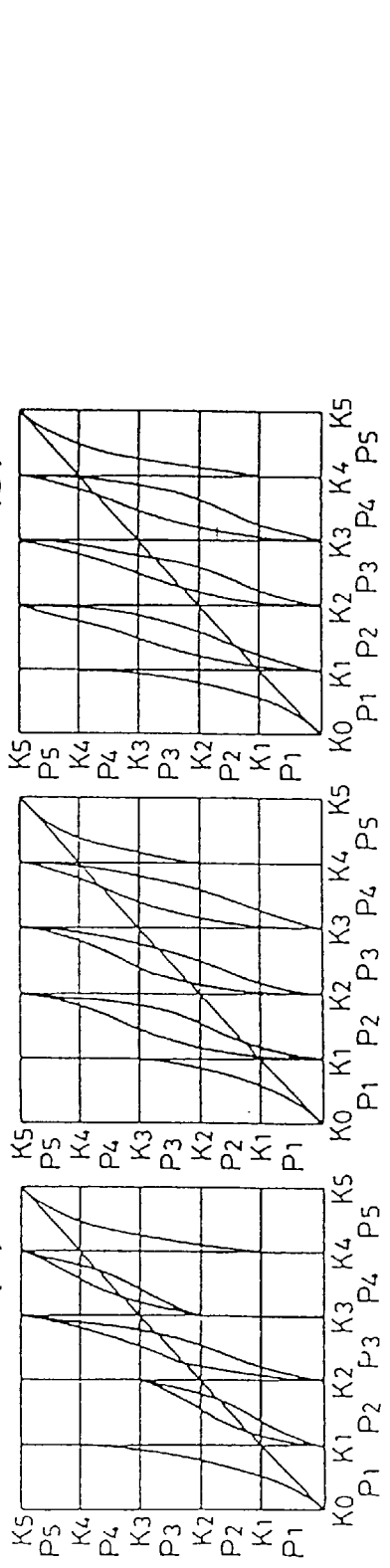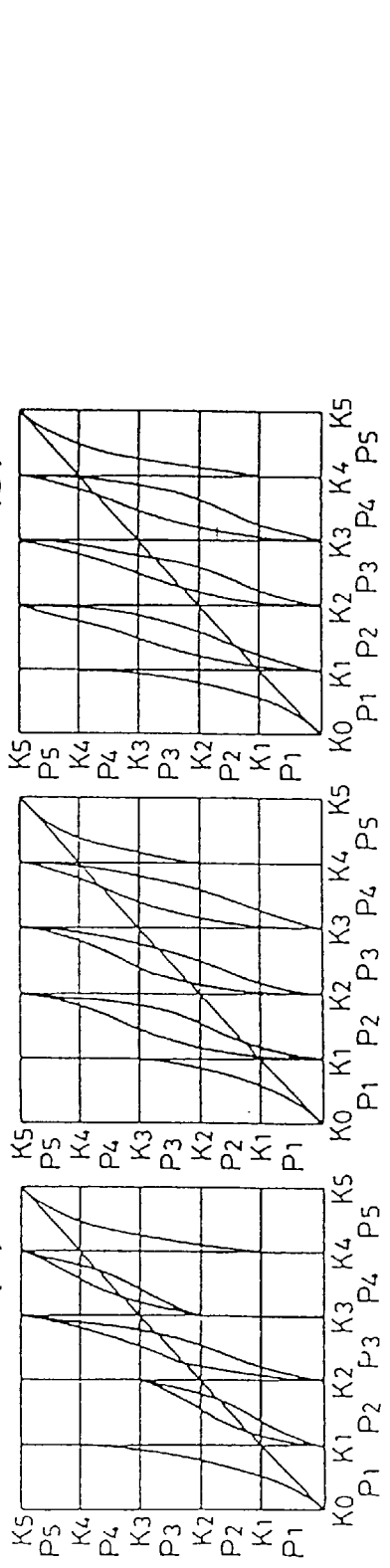

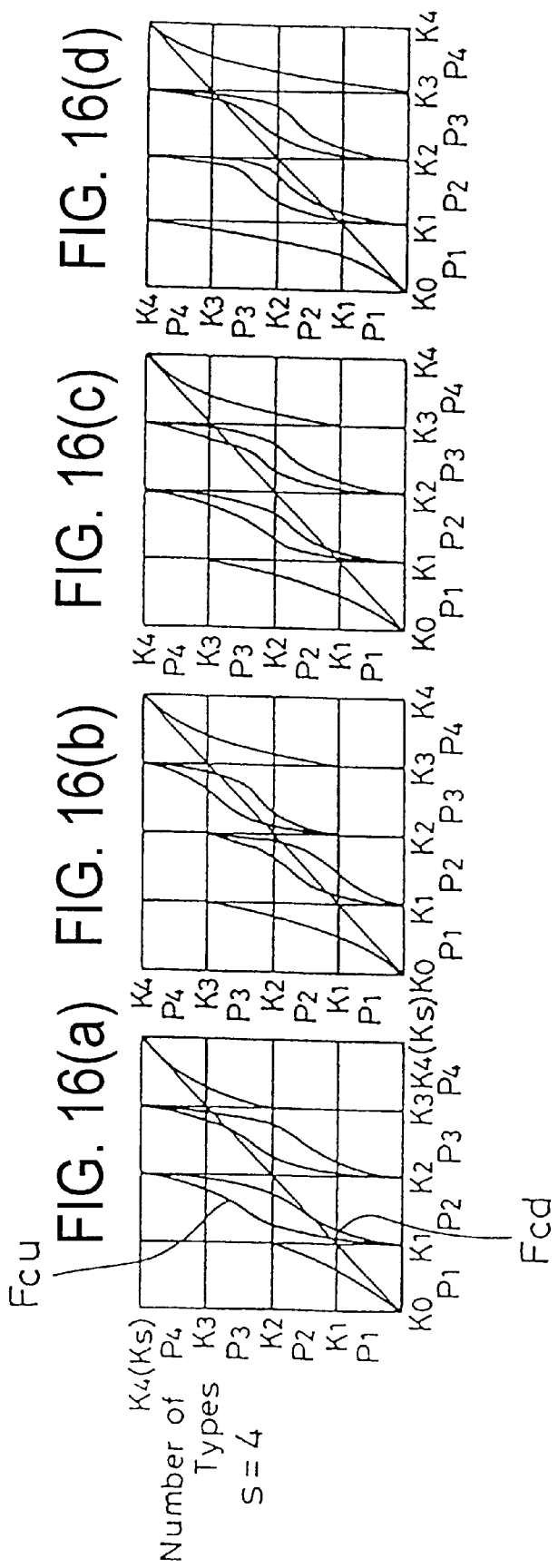

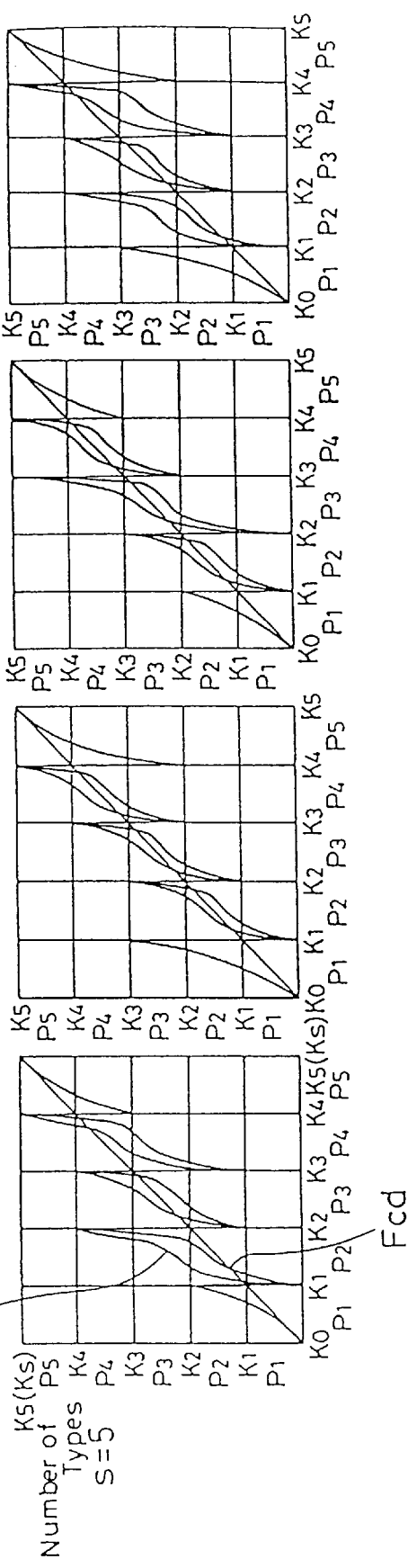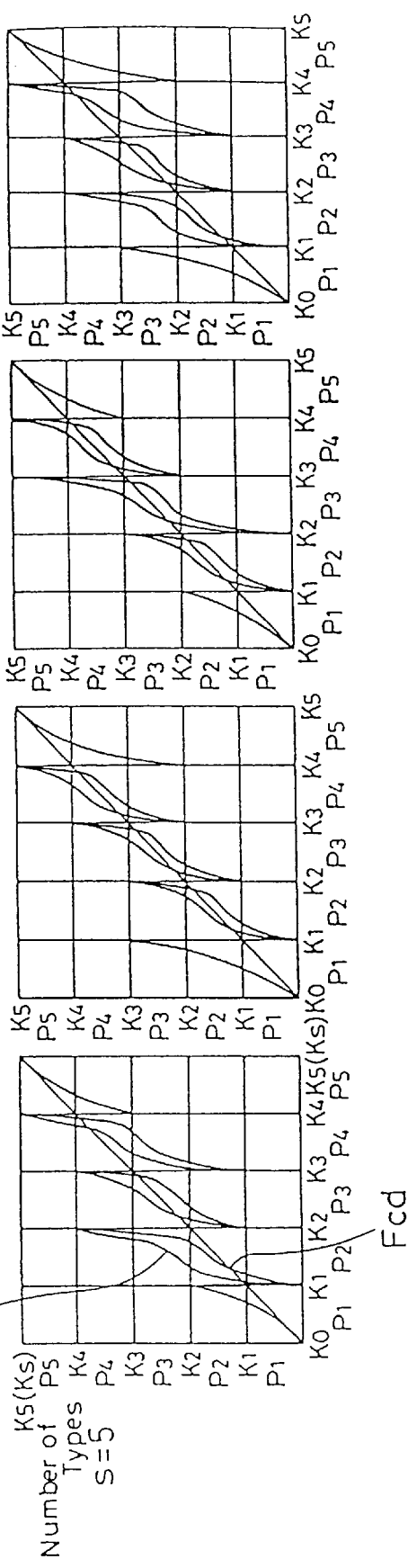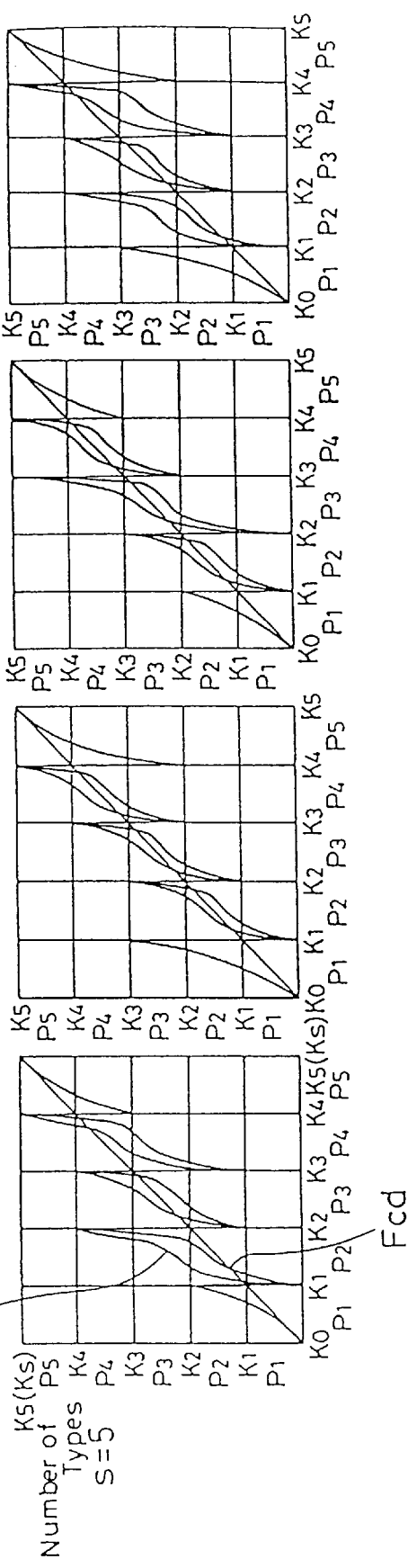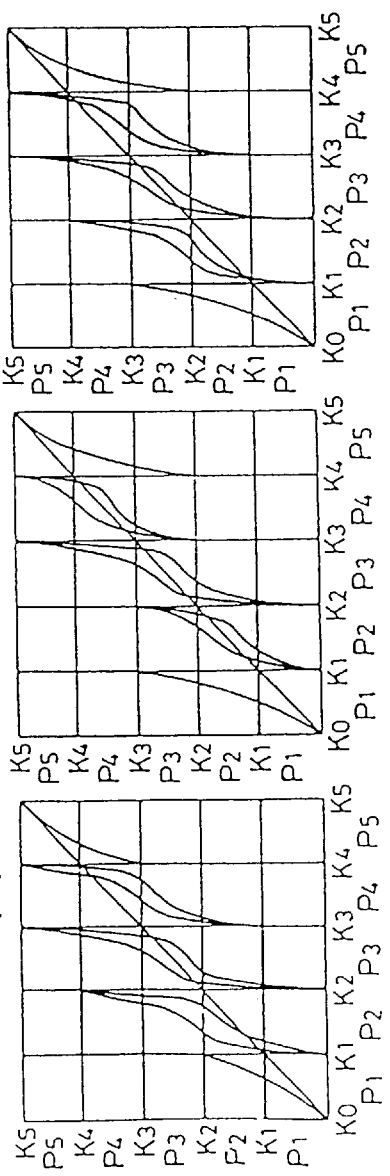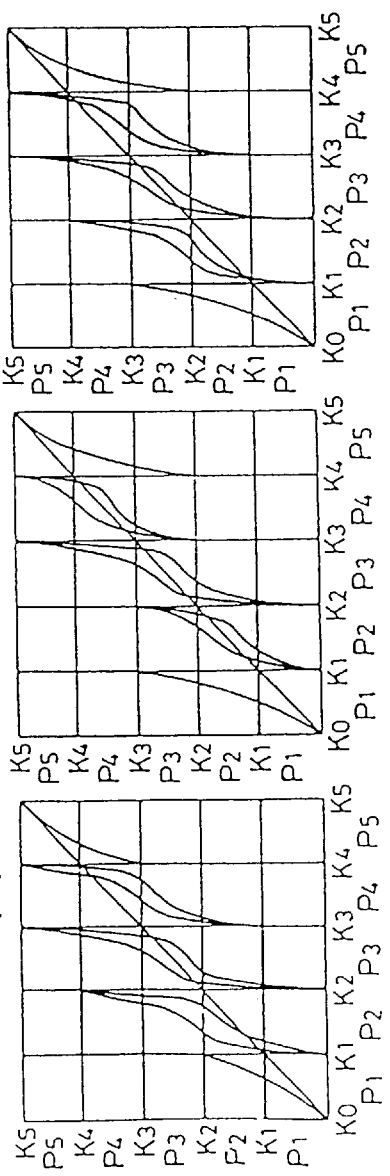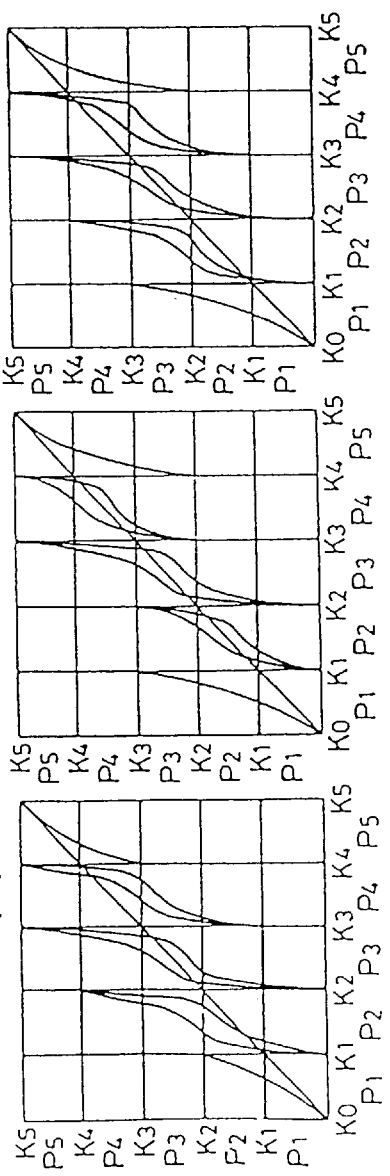

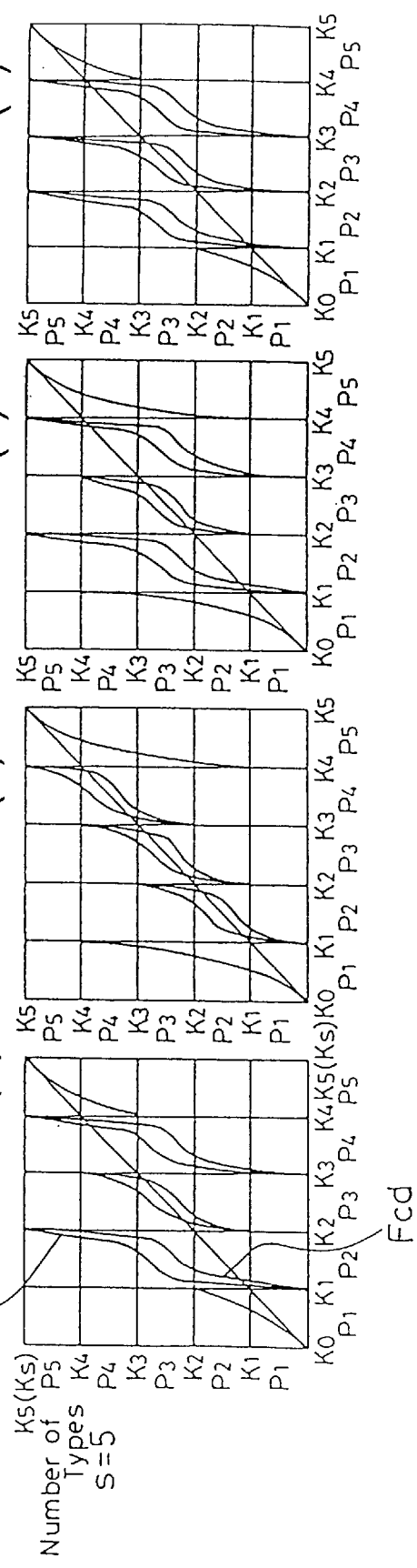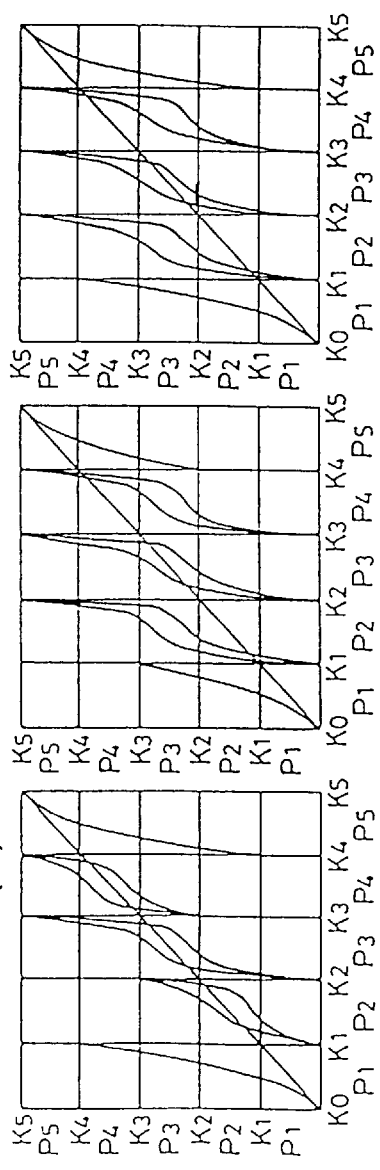
FIG. 18(a) – FIG. 18(g)

FIG. 34

| Satisfy conditions | Not satisfy conditions |
|---|---|
| Chaos function<br><br>P1 region<br>$f'c(Xe) > f'c(Xc)$<br><br>P2 region<br>$f'c(Xc) > f'c(Xe)$ | Chaos function<br><br>P1 region<br>$f'c(Xe) < f'c(Xc)$<br><br>P2 region<br>$f'c(Xc) < f'c(Xe)$ |
| Sequence of pitches | Sequence of pitches |
| Functional evaluation: 3.0 | Functional evaluation: 2.0 |

PNEUMATIC TIRE INCLUDING PITCH SEQUENCE

TECHNICAL FIELD

The present invention relates to a pneumatic tire capable of reducing discomfort due to noises on traveling by establishing an alignment (sequence) of pattern composing units in a tire tread according to a sequence of numbers obtained by a chaotic function.

BACKGROUND OF THE INVENTION

Various tread patterns are employed in a tire tread according to conditions of a vehicle and road surface. For a tread pattern, block, rib, lug and other patterns comprising units of a certain pattern, that is, pattern composing units repetitively provided in the circumferential direction of tire, are often used by circumferentially forming grooves in the direction of tire's axis with a spacing between them, or providing rib grooves circumferentially staggered.

In a tire with such patterns repetitively provided, a noise is repetitively produced between the tire and a road surface, because the pattern composing units in an alignment (sequence) come in contact with the road surface sequentially as the tire travels. The noise produced by the pattern composing units (hereinafter referred to as pitch noise) is generally uncomfortable, and improvement of the noise is desired.

In order to improve the noise, the so-called pitch variation method has been conventionally employed for dispersing the noise in a wide frequency band, and changing it to a white noise by arranging pattern composing units different in pitch or length in the circumferential direction of tire.

For changing it to a white noise, a lot of suggestions have been made, and provision of pitches of a periodic sequence in a manner of sinusoidal function is suggested, for example, in Japanese Patent Publication Nos. 58-2844 (Japanese Laid-open Patent Nos. 55-8904) and 3-23366 (54-115801). It is also suggested to provide a random sequence of pitches of pattern composing units as described in Japanese Patent Publication No. 62-41122 (57-114706).

It is suggested to provide s sequence of two pitches of two pattern composing units (the number s=2) as described in Japanese Patent Publication Nos. 51-41723 (Japanese Laid-open Patent No. 50-20402) and Japanese Laid-open Patent No. 4-363234.

SUMMARY OF THE INVENTION

The former suggestion of providing pitches of a periodic sequence in a manner of sinusoidal function still provides such advantage that a variation of rigidity between adjacent pattern composing units is low, and abnormal wear is reduced, because the pitches are continuously and periodically changed. However, the variation of rigidity between the pattern composing units is periodically changed in correspondence with change in pitch. Therefore, a force variation (RFV) in the radial direction of a specific degree component that is consistent with a periodicity is increased, an abnormal vibration is produced, and the uncomfortable noise may be increased.

In the case of providing a random sequence of pitches of pattern composing units, no periodic regularity is obtained, contrarily to the periodic sequence. Thus, the specific degree component of force variation is never increased, and an abnormal vibration and noise are rarely produced. However, since a difference between pitches of adjacent pattern composing units are relatively high, it is a problem that an abnormal wear is often caused.

It is also proved that the number s of types of pitch length of the pattern composing units should be preferably three or more, because an effect of pitch variation is insufficient, and the noise cannot be sufficiently changed to a white noise, if it is two.

On the other hand, it is relatively easy for manufacturers to increase the number s of types itself owing to recent advance in manufacture of molds. However, it is not clearly proved that the noise can be reduced by increasing the number s of types, and a new method is demanded.

For reducing the noise of tire, on the basis of providing pattern composing units, the inventors found through various developments that:

(1) properties required for an arrangement of pattern composing units are
   irregularity; and
   continuity of pitch variation; and
   not easily occurring the similar arrangement;
(2) properties eliminated from an arrangement of pattern composing units are
   periodicity.

As a result of studies and developments conducted for determining an alignment of pattern composing units having such properties, the inventors focused on characteristics of a chaos function.

A chaos refers to "such phenomenon as turbulence and rhythm in the ecosystem that is apparently disorderly and unpredictable, present everywhere in the nature, and is created by a decision theoretic equation". The chaos theory is a rule behind a complicated chaotic phenomenon or finding out the rule. The chaos function is a function generating a chaotic signal.

In connection with the chaos or chaos function, an apparatus for generating a chaos is suggested in Japanese Laid-open Patent Nos. 4-86814 and 4-221937, a random encipherment communication system using a chaos equation in Japanese Laid-open Patent No. 4-335730, and an apparatus for generating a disturbance signal very similar to a practical phenomenon by using a chaos function in Japanese Laid-open Patent No. 6-44294.

A chaos function expressed by Formula 1 below is shown as an example in "Trend for practical use and application to commercial instruments of the chaos theory" prepared for presentation in Osaka on Jul. 16, 1993 by Information and Communication System Research Center, Sanyo Electric Co., Ltd., p. 38 of pp 35 to 48, "General system research No. 169", General System Research Center. A figure obtained by Formula 1 in Table (formulae) is shown in FIG. 1 (a). The chaos function is hereinafter referred to by a representation of $X(n+1)=fc(Xn)$.

As an example of other chaos function, one shown in Formula 2 in Table (formulae) is known (shown in FIG. 1 (b)).

In this specification, if no confusion can be caused even when n, i and the like are variables, parentheses before and after a variable may be eliminated for simplifying formulae.

Such a chaos function as represented by Formulae 1 and 2 has characteristics (a),(b),(c).

(a) tendency to show a continuous change between values close to each other.
(b) values remote from each other are without correlation.
(c) values are progressively separated from each other as the time elapses, even if initial values are very close to each other.

In order to reduce the tire noise, it is required that an arrangement of pattern composing units has characteristics of "irregularity" and "continuity of pitch variation" as described above. Periodicity must be eliminated that "periodicity".

"A continuous change between values close to each other" in a chaos function corresponds to the "continuity of pitch length variation" in an arrangement of pattern composing units. Additionally, "no relation between values remote from each other" in a chaos function corresponds to the "irregularity (no periodicity)" in an arrangement of pattern composing units. "A progressively separating from each other as the time elapses, even if initial values are very close to each other" corresponds to the "not occurring the similar arrangement" in an arrangement of pattern composing units.

Thus, it was expected to determine an alignment (sequence) of pattern composing units for reducing tire noise by employing a fundamental concept of chaos function.

A chaos function further has such third characteristic that "values are progressively separated from each other, even if initial values are very close to each other". In an arrangement of pattern composing units, such characteristic also serves for preventing repetition in an arrangement of pattern composing units. From such point of view, it is considered that a peak noise uncomfortable to ears can be reduced by dispersing the pitch noise, and changing it to a white noise through determination of an arrangement of pattern composing units according to a chaos function.

However, it is not preferable to use the chaos functions represented by Formulae 1 and 2 as they are in determining an arrangement of pattern composing units. For example, the chaos function of Formula 1 is present only in a form of two curves and a straight line defined separately in two sections of 0 to 0.5 and 0.5 to 1.0 of the axis of abscissa, respectively, as shown in FIGS. 1 (a), (b). Therefore, although it can be used for the number of pitch types of two, when three types or more are present, it is required to divide 0 to 1 for three types or more. Then, because only a curve and a straight line are present for each case, a sequence of numbers obtained by the chaos function or an arrangement of pattern composing units obtained by converting the sequence of numbers cannot be very suitable for reducing the noise of tire.

Accordingly, it is an object of the invention to provide a pneumatic tire capable of reducing noise by provision of an alignment of pattern composing units using a chaotic function.

The invention was achieved by an idea of reducing the noise basically by determining an alignment (sequence) of pattern composing units with characteristics of a chaos function taken into consideration in an alignment (sequence) of pattern composing units with different pitches of two or more in the number s of types. As a result of repeated developments according to such idea, a function generating a chaotic sequence of numbers (referred to as a chaotic function in the specification) which is capable of generating a chaotic sequence of numbers for establishing an alignment (sequence) of pattern composing units were developed by applying and modifying the chaos function for establishing an alignment (sequence) of pattern composing units. Furthermore, a procedure for establishing an alignment (sequence) of pattern composing units was developed.

The invention provides a pneumatic tire allowing a pitch sequence of a higher degree of freedom by aligning pattern composing units in a pitch sequence of skipping over one or more pitches adjacently disposed in the order of pitch length and having the pitches of three or more in the number of types, and providing a flexibility in pitch sequence.

The invention also provides a pneumatic tire allowing a pitch sequence of a higher degree of freedom by providing an alignment (sequence) of pattern composing units in a pitch sequence without skipping over one or more pitches adjacently disposed in the order of pitch length and the pitches of three or more in the number of types, and providing a flexibility in pitch sequence.

The invention provides aligning pattern composing units of the different pitches of two in the number of types.

BRIEF DESCRIPTION OF DRAWINGS

FIGS. 1(a),(b) are diagrams each showing an example of chaos function.

FIG. 2 is a diagram showing a defined region of a chaotic function in which the number s of types of pattern composing units is three.

FIGS. 3a–3d are diagrams showing a defined region of a chaotic function in which the number s of types of pattern composing units is four.

FIGS. 5a–5g are diagrams showing a defined region of a chaotic function in which the number s of types of pattern composing units is five.

FIGS. 12a–12d are diagrams illustrating a chaotic function when the number of types of pattern composing units is four.

FIGS. 13a–13g are diagrams illustrating a chaotic function when the number of types of pattern composing units is five.

FIGS. 14a–14g are diagrams illustrating a chaotic function when the number of types of pattern composing units is five.

FIGS. 16a–16d are diagrams illustrating a chaotic function when the number of types of pattern composing units is four.

FIGS. 17a–17g are diagrams illustrating a chaotic function when the number of types of pattern composing units is five.

FIGS. 18a–18g are diagrams illustrating a chaotic function when the number of types of pattern composing units is five.

FIG. 34 is a diagram explaining the comparison of a chaotic function.

BEST MODE FOR CARRYING OUT THE INVENTION

Figures 4A, 4B, 4C, 4D, 4E, 4F, 4G:
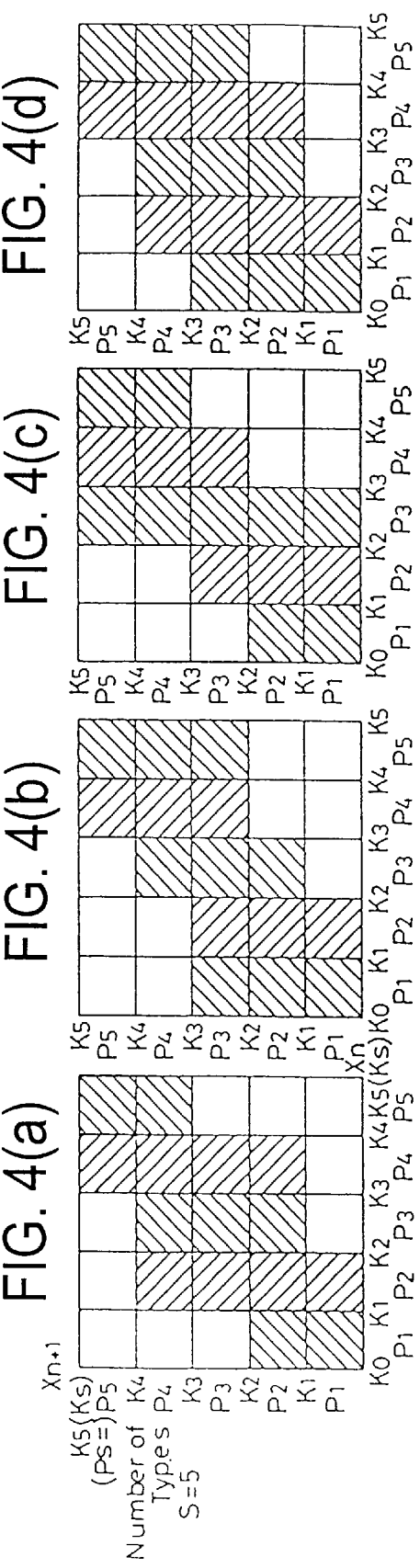
FIGS. 4a–4g are diagrams showing a defined region of a chaotic function in which the number s of types of pattern composing units is five.

In a pneumatic tire according to the invention, a sequence of numbers is obtained such that pattern composing units of s types different in pitch P that is a circumferential length, where s is three or more, are aligned by using a chaotic function. By an alignment of pattern composing units arranged sequentially in the circumferential direction of tire by converting it, a tread pattern of tire tread is formed. The alignment (sequence) of pattern composing units is verified, and employed as a verified alignment of pattern composing units.

First, the example that the number s of the pitch length of pattern composing units in the circumferential direction is three or more (nine or less, preferably seven or less in view of the manufacturing) of the mode of the invention is described. (The example that the number s is two is described after this.)

(1) First, as shown in FIGS. 2 to 5, an axis of abscissa $X_n$ and an axis of ordinate $X(n+1)$ suitable for a chaotic function are set in a perpendicular coordinate with an origin at 0. By providing longitudinal sectioning lines K0 to Ks and lateral sectioning lines K0 to Ks (K0 coincides with the axis of abscissa and that of ordinate, respectively) for dividing the axes of abscissa and ordinate $X_n$ and $X(n+1)$ perpendicularly thereto to the number s in the positive direction from the origin, respectively, the axes of abscissa and ordinate $X_n$ and $X(n+1)$ are respectively divided to sections corresponding to the number s of pitch types in number.

By sectioning in such manner, multiple small rectangular regions surrounded by the longitudinal sectioning lines K0 to Ks and lateral sectioning lines K0 to Ks are formed as the sections of the axes of abscissa and ordinate intersect each other in a positive coordinate plane of the perpendicular coordinate.

FIGS. 2 to 5 show cases when the number s of types of pattern composing units are three to five, sectioning in a similar manner can be conducted even when it is six or more. The number s of types can be set beforehand at the time of designing a tire.

(2) Then, pattern composing units are allocated to the sections of the axes of abscissa and ordinate $X_n$ and $X(n+1)$ from the origin 0 in the order of shorter to longer lengths of pitches P1 to Ps. A pitch is, as described above, a circumferential length of a pattern composing unit.

As a result, regions of the sections of pitches P1 to Ps are aligned in the direction of the axis of ordinate $X(n+1)$, that is, in the longitudinal direction in the sections (pitches P1 to Ps) of the axis of abscissa $X_n$.

In the case the number s of types is five, for example, as shown in FIGS. 4, 5, the pitches P1, P2, P3, P4 and P5 adjacently disposed in the order of shorter lengths are allocated from the side of origin in the sections of the axes of abscissa and ordinate $X_n$ and $X(n+1)$ by the sectioning lines K0 to K5 so that $K0<P1<K1$, $K1 \leq P2<K2$, $K2 \leq P3<K3$, $K3 \leq P4<K4$ and $K4 \leq P5<K5$ are achieved.

(3) Two curves of chaotic functions are applied, as described below, to the sections excluding those of the lowest and highest pitches in the axis of abscissa $X_n$, respectively.

(4) In addition, the defined regions of a chaotic function fc expressed by $X(n+1)=fc(X_n)$ are defined for the sections of the axis of abscissa, where $X_n$ is the abscissa, and $X(n+1)$ the ordinate.

The defined regions are established for the axis of abscissa $X_n$ in all regions aligned in the longitudinal direction, as described above. All regions aligned in the longitudinal direction are a longitudinal sum of a continuity of s regions of pitches P1 to Ps aligned in the longitudinal direction in the sections of the axis of abscissa $X_n$.

(5)-1 According to a first embodiment of the invention, the defined region is defined as below.

It is defined as a sum of regions at 1.5 or less in the ratio of higher to lower pitches allocated to the regions in the directions of axes of ordinate and abscissa of all regions aligning longitudinally in the sections of the axis of abscissa.

(5)-2 Further, according to the invention defined by a second embodiment, the defined region is defined as shown in (a), (b) and (c) below, respectively.

(a) In a section with the lowest pitch of the axis of abscissa, the defined region is a sum of regions with an identical pitch and those with pitches adjacently disposed thereto in the longitudinal direction in a higher side out of all regions aligned longitudinally in the lowest section of the axis of abscissa.

(b) In a section with the highest pitch of the axis of abscissa, the defined region is a sum of regions with an identical pitch and those with pitches adjacently disposed thereto in the longitudinal direction in a lower side out of all regions aligned longitudinally in the highest section of the axis of abscissa.

(c) In sections with an intermediate pitch of the axis of abscissa, the defined region is a sum of regions with an identical pitch and those with pitches adjacently disposed thereto in the longitudinal direction in higher and lower sides out of all regions aligned longitudinally in the sections of the axis of abscissa.

(6) In (7) to (21) below, first, the first embodiment of the invention, when the defined region is a sum of regions at 1.5 or less in the ratio between pitches of the axes of ordinate and abscissa, is explained.

(7) The ratio of pitch is set to 1.5 or less, because a pitch variation in a tread causes a variation in rigidity of adjacent pattern composing units, a distribution of stress in a ground contact surface comes to be uneven, and an abnormal wear may be caused, as described. In view of pitch variation, the ratio of pitch is 1.05 or more, preferably 1.1 or more.

Figure 6:
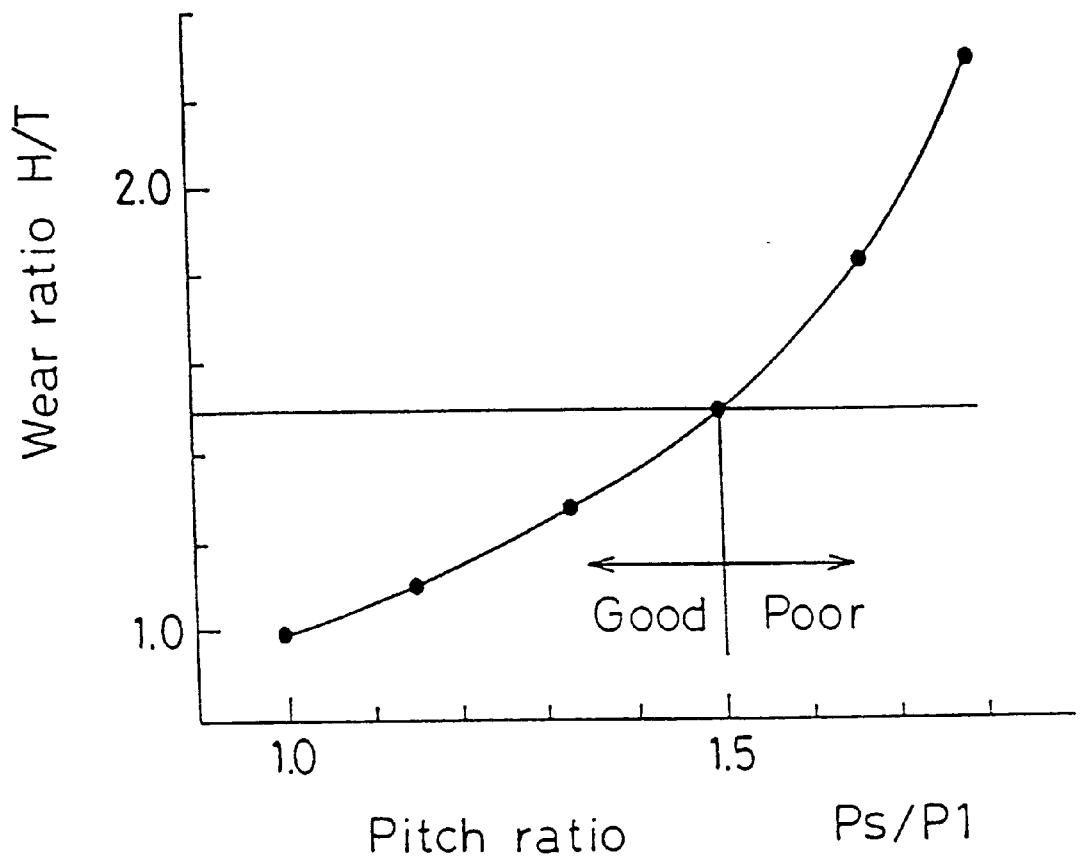
FIG. 6 is a diagram showing a relation between the ratio of pitches and H/T wear.

The inventors measured H/T wear (heel and toe wear) in a tire with two types of pitches alternatingly varied in the circumferential direction of tire. In a test tire, the ratio of pitch is changed, and measured by a drum test. A result of the test is shown in FIG. 6 as a relation between the ratio of two types of pitches and the ratio of amount of the H/T wear. The tire is in a size of 205/65R15, and is subjected to standard internal pressure and load, and a pitch of the reference pattern composing unit is at 30.0 mm.

A variation of amount in the H/T wear in a circumference leads to such abnormal wear as polygon wear. It is recognized from FIG. 6 that the ratio of pitch is preferably 1.5 or less.

Accordingly, in the first embodiment of the invention, a sum of regions in the longitudinal direction at 1.5 or less in the ratio of pitch is defined as a defined region of the chaotic function fc for the section of the axis of abscissa. Thus, a range of variation of the chaotic function in the sections of the axis of abscissa is established.

As a result, the ratio of pitch of adjacent pattern composing units in an alignment of pattern composing units can be prevented from exceeding 1.5, even when a variation of values in a sequence of numbers of the chaotic function is maximum, and the HI/T wear is controlled.

(8) The first embodiment of the invention, when the number s of pitch types of pattern composing units is fives is described below.

First, pitches are set as below.

P1=19.4 mm
P2=25.0 mm
P3=30.0 mm
P4=36.9 mm
P5=46.6 mm

This corresponds to "Case 1" of FIG. 4(a).

(9) First, regarding regions aligned in the longitudinal direction with respect to P1 section of the axis of abscissa Xn, P2/P1=1.29<1.5 and P3/P1=1.55>1.5. Therefore, if a defined region in the longitudinal direction is up to a sectioning line K3 that is parallel (in the lateral direction) with the axis of abscissa Xn, the ratio of pitch may exceed 1.5. Thus, For P1 section of the axis of abscissa Xn, in the direction of the axis of ordinate X(n+1), regions between the lateral sectioning lines K0 and K2 (P1 and P2 sections of the axis of ordinate) are determined as a defined region of chaotic function.

Now, regarding a defined region for P2 section of the axis of abscissa Xn, P2/P1=1.29≦1.5, P3/P2=1.20≦1.5, P4/P2=1.48≦1.5 and P5/P2=1.86>1.5. Therefore, regions in the longitudinal direction providing a pitch length variation within 1.5 are, in the direction of the axis of ordinate X(n+1), those between the lateral sectioning lines K0 and K4. A sum of the regions are determined as a defined region of chaotic function. It consists of P1, P2, P3 and P4 sections of the axis of ordinate X(n+1).

Then, regarding a defined region with respect to P3 section of the axis of abscissa Sn, similarly, regions in the longitudinal direction providing a pitch length variation within 1.5 are those between the lateral sectioning lines K1 and K4, in the direction of the axis of ordinate X(n+1). A sum of the regions is determined as a defined region of chaotic function. It consists of P2, P3 and P4 sections of the axis of ordinate X(n+1).

In a similar manner, regions in the longitudinal direction of P2, P3, P4 and P5 form a defined region for P4 section of the axis of abscissa Xn, as shown in FIG. 4(a). For P5 section of the axis of abscissa Xn, regions in the longitudinal direction of P4 and P5 form a defined region

(10) Now, to establish a defined region of chaotic function, it is determined by the ratio of higher to lower pitches P1 to Ps of a particular section in the direction of the axis of abscissa Xn or ordinate X(n+1) in the sections. In this way, a higher degree of freedom is obtained for establishing a range of chaotic function.

(11) Establishment of a defined region has no direct relation with setting the ratio Ps/P1 between the lowest pitch P1 and the highest pitch Ps to 1.5 or less.

The ratio Ps/P1 between the lowest pitch P1 and the highest pitch Ps should be 3.0 or less, preferably, 2.5 or less. In addition, it should be 1.1 or more. If it exceeds such value, an effect of dispersing sounds is almost unchanged, and an abnormal wear tends to be increased. In order to obtain an effect of pitch variation, it should be 1.1 or mores preferably, 1.2 or more.

Further, in pitches adjacent to each other in the order of length, the ratio P(i+1)/P1 between a higher pitch P(i+1) and a lower pitch P1 disposed adjacently should be 1.05 or more, preferably, 1.10 or more and less than 1.5. If it exceeds the value, an effect of dispersing sounds is poor, and the noise is increased.

For "Cases" shown in FIGS. 2 to 5, respectively, requirements of pitches and possibility of pitch variation are outlined in Table 1. To use a defined range of any case in FIGS. 2 to 5, it is required to fulfill "Requirements of pitches" shown in Table 1 (as further discussed later).

(12) The chaos function was applied and modified for establishing an alignment (sequence) of pattern composing units. By means of such modification and application, a chaotic function for generating a sequence of numbers (already referred to as chaotic function in the specification) was developed in conjunction with a procedure for establishing an alignment (sequence) of pattern composing units, and the invention was achieved. Now, the chaotic function is described.

(13) Characteristics required for a chaotic function in a defined region are listed below.

First, a chaotic function fc(Xn) of the sections should be a derivative f'c(Xn)≧1 in all sections.

Figure 7:
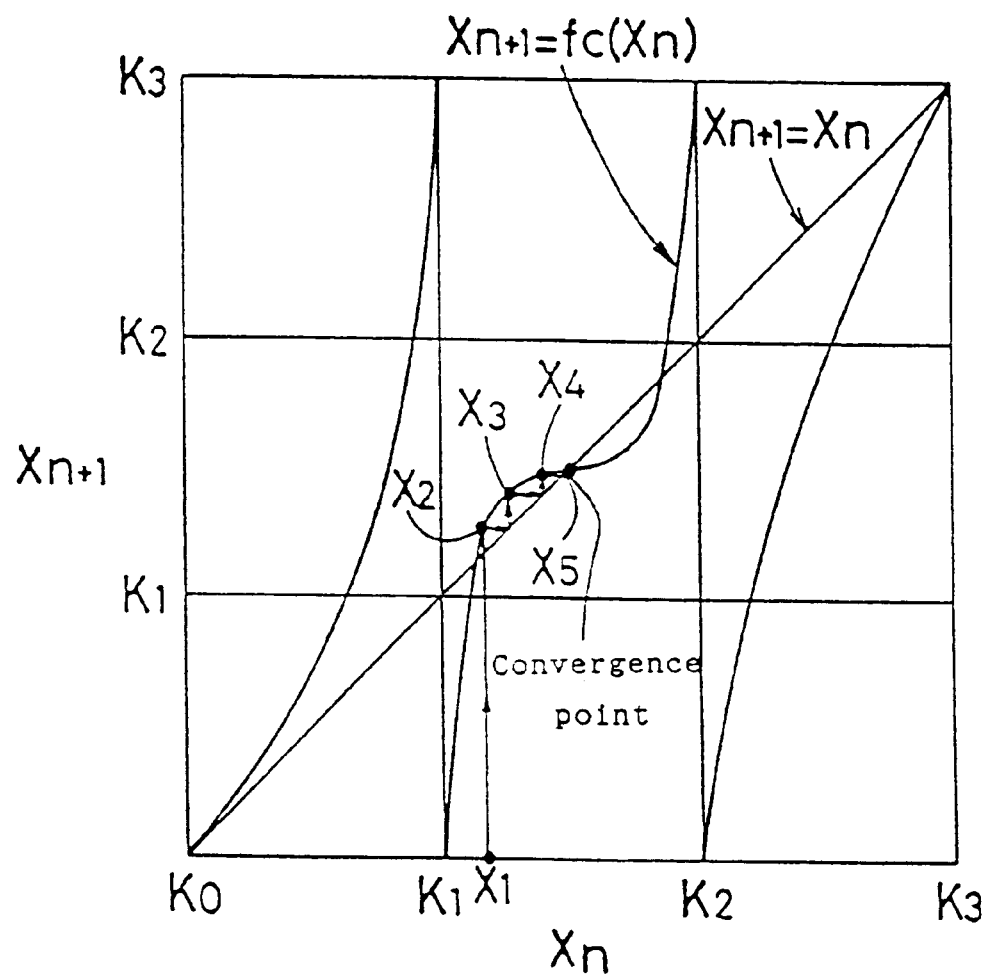
FIG. 7 is a diagram for explaining a chaotic function.

It is because, the chaotic function fc(Xn) may be intersected by a straight line of X(n+1)=Xn, as shown in FIG. 7 (or may not be intersected in the highest and lowest pitch sections). In the vicinity of the intersection, at f'c(Xn)<1, a sequence of numbers converges at the intersection, and it is impossible to generate an infinite sequence of numbers.

A second characteristic required for a chaotic function is that the following relation is satisfied in the sections where the lowest pitch P1 and the highest pitch Ps of the axis of abscissa Xn are defined.

That is, when Xc is a starting point in the lower side (or the side of origin) in the section, and Xe a terminal point in the higher side (or the opposite side of origin), $$f'c(Xe) > f'c(Xc) \text{ in the lowest pitch section;}$$

and $$f'c(Xc) > f'c(Xe) \text{ in the highest pitch section.}$$

Figure 8:
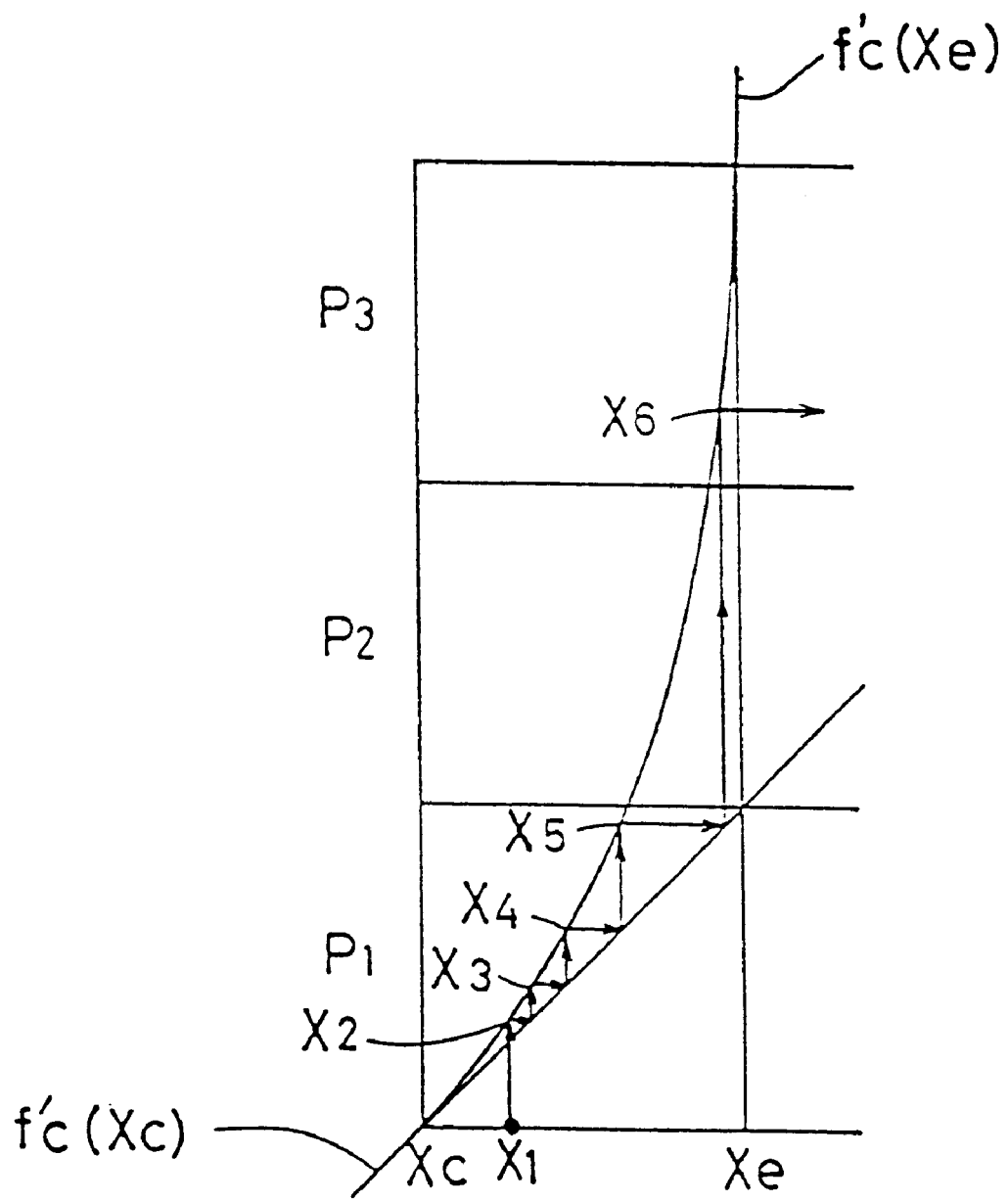
FIG. 8 is a diagram for explaining a chaotic function in a lowest pitch section.
Figure 9:
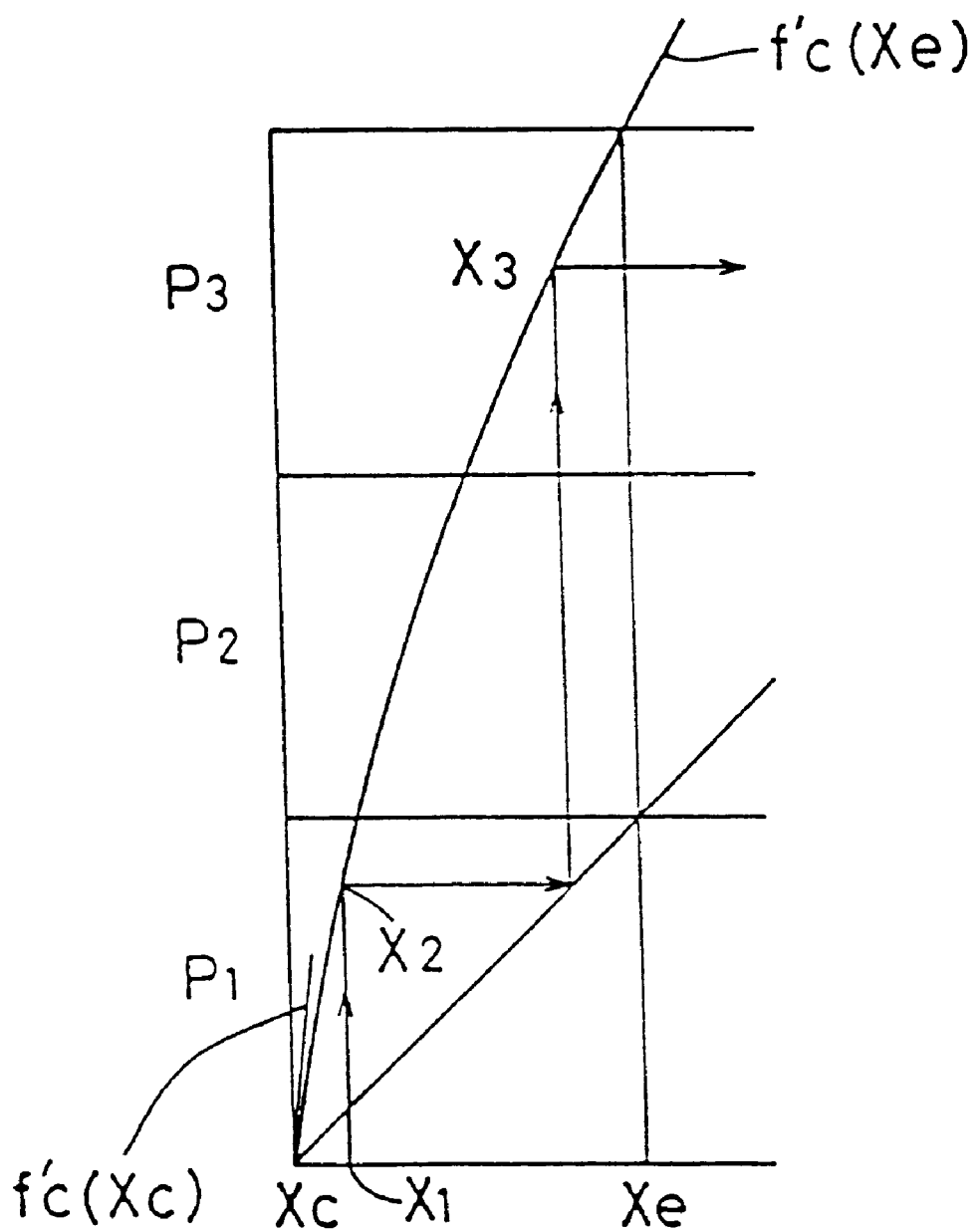
FIG. 9 is a diagram for explaining a chaotic function in a lowest pitch section.

It is because a sequence of numbers is more probably kept in a section of the lowest pitch P1, when f'c(Xe)>f'c(Xc) in the section of the lowest pitch P1, as shown in FIG. 8. On the other hand, when f'c(Xc)>f'c(Xe) in the section of the lowest pitch, as shown in FIG. 9, the lowest pitch P1 is less probably repeated sequentially.

As a relation reverse to that of the lowest pitch is required for a section of the highest pitch Ps, to achieve a certain degree of continuity for the highest pitch Ps as well, such relation of f'c(Xc)>f'c(Xe) as described above is required.

Figure 10:
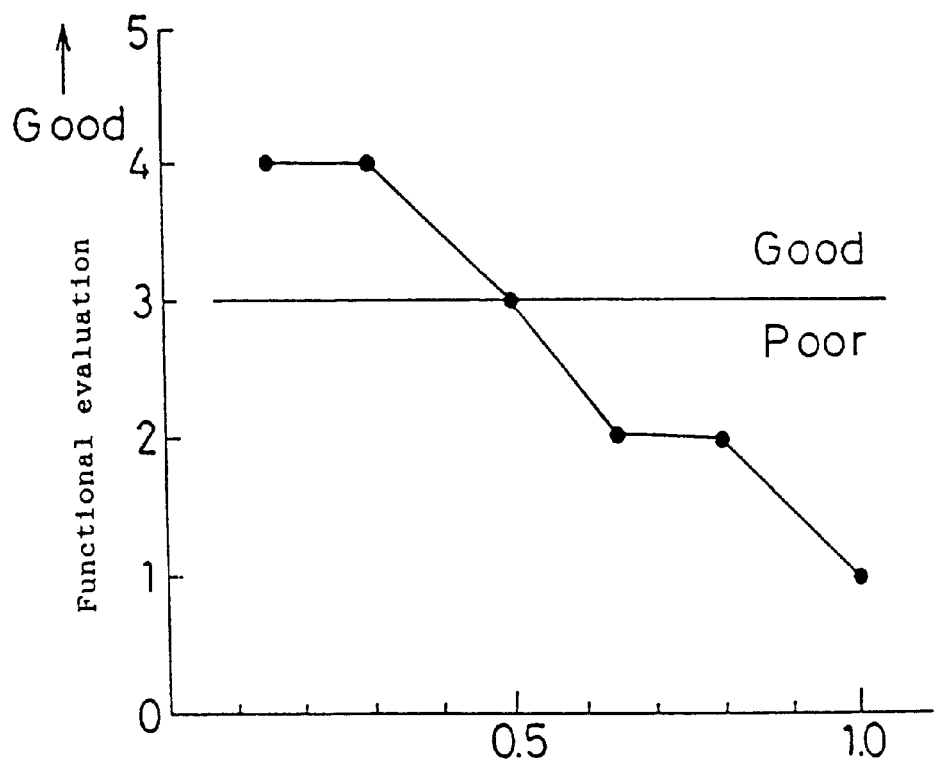
FIG. 10 is a diagram showing a relation between the ratio between the total number of pattern composing units of the highest and lowest pitches and the individual number of pattern composing units of the highest and lowest pitches and the noise.
Figure 11:
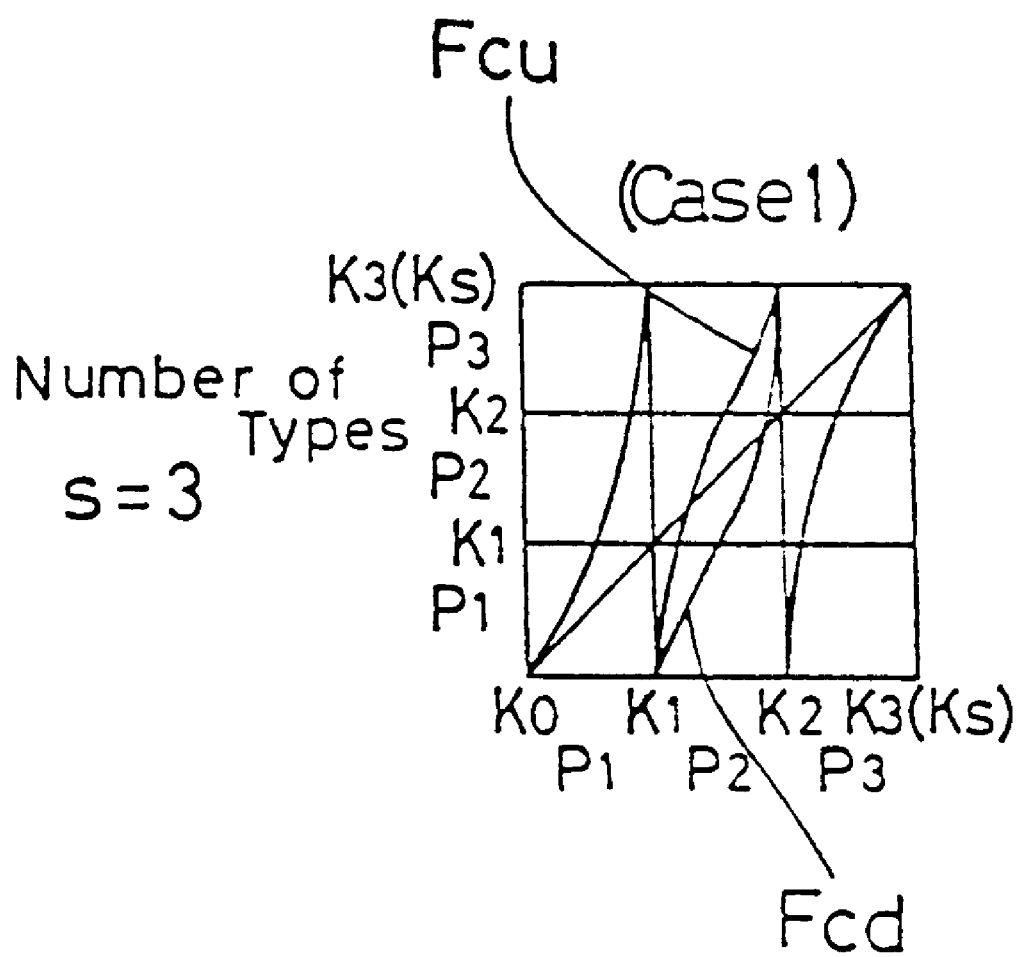
FIG. 11 is a diagram illustrating a chaotic function when the number of types of pattern composing units is three.
Figure 15:
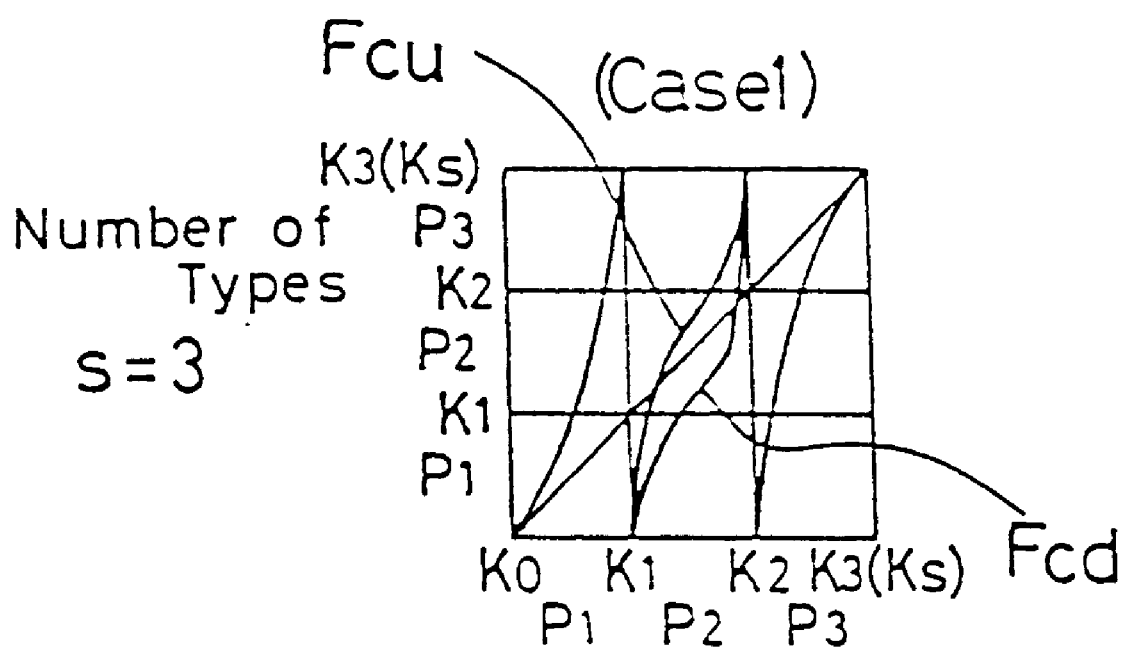
FIG. 15 is a diagram illustrating a chaotic function when the number of types of pattern composing units is three.
Figure 19:
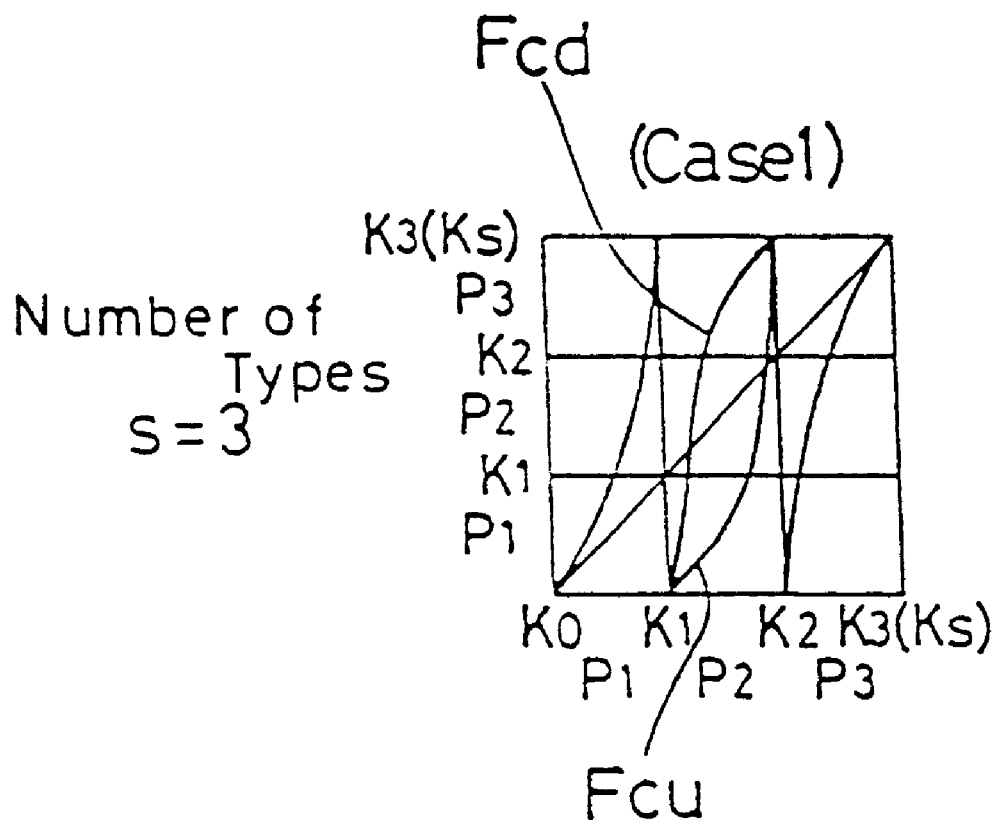
FIG. 19 is a diagram illustrating a chaotic function when the number of types of pattern composing units is three.
Figure 20:
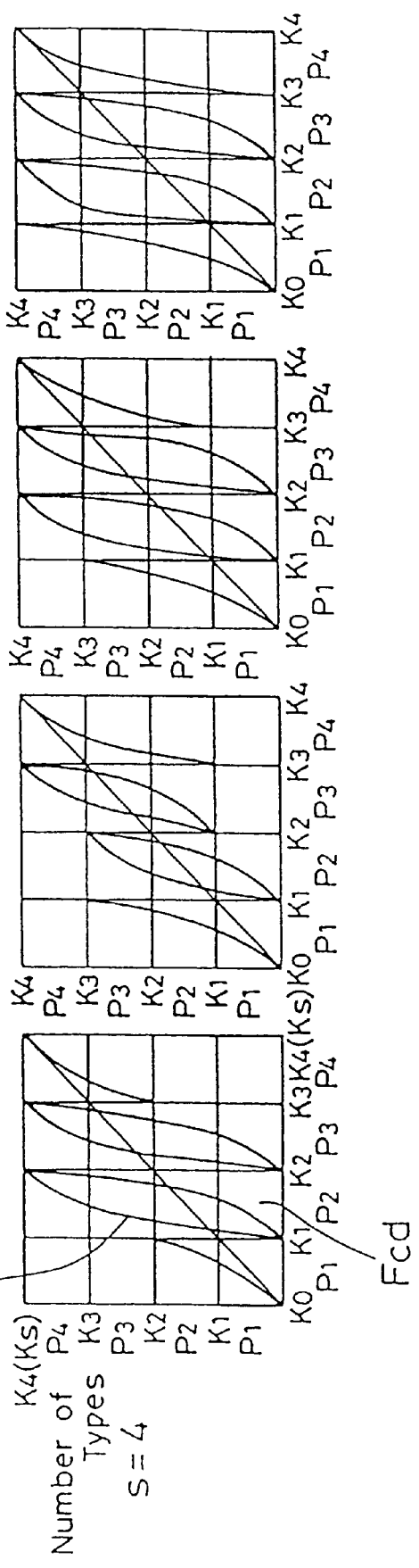
FIGS. 20a–20d are diagrams illustrating a chaotic function when the number of types of pattern composing units is four.
Figure 21:
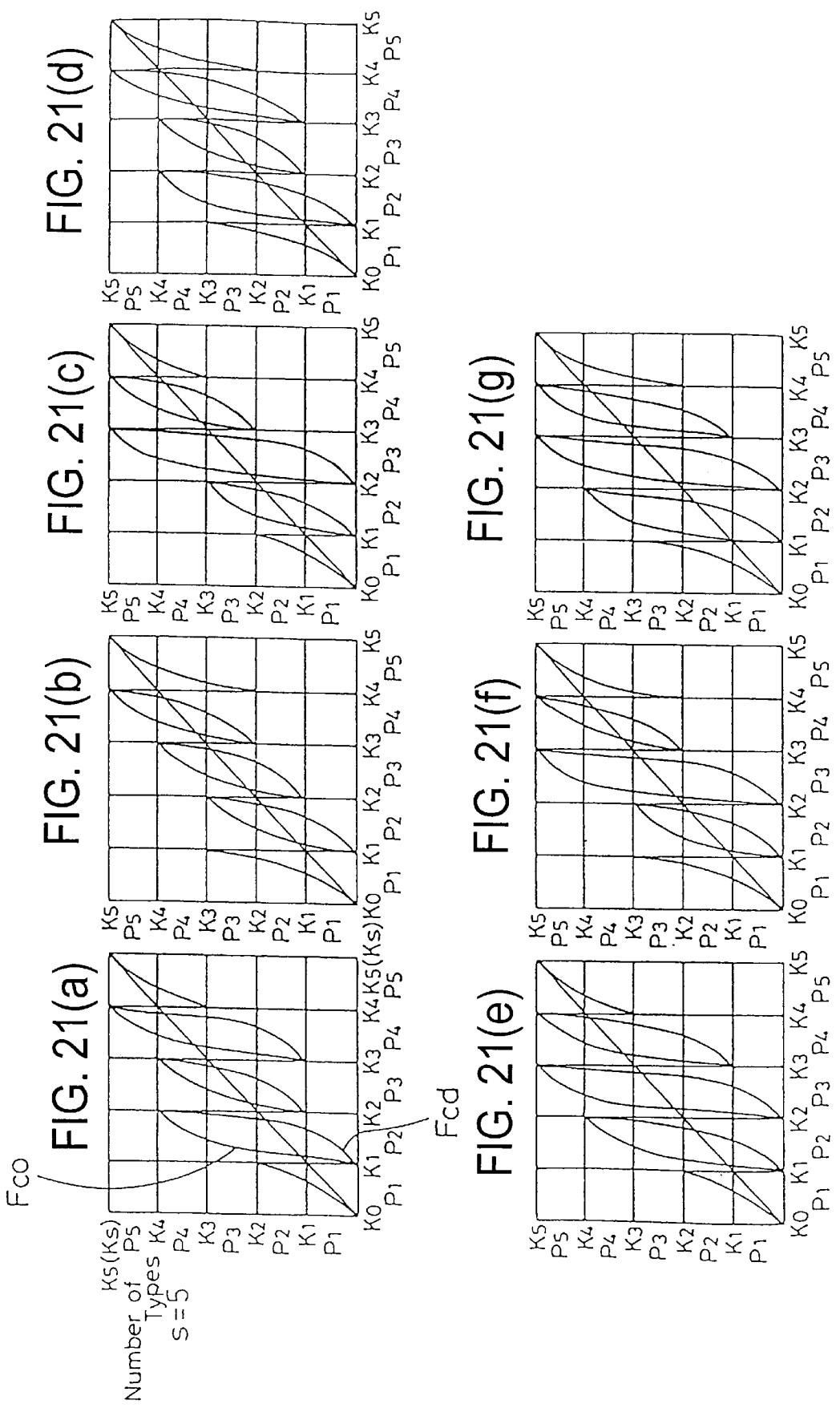
FIGS. 21a–21g are diagrams illustrating a chaotic function when the number of types of pattern composing units is five.
Figure 22:
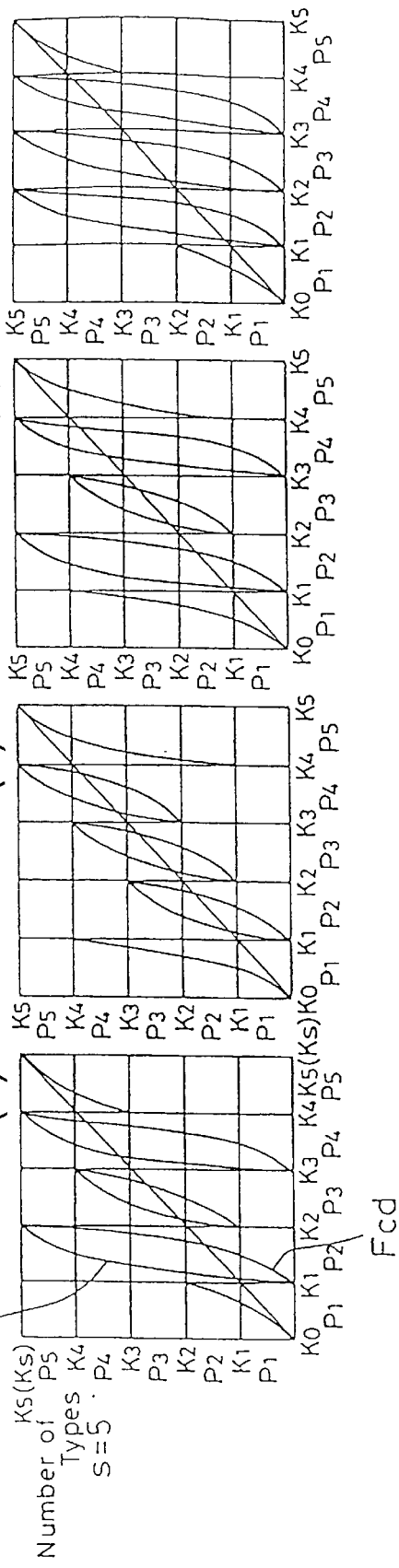
FIGS. 22a–22g are diagrams illustrating a chaotic function when the number of types of pattern composing units is five.

Thus, an alignment (sequence) allowing an appropriate continuity of pattern composing units of the lowest and highest pitches results from a test shown in FIG. 10. In FIG. 10, the pitch noise was tested by changing the ratio of the total number of pattern composing units of the lowest and highest pitches that are separately and individually present without forming a sequence to the total number of pattern composing units of the lowest and highest pitches P1 and Ps. As shown in FIG. 10, it is recognized that the higher the ratio of the number of individual pitches, the lower the score is. However, as described below, an excessive sequence of pattern composing units of the lowest or highest pitch is also not preferable.

(14) On the basis of a chaos function, a function satisfying the requirements, that is, the chaotic function is obtained. The inventors determined the three chaotic functions shown below. On the basis of a chaos function, other chaotic functions satisfying the requirements can be also employed for a tire according to the invention, and employment of such other chaotic functions also falls within the scope of the invention.

In the embodiments, the chaotic function defines two, left and right, chaotic functions Fcu, Fcd in sections except those of the lowest and highest pitches of the axis of abscissa Xn. The left chaotic function Fcu intersects a virtual line Ha (shown in FIG. 23) in the lateral direction that passes an intermediate level point in the longitudinal direction of a defined region in the side closer to the origin than a middle point Xa of the section in the axis of abscissa. The right chaotic function Fcd intersects the virtual line Ha in the opposite side (of the origin). Thus, in sections except those of the lowest and highest pitches, two, right and left, chaotic functions Fcu, Fcd are established. Right and left chaotic functions Fcu, Fcd may pass on one side of the virtual line Ha.

(15)-1 Chaotic functions represented by curves in FIGS. 11 to 14 (the number s of types of pattern composing units are five in FIGS. 13 and 14) are defined by the following formulae.

A) Section of the lowest pitch of the axis of abscissa Xn (K0<Xn<K1)
Formula 3 in Table (formulae)

B) Section of the highest pitch of the axis of abscissa Xn (K(s−1)≦Xn<Ks)
Formula 4 in Table (formulae)

C) Section except those of A) and B) (K1 is the lower limit (=Xc) of the section, K(i+1) the higher limit (=Xe))
Formula 5 in Table (formulae)

where Xt=Xn−(Ki+K(i+1))/2−εg.

Generally Z1 is 1.0 to 2.0, Zg is 1.0 to 10.0, the absolute value of εg is 0 to 0.5, and in this embodiment, Z1=1.06 to 1.15, Z2=2.0 to 5.0, and the absolute value of εg is 0.08 to 0.2.

The posterior suffix g is a sequence of z and ε values that are determined in sections P2 to P(s−1) of P1 to Ps of the x-axis, excluding sections of the lowest and highest pitches, and a value of 2 or more applies thereto.

The εg is a value for shifting the curve of the left and right chaotic functions Fcu and Fcd from the middle point Xa= (Ki+K(i+1))/2 of the section of the axis of abscissa. εg≧0 for the left chaotic function Fcu passing the side of origins and εg≦0 for the right chaotic function Fcd passing the opposite side.

In addition, SGN(Xt) is +1 at Xt≧0, and −1 at Xt<0.

a, C are constants set such that both ends of the formulae pass grid end points of a defined region of the sections.

In the Formulae, i is a sequence of sections on the axis of abscissa Xn, that is, pitches, and a section including the origin, which is set at 0, is assumed to be 1.

(15)-2 In FIGS. 15 to 18, a chaotic function forming a curve when the number s of types of pattern composing units is 5 is defined by the following formulae.

A) Section of the lowest pitch of the axis of abscissa Xn (K0<Xn<K1)
Formula 6 in Table (formulae)

B) Section of the highest pitch of the axis of abscissa Xn (K(s−1)≦Xn<Ks)
Formula 7 in Table (formulae)

C) Sections except those of A) and B) (K1 is the lower limit (=Xc) of the sections K(i+1) the higher limit (=Xe))
Formula 8 in Table (formulae)

where εg can be set voluntarily within a range of a half section. b and z1 can also be selected freely. The εg is a value for shifting the curve from the middle point Xa (Ki+K(i+ 1))/2 of the section of the axis of abscissa, εg≧0 for the left chaotic function Fcu passing the side of origin, and εg≦0 for the right chaotic function Fcd passing the opposite side. The posterior suffix g is a sequence of z and ε of which values are determined in sections P2 to P(s−1), excluding sections P1 and Ps of the lowest and highest pitches, and a value of 2 or more applies thereto. a, C are set such that both ends of the formulae pass grid end points of a defined region of the sections.

(15)-3 Chaotic functions of curves shown in FIGS. 19 to 22 (the number s of types of pattern composing units is s=5 in FIGS. 21 and 22) are defined by the following formulae.

A) Section of the lowest pitch of the axis of abscissa Xn (K0<Xn<K1)

Formula 9 in Table (formulae)

B) Section of the highest pitch of the axis of abscissa Xn (K(s−1)≦Xn<Ks)

Formula 10 in Table (formulae)

C) In sections (K1 to K(i+1)) of the x-axis except those of A) and B), when a coordinate of grid point at the lower limit in the side of origin in a defined region is (K1, Ko), and that at the higher limit in the opposite side (K(i+1), Kp):

C)-1 for the right chaotic function Fcd passing the opposite side of origin in relation to the middle point Xa, Formula 11 in Table (formulae)

C)-2 for the left chaotic function Fcu passing the side of origin in relation to the middle point Xa, Formula 12 in Table (formulae)

where z1 and zg are as described above, and can be selected freely.

(16) In this way, according to the invention, the lateral virtual line Ha passing the intermediate level point in the longitudinal direction of the defined region and two chaotic functions, that is, the left chaotic function Fcu passing the side of origin in relation to the middle point Xa of the section of the axis of abscissa and the right chaotic function Fcd passing the opposite side are established, respectively, for sections except those of the lowest and highest pitches of the axis of abscissa Xn.

Accordingly, by appropriately employing the left chaotic function Fcu and right chaotic function Fcd passing the opposite side depending on conditions, variation of pattern composing units from those of the lowest to the highest pitch or those of the highest to the lowest pitch can be facilitated, and a range of pitch variation is effectively made use of.

(17) In the embodiments, according to the conditions below, one of two chaotic functions Fcu and Fcd is selected.

First condition: In the case a first defined functional value X(n+1) is generated in a same section of the axis of abscissa, a next functional value X(n+2) is generated by means of the right or left chaotic function Fcu or Fcd identical to the first defined functional value X(n+1).

Second condition: In the case the first defined functional value X (n+1) is generated in a section of lower pitch of the axis of abscissa, or is at an initial value, the next functional value X (n+2) is generated by means of the left chaotic function Fcu.

Third condition: In the case the first defined functional value X(n+1) is generated in a section of higher pitch of the axis of abscissa, the next functional value X(n+2) is generated by means of the right chaotic function Fcd.

It is because the left chaotic function Fcu provides such curve that is offset to the left side of a straight line of X(n+1)=Xn, and more probably causes a condition of X(n+1)>Xn, thus, it has a tendency of changing pattern composing units to those of a higher pitch. On the other hand, the right chaotic function Fcd, on the contrary, more probably causes a condition of X(n+1)<Xn, and has, therefore, a tendency of changing pattern composing units to those of a lower pitch.

(18) Now, by using such chaotic function according to the invention, a sequence of numbers is generated, and converted to a pitch sequence of pattern composing units. For "Case 1" of FIG. 4(*a*), "Case 1" of FIG. 13(*a*) obtained by using Formulae 3, 4 and 5 in (15)-1 is taken for an example. FIG. 13(*a*) are magnified, and shown in FIG. 23.

Figure 23:
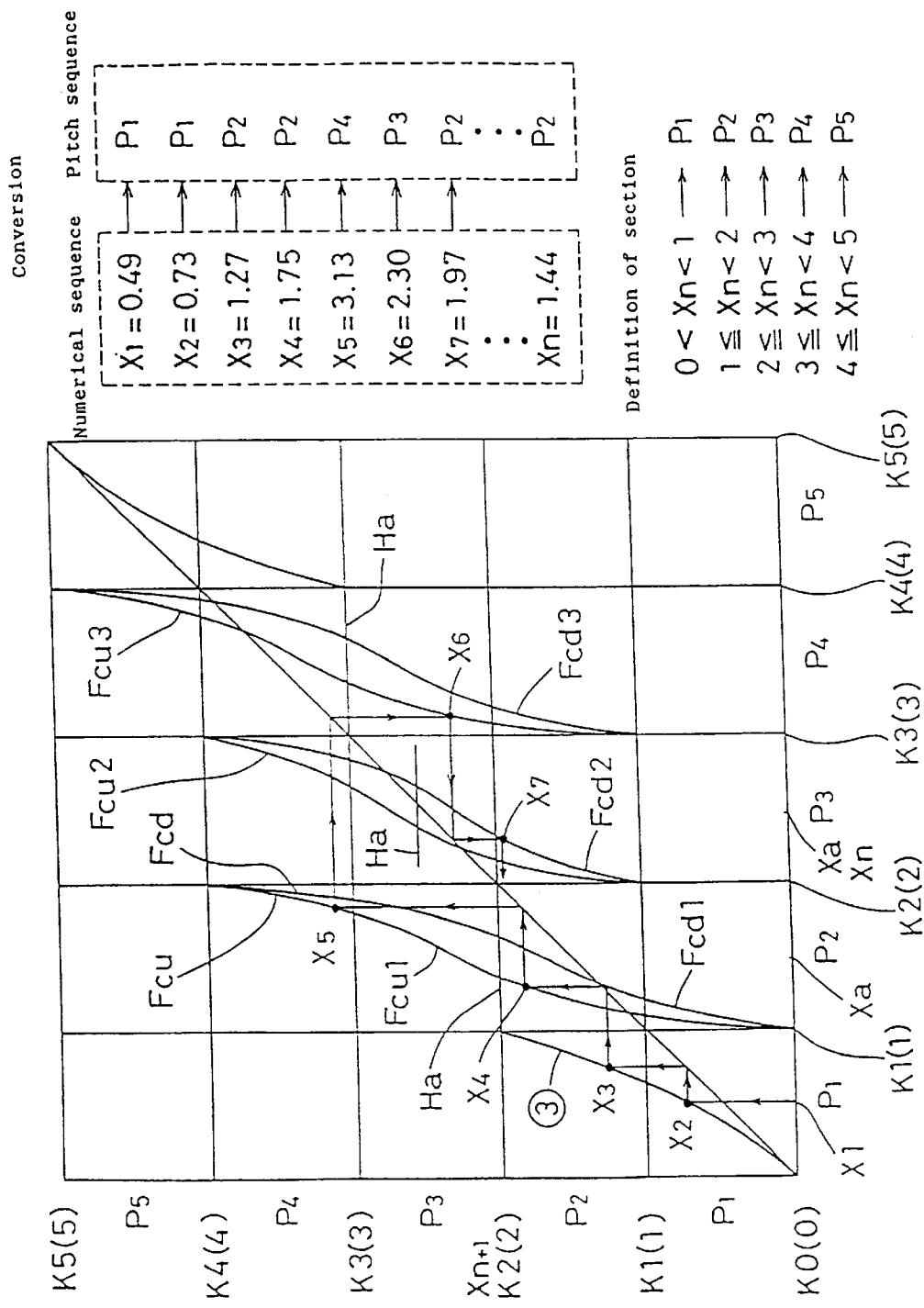
FIG. 23 is a diagram illustrating a method for obtaining a sequence of numbers by using a chaotic function.

In the longitudinal and lateral sectioning lines K0 to Ks (Ks=K5 in the embodiment), assuming the sections are even, K1 is set to 1, K2 to 2, and K5 to 5, sequentially, in FIG. 23.

When an initial value X1 is at 0.49 (by using, for example, a random number generator or random number table in the embodiment), X2=0.73 for X2 in the direction of the axis of ordinate X(n+1) can be obtained from the chaotic function 3 of Formula 3 in a section of the lowest pitch. Then, setting the axis of abscissa Xn at X2=0.73, X3=1.27 is sequentially produced from the chaotic function 3 of Formula 3.

Since the X3 falls within a section P2 for the axis of abscissa Xn, a left chaotic function Fcu1 or right chaotic function Fcd1 defined for the section P2 is employed. However, a succeeding functional value X3 is generated in a section P1 of a lower pitch of the axis of abscissa. Therefore, according to the second condition, a next functional value X(n+1), that is, X4=1.75 is produced by means of the left chaotic function Fcu1. In the same section P2, according to the first conditions a next functional value X5=3.13 is produced by means of the same left chaotic function Fcu1.

As X5 falls within a section P4 of the axis of abscissa Xn, a left chaotic function Fcu3 or right chaotic function Fcd3 defined for the section P4 is employed. However, because X5 is produced in the section P2 of lower pitch of the axis of abscissa, when it is viewed from the section P4, a next functional value X(n+1), that is, X6=2.30 is produced by means of the left chaotic function Fcu3.

The X6 falls within a section P3 of the axis of abscissa, and a left chaotic function Fcu2 or right chaotic function Fcd2 is employed. However, for X7, X6 is produced in a section of higher pitch of the axis of abscissa. Thus, according to the third condition, a next functional value X7 is generated by means of the right chaotic function Fcd. In other words, X7=1.97 is obtained by the right chaotic function Fcd2. A sequence of numbers is sequentially produced in such manner.

(19) Then, in order to convert the sequence of numbers into a pitch sequence, it is required to allow the sections to be in correspondence with different pitches, respectively. In the example of FIG. 23, a section of 0<Xn<1 corresponds to P1, that of 1≦Xn<2 to P2, 2≦Xn<3 to P3, 3≦Xn<4 to P4 and 4≦Xn<5 to P5, respectively.

In such manner, a sequence of numbers, 0.49, 0.73, 1.27, 1.75, 3.13, 2.30, 1.97 . . . , can be converted to a pitch sequence of pattern composing units, that is, P1, P1, P2, P2, P4, P3, P2 . . . .

(20) As recognized from the alignment, although it is changed only to pitches adjacent to each other in the order of length from P1 and P3 (from P5 as well), it is changed between P2 and P4, skipping over one pitch. It is predicted from the defined regions of chaotic functions shown in FIGS. 2 to 5.

In the section, by referring to FIGS. 3 to 5, the defined regions include (starts from) a region that is passed through by a virtual bisector (X(n+1)=Xn) extending from the origin at 45 degrees, and comprise a sum of up to three small rectangular regions sequentially disposed longitudinally above or below it in the longitudinal direction. Therefore, such alignment of pattern composing units with pitches changed by skipping over one pitch can be produced.

If a defined region includes (starts from) a region that is passed through by a virtual bisector (X(n+1)=Xn), and comprises a sum of up to three small rectangular regions sequentially disposed longitudinally above or below it in the longitudinal direction, an alignment of pattern composing units with pitches changed by skipping over one pitch can be produced.

A defined region (FIG. 23) of chaotic function of Case 1 shown in FIG. 4(a) includes a region that is passed through by a virtual bisectors and up to three small rectangular regions are sequentially disposed longitudinally above or below it in the longitudinal direction in sections P2 and P4 of the axis of abscissa Xn.

Thus, according to the first embodiment of the invention, it is required to include an alignment (sequence) of pattern composing units with pitches changed by skipping over one pitch at the pitch ratio of 1.5 or less. It is because a degree of freedom of the alignment (sequence) is increased, the alignment (sequence) can be more irregular, and dispersion of the pitch noise (change to the white noise) can be superiors if such alignment (sequence) with pitches changed by skipping over to a remote pitch is included in a pitch sequence.

In Table 1, the pitch ratios required as the "Requirements of pitches" to be established for cases shown in FIGS. 2 to 5 are listed. Because a problem of abnormal wear is caused, if an uncontrolled pitch variation is allowed, the pitch variation is controlled within a predetermined range by using such chaotic function as described above.

(21) In such manner, by selecting a sequence of numbers by using a chaotic function, a pitch sequence of pattern composing unit can be produced. However, although conditions necessary for reducing a tire's noise can be fulfilled, sufficient conditions may not be satisfied.

It is because a bias may be included in a sequence of numbers produced, since a sequence of numbers produced by a chaotic function is very irregular (unpredictable) while the total number of pattern composing units in an alignment of pattern composing units of a tire, that is, the total number of pitches (Np), is not very large. In order to achieve reduction of a tire's noise, it is required to eliminate such bias, and select an optimum alignment (sequence).

Prior to explaining such consideration, the mode according to the second embodiment, and the third embodiment in which the number s of the pitch length of pattern composing unit is two is described.

First, the mode of the invention according to the second embodiment is described in (22) to (30).

(22) The invention according to the second embodiment is described below for the number s of types of pitches of pattern composing units at 3.

First, pitches are set as follows.

P1=24.0 mm

P2=30.0 mm

P3=36.0 mm

(23) A defined region of chaotic function is selected, and established for a certain section of the axis of abscissa as described in (a), (b) and (c). Thus, as described above, an alignment (sequence) of pitches obtained can be without skipping one pitch, simpler, clearer and smoother in comparison with the original first embodiment of the invention, and enhances reduction of the noise.

(24) A chaotic function has already been described. Characteristics required for a chaotic function in a defined region are reconfirmed below.

First, a chaotic function fc(Xn) of sections should be a derivative f'c(Xn)≧1 for all sections.

A second characteristic required for a chaotic function is that the following relation is satisfied in the sections where the lowest pitch P1 and the highest pitch Ps of the axis of abscissa Xn are defined.

That is, when Xc is a starting point in the lower side (or the side of origin) in the section, and Xe is a terminal point in the higher side (or the opposite side of origin), $f'c(Xe) > f'c(Xc)$ in the lowest pitch section;

and $f'c(Xc) > f'c(Xe)$ in the highest pitch section.

Thus, a sequence of numbers is more probably kept in a section of the lowest pitch P1. For a section of the highest pitch, a relation reverse to that for the lowest pitch is provided. Thus, it is preferred that pattern composing units of the lowest and highest pitches are appropriately disposed in sequence, and a functional evaluation shown in FIG. 10 is obtained.

(25) In this refined first embodiment as well, the chaotic function defines two, left and right, chaotic functions Fcu, Fcd in sections except those of the lowest and highest pitches of the axis of abscissa Xn. The left chaotic function Fcu intersects a virtual line Ha (shown in FIG. 31) in the lateral direction that passes an intermediate level point in the longitudinal direction of a defined region in the side closer to the origin than a middle point Xa of the section in the axis of abscissa. The right chaotic function Fcd, on the other hand, intersects the virtual line Ha in the opposite side (of the origin). Thus, in sections except those of the lowest and highest pitches, two, left and right, chaotic functions Fcu, Fcd are established Here, two, left and right, chaotic functions Fcu, Fcd may be pass in one side of the virtual line Ha.

Figure 28A:
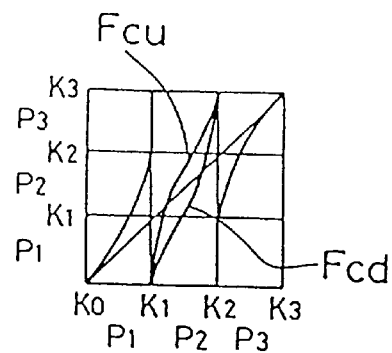
FIGS. 28a–28c are diagrams illustrating a chaotic function.
Figure 28B:
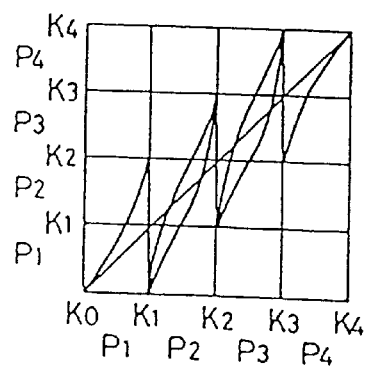
Figure 28C:
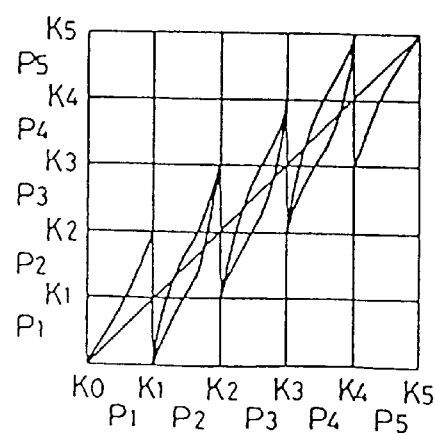

(26)-1 A chaotic function forming a curve of FIG. 28 is defined by Formulae 13, 14 and 15 in Table (formulae) corresponding, respectively, to Formulae 3, 4 and 5 in same sections shown in FIGS. 11 to 14 of the invention according to the original first embodiment. The same notes also apply thereto. Generally, Z1 is 1.0 to 2.0, Zg is 1.0 to 10.1, the absolute value εg is 0 to 0.5. In this embodiment, Z1 is 1.1 to 1.2, Zg is 2.0 to 3.0, and the absolute value of εg is 0.15.

Figure 29A:
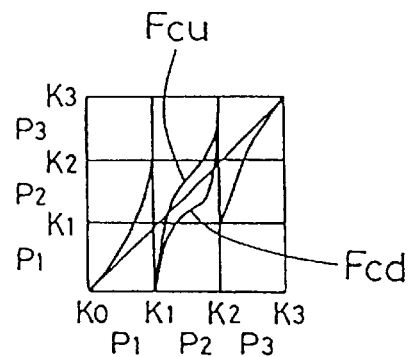
FIGS. 29a–29c are diagrams illustrating another chaotic function.
Figure 29B:
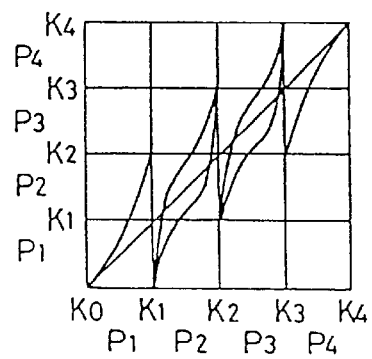
Figure 29C:
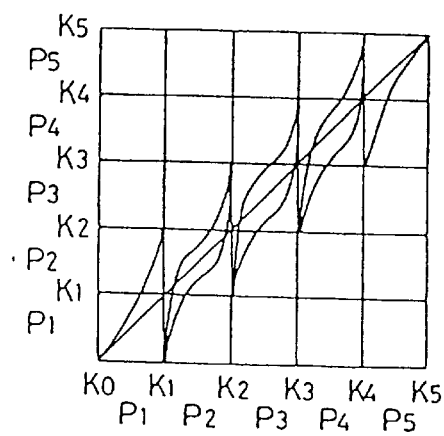

(26)-2 A chaotic function forming a curve of FIG. 29 is defined by Formulae 16, 17 and 18 in Table (formulae) corresponding, respectively, to Formulae 6, 7 and 8 in same sections shown in FIGS. 15 to 18 of the invention according to the original first embodiment. The same notes also apply thereto. Generally, Z1 is 1.0 to 2.0, and the absolute value of εg is 0 to 0.5. In this embodiment, Z1 is 1.0 to 1.15, and the absolute value of εg is 0.1 to 0.2.

Figure 30A:
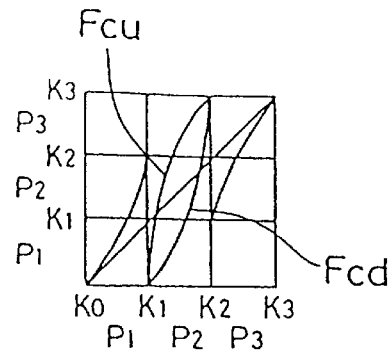
FIGS. 30a–30c are diagrams illustrating the other chaotic function.
Figure 30B:
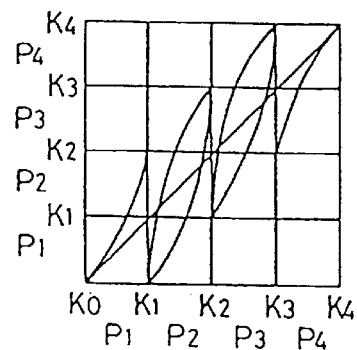
Figure 30C:
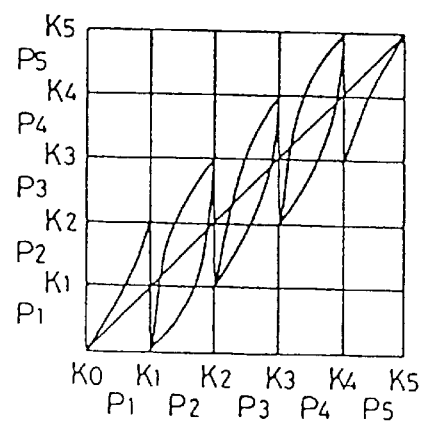

(26)-3 A chaotic function forming a curve of FIG. 30 is defined by Formulae 19, 20, 21 and 22 in Table (formulae) corresponding, respectively, to Formulae 9, 10, 11 and 12 in same sections shown in FIGS. 15 to 18 of the invention according to the first embodiment.

A) Section of the lowest pitch of the axis of abscissa Xn (K0<Xn<K1)

Formula 19 in Table (formulae)

B) Section of the highest pitch of the axis of abscissa Xn (K(s−1)≦Xn<Ks)

Formula 20 in Table (formulae)

C) In sections (K1 to K(i+1)) of the x-axis except those of A) and B), when a coordinate of grid point at the lower limit in the side of origin in a defined region is (K1, K(i−1)), and that at the higher limit in the opposite side is (K(i+1), K(i+2)):

C)-1 for the right chaotic function Fcd passing the opposite side of origin in relation to the middle point Xa, Formula 21 in Table (formulae)

C)-2 for the left chaotic function Fcu passing the side of origin in relation to the middle point Xa, Formula 22 in Table (formulae)

(27) Thus, also in the embodiment, two chaotic functions, that is, a left chaotic function Fcu and a right chaotic function Fcd passing the opposite side are established for sections except those of the lowest and highest pitches of the axis of abscissa Xn. It is because of a reason same as that of the invention according to the first embodiment. The left and right chaotic functions are employed in a manner similar to that described above. Generally, Z1 is 1.0 to 2.0, Zg is 1.0 to 10.0, and in the embodiment, Z1 is 1.1 and Zg is 4.0.

Figure 24:
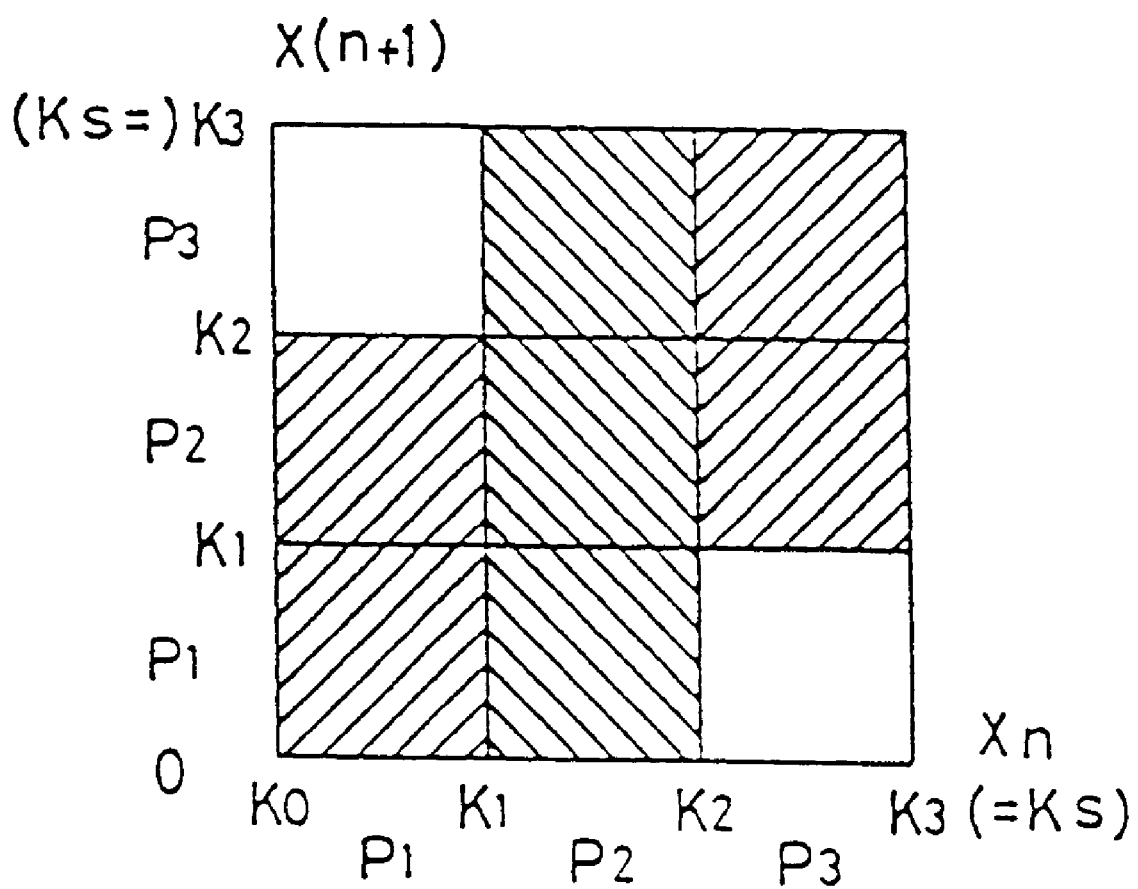
FIG. 24 is a diagram showing a chaotic function when the number s of types of pattern composing units is three.
Figure 25:
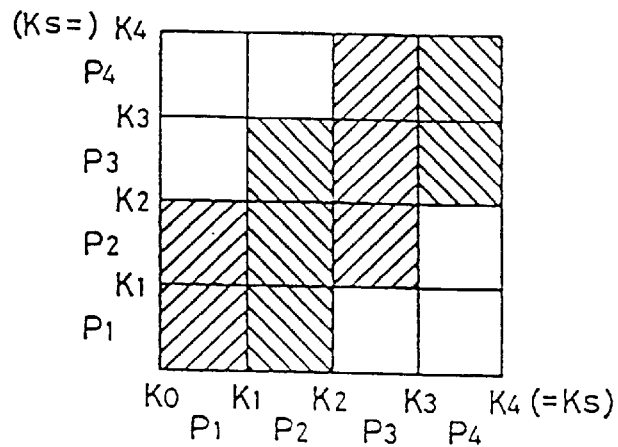
FIG. 25 is a diagram showing a chaotic function when the number s of types of pattern composing units is four.
Figure 26:
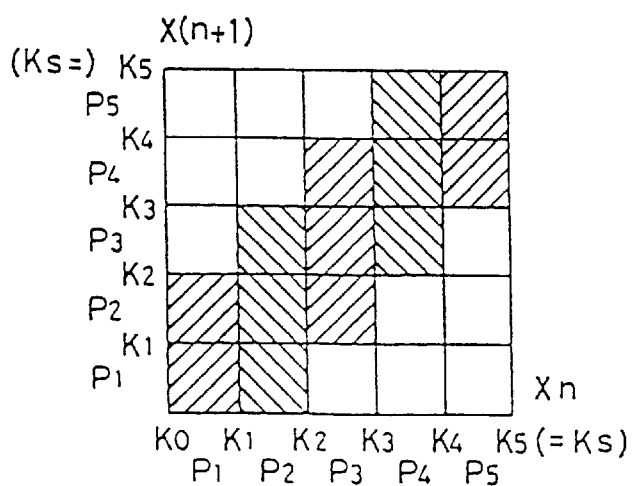
FIG. 26 is a diagram showing a chaotic function when the number s of types of pattern composing units is five.
Figure 27:
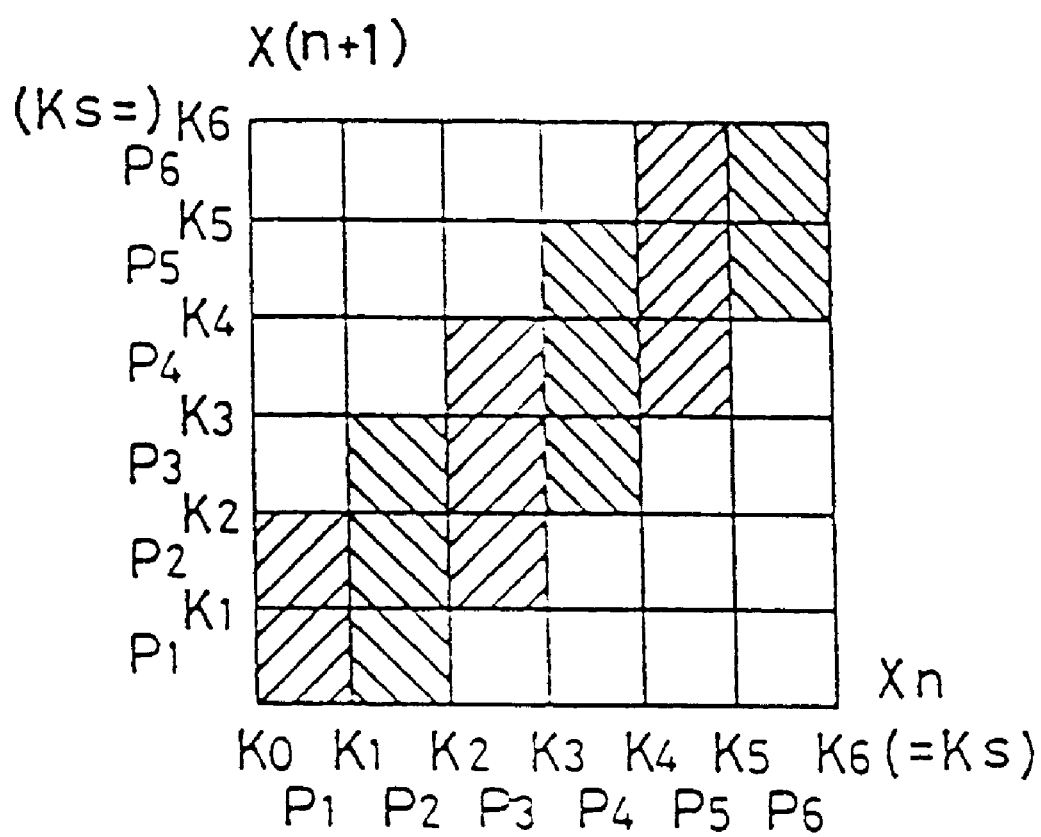
FIG. 27 is a diagram showing a chaotic function when the number s of types of pattern composing units is six.

(28) Now, an example for obtaining an arrangement of pattern composing units according to the invention of the second embodiment. A case of FIG. 24, where the number s of types is three, is taken as an example. It refers to a case of FIG. 28(a): obtained by Formulae 13, 14 and 15 in (26)-1. FIG. 28(a) is magnified, and shown in FIG. 31.

Figure 31:
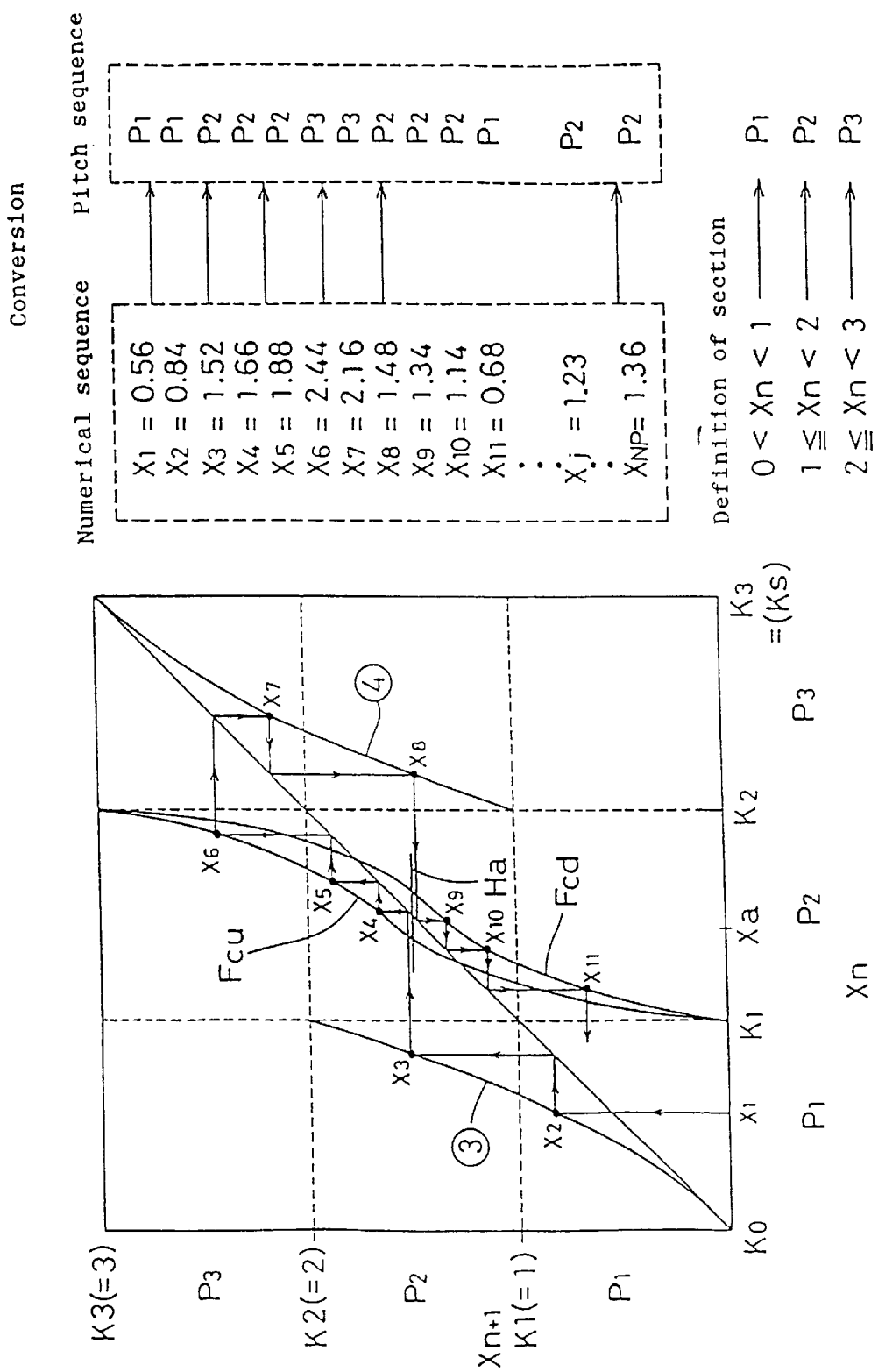
FIG. 31 is a diagram illustrating a method for obtaining a sequence of numbers by using a chaotic function.

Assuming sections are equally divided by the longitudinal and lateral sectioning lines K0 to Ks (Ks=K3 in the embodiment), K1 is set to 1, K2 to 2 and K3 to 3, sequentially, in FIG. 31.

(29) An initial value X1 is set to 0.56 (which is generated, for example, by a table of random numbers or a random number generator). Accordingly, X2=0.84 is obtained for X2 in the direction of the axis of ordinate X(n+1) from the chaotic function 3 of Formula 13 in a section of the lowest pitch. Then, setting the axis of abscissa Xn at X2=0.84, X3=1.52 is sequentially produced from the chaotic function 3 of Formula 3.

Since the X3 falls within a section P2 for the axis of abscissa Xn, a left chaotic function Fcu or right chaotic function Fcd defined for the section P2 is employed. However, a succeeding functional value X3 is generated in a section P1 of a lower pitch of the axis of abscissa. Therefore, according to the second condition, a next functional value X(n+1), that is, X4=1.66 is produced by means of the left chaotic function Fcu. In the same section P2, according to the first condition, a next functional value X5=1.88, X6=2.44 are sequentially produced by means of the same left chaotic function Fcu.

X6 falls within a section P3 of the axis of abscissa Xn, and X7=2.16, X8=1.48 are produced according to a curve 4 obtained by the Formula 4 for the section.

The X8 falls within the section P2 of the axis of abscissa, and X9 is obtained by using the left chaotic function Fcu or right chaotic function Fcd. However, according to the third condition defining that the next functional value X9 should be produced by means of the right chaotic function Fcd, if X8 is produced in a section of higher pitch of the axis of abscissa, X9=1.34 can be obtained by the right chaotic function Fcd. Further, X10=1.14, X11=0.68 are produced.

(30) Then, in order to convert the sequence of numbers into a pitch sequence, it is required to allow the sections to be in correspondence with different pitches, respectively. In the example of FIG. 31, a section of 0<Xn<1 corresponds to P1, that of $1 \leq Xn<2$ to P2, and $2 \leq Xn<3$ to P3, respectively.

In such manner, a sequence of numbers, 0.56, 0.84, 1.52, 1.66, 1.88, 2.44, 2.16, 1.48, 1.34, 1.14, 0.68 . . . , can be converted to a pitch sequence of pattern composing units, that is, P1, P1, P2, P2, P2, P3, P3, P2, P2, P2, P1 . . . .

As recognized from the arrangement, the pitch P is only changed to a pitch adjacent thereto in the order of length, and never changed by skipping over one pitch. It is naturally predicted from the defined regions of chaotic functions shown in FIGS. 24 to 27. In FIGS. 24 to 27, the defined regions include (starts from) a region that is passed through by a virtual bisector (X(n+1)=Xn) extending from the origin at 45 degrees, and comprise a sum of up to two regions sequentially disposed longitudinally above or below it in the longitudinal direction. Therefore, such alignment of pattern composing units with pitches changed by skipping over one pitch cannot be produced.

By using a sequence of numbers of a chaotic function, and restricting skipping of a pitch in a pitch variation in such manner, the periodicity can be reduced as well as the sequence being clear and smoothly, and dispersion (change to a white noise) of a pitch noise is promoted.

(31) Next, the invention according to the third embodiment, when the number s of pitch types of pattern composing units is two, is described below.

Figure 32:
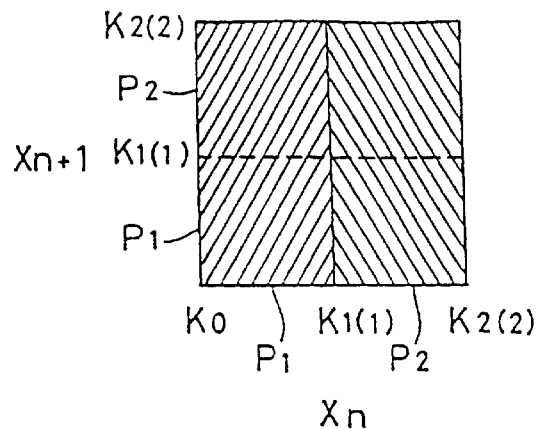
FIG. 32 is a diagram showing a chaotic function when the number s of types of pattern composing units is two.

(32) First, as shown in FIG. 32, an axis of abscissa Xn and an axis of ordinate X(n+1) suitable for a chaotic function are set in a perpendicular coordinate with an origin at 0. By providing longitudinal sectioning lines K0 to K2 and lateral sectioning lines K0 to K2 (K0 passes the axis of abscissa and that of ordinate, respectively) for dividing the axes of abscissa and ordinate Xn and X(n+1) perpendicularly thereto to the number s=2 in the positive direction from the origin, respectively, the axes of abscissa and ordinate Xn and X(n+1) are respectively divided to sections corresponding to the number s=2 of pitch types in number.

By sectioning in such manner, four small rectangular regions surrounded by the longitudinal sectioning lines K0 to K2 and lateral sectioning lines K0 to K2 are formed as the sections of the axes of abscissa and ordinate intersect each other in a positive coordinate plane of the perpendicular coordinate.

(33) Then, pattern composing units are allocated to the sections of the axes of abscissa and ordinate Xn and X(n+1) from the origin 0 in the order of shorter to longer lengths of pitches P1 to P2. As a result, the pitches P1, P2 are allocated from the side of origin in the sections of axes of abscissa and ordinate Xn and X(n+1) by the sectioning lines K0 to K2 so that K0<P1<K1, $K1 \leq P2<K2$ are achieved. A pitch is, as described above, a circumferential length of pattern composing unit.

As a result, regions of the sections of pitches P1 to P2 are aligned in the direction of the axis of ordinate X(n+1), that is, in the longitudinal direction in the sections (pitches P1 to P2) of the axis of abscissa Xn.

(34) At least two, in the embodiment, two, left and right, chaotic functions are applied each to the sections (pitches P1, P2) in the axis of abscissa Xn, respectively. In addition, the defined regions of a chaotic function are defined as a sum of the regions of pitches P1, P2 aligned of the axis of abscissa, in the sections of pitches P1, P2 on the abscissa Xn in the mode of the third embodiment in which the number s of pitches of pattern composing units is two.

The chaotic function fc where the abscissa is Xn and ordinate is X(n+1) is expressed as X(n+1)=fc (Xn).

(35) The ratio (P2/P1) of pitch is set to 1.5 or less, as a measuring result of H/T wear (heel and toe wear) is shown in FIG. 6, in the tire that the number s of pitch is two.

It is because a pitch variation in a tread causes a variation in rigidity of adjacent pattern composing units, a distribution of stress in a ground contact surface comes to be uneven, and an abnormal wear such as polygon wear be caused. When the value is small, in view of pitch variation, the dispersion of pitch noise is small and noise comes large, so the ratio of pitch is 1.05 or more, preferably 1.1 or more.

(36) The chaotic function in the defined region when the number s is two must have the following characteristics.

Figure 42:
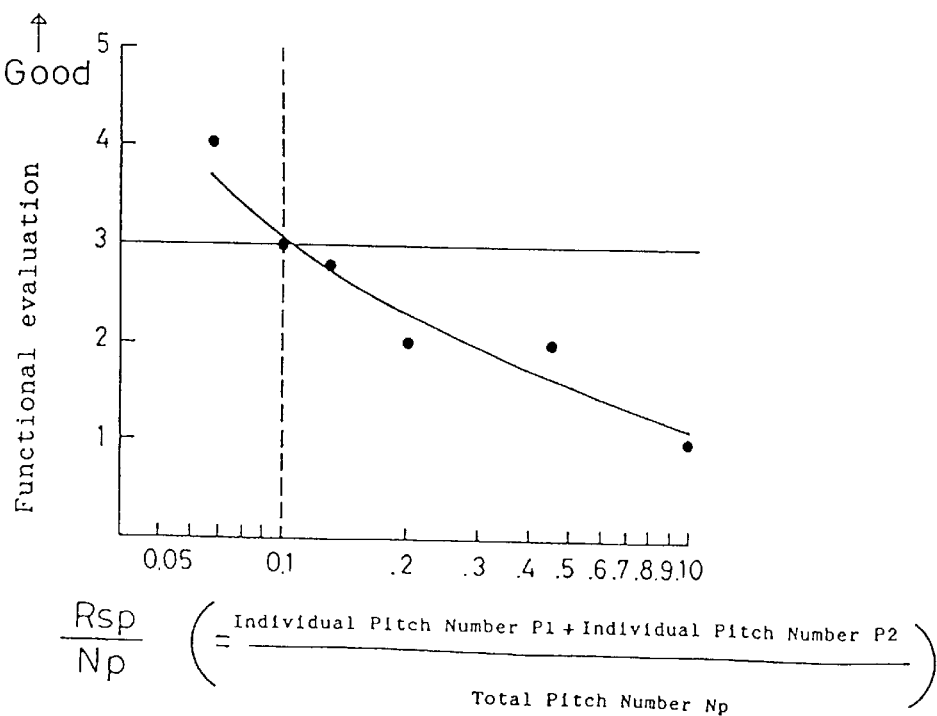
FIG. 42 is a diagram showing a result of functional evaluation of pitch noise as the variation of the ratio of the total number of single pattern composing unit and the total number of pattern composing units.

First, two or more chaotic functions is in pitch P1, P2 of the sections of the abscissa, respectively. It is because many characteristics can be supplied in the sequence of pitch by using two or more chaotic functions, and the aligning of individual (one) pattern composing unit of the low and high pitch P1, P2 can be reduced. As shown in FIG. 42, the increase of individual pitch pattern composing unit without an alignment allowing an appropriate continuity of pattern composing units of the same pitches results in the reduction of the test result in functional estimation. Therefore, the ratio Rsp/Np of the total number of individual pattern composing unit to the total number of pattern composing unit is 0.1 or less.

Second, a chaotic function fc(Xn) of the sections should be a derivative f'c(Xn)≧1 in all sections.

Figure 33:
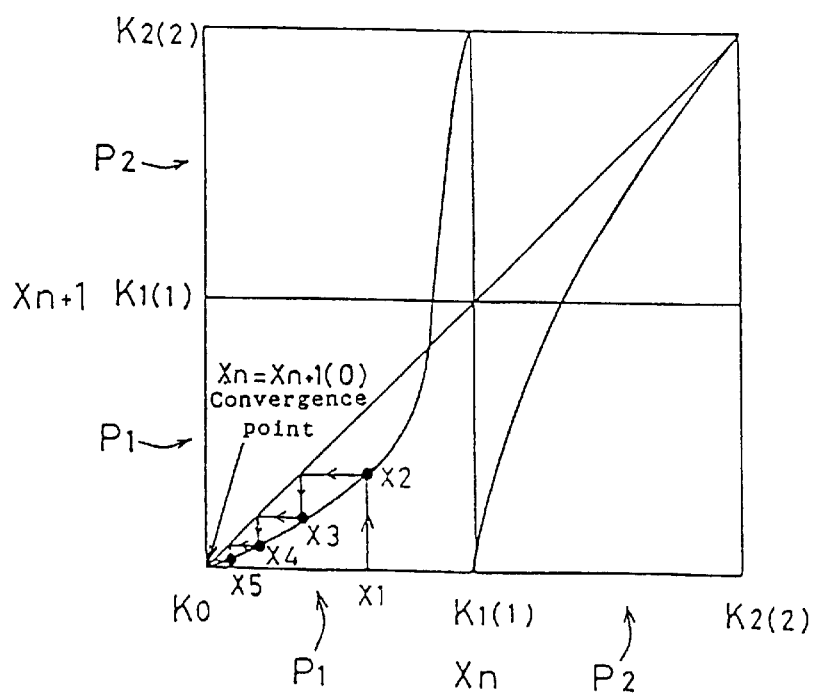
FIG. 33 is a diagram illustrating a chaotic function.

It is because, the chaotic function fc(Xn) may be intersected by a straight line of X(n+1)=Xn, as shown in FIG. 33 even if the number s is two. In the vicinity of the intersection, at f'c(Xn)<1, a sequence of numbers converges at the intersection, and it is impossible to generate an infinite sequence of numbers.

A third characteristic required for a chaotic function is that the following relation is satisfied in the sections where the lowest pitch P1 and the highest pitch P2 of the axis of abscissa Xn are defined.

That is, when Xc is a starting point in the lower side (or the side of origin) in the section, and Xe a terminal point in the higher side (or the opposite side of origin), $$f'c(Xe) > f'c(Xc) \text{ in the lowest pitch section;}$$

and $$f'c(Xc) > f'c(Xe) \text{ in the highest pitch section.}$$

It is because a sequence of numbers is more probably kept in a section of the lowest pitch P1, when f'c(Xe)>f'c(Xc) in the section of the lowest pitch P1, as shown in FIG. 8. On the other hand, when f'c(Xc)>f'c(Xe) in the section of the lowest pitch, as shown in FIG. 9, the lowest pitch P1 is less probably repeated sequentially.

As a relation reverse to that of the lowest pitch is required for a section of the highest pitch P2, to achieve a certain degree of continuity for the highest pitch P2 as well, such relation of f'c(Xc)>f'c(Xe) as described above is required.

As shown in FIG. 34, lowest and highest pattern composing units are preferably arranged continuously in proper degree. In FIG. 34, a sequence of numbers satisfying that f'c(Xe)>f'c(Xc) in the section of lowest pitch P1, f'c(Xc)>f'c(Xe) in the section of highest pitch P2 is shown in left column, and an example not satisfying is shown in right column. A method for selection of pitch sequences in FIG. 34 is described later.

By the tests of functional estimation of pitch noise of the tires having these sequences, the left column, in which the chaotic functions satisfy the conditions, is good in result, In view of the dispersion of pitch noise, lowest and highest pitch are continuous in proper degree. However, exceed continuous is not preferable.

Figure 35:
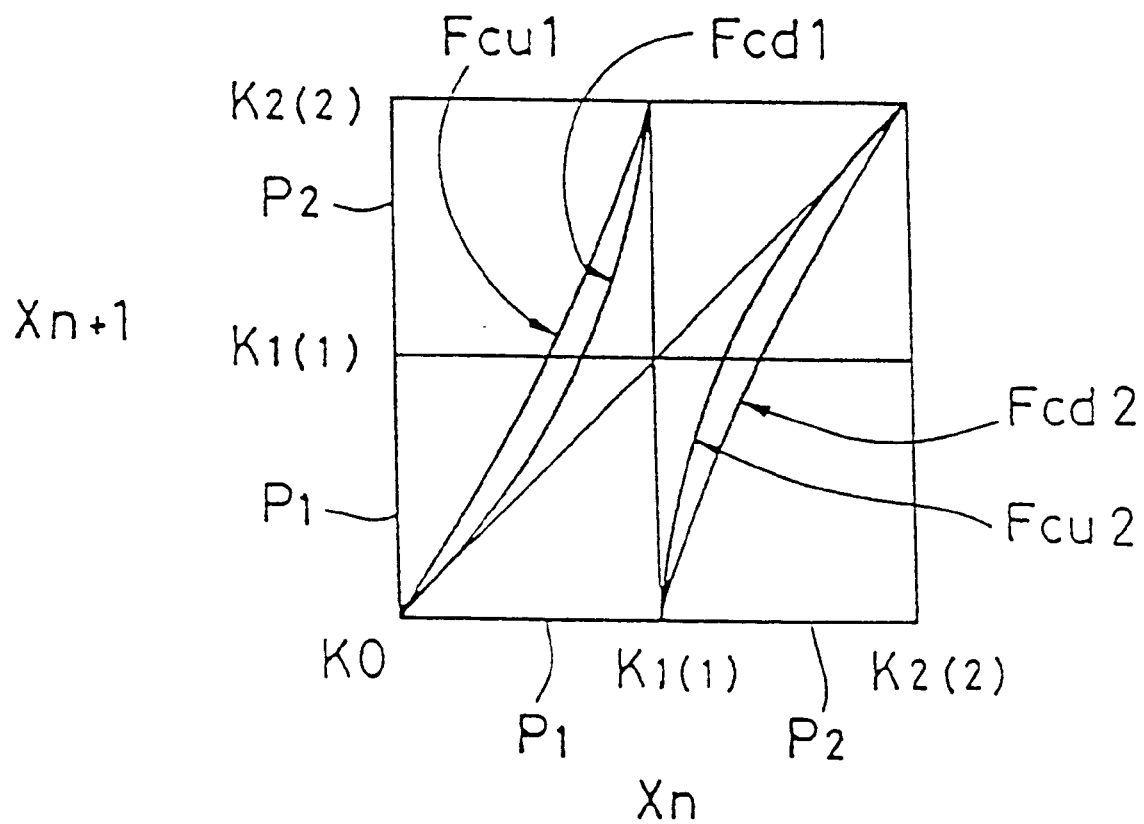
FIG. 35 is a diagram explaining two chaotic functions used in the invention.

(37) Chaotic functions satisfying the first to third conditions and represented by curves in FIG. 35 are defined by the following formulae.

A) Section of the lowest pitch of the axis of abscissa Xn (K0<Xn<K1)

| Formula 23 in Table (formulae) | Curve Fcu1 in FIG. 35. |
| Formula 24 in Table (formulae) | Curve Fcd1 in FIG. 35. |

In the formulae 23 and 24, Z1 and Z2 is larger than 1 and Z2>Z1.

B) Section of the highest pitch of the axis of abscissa Xn (K1≦Xn<K2)

| Formula 25 in Table (formulae) | Curve Fcd2 in FIG. 35. |
| Formula 28 in Table (formulae) | Curve Fcu2 in FIG. 35. |

In the formulae 25 and 26, Z1 and Z2 is larger than 1 and Z2>Z1.

Generally, Z1 is 1.0 to 2.0, Z2 is 2.0 to 20.0, in the embodiment, Z1 is 1.10 to 1.15, Z2 is 5.0 to 10.0.

Thus, formulae 23 to 26 satisfy first condition, second condition in which f'c(Xn)≧1, and third condition in which f'c(Xe)>f'c(Xc) in the section of the lowest pitch P1, f'c(Xc)>f'c(Xe) in the section of the highest pitch P2.

As described above, Constant Z1 in Formulae 24, 26 is larger than Constant Z2 in Formulae 23, 25.

Therefore, the curvature of the function Fcd1 in formula 24 is larger, a sequence of numbers is kept in the section P1 more than the function Fcu1 of formula 23. Function Fcu2 of formula 26 has larger curvature than function Fcd2 of formula 25, a sequence of numbers is more kept in the section P2.

(38) In the embodiments, according to the conditions below, one of two chaotic functions Fcu and Fcd (Fcu1, Fcd1, Fcu2, Fcd2) is selected.

First condition: In the case a first defined functional value X(n+1) is generated in a same section of pitch P1 of the axis of abscissa in a section of pitch P1, or is at an initial value, a next functional value X(n+2) is generated by means of the left chaotic function Fcu1.

Second condition: In the case the first defined functional value X (n+1) is generated in a section of pitch P2 of the axis of abscissa in a section of pitch P1, or is at an initial value, the next functional value X (n+2) is generated by means of the right chaotic function Fcd1.

Third condition: In the case the first defined functional value X(n+1) is generated in a same section of pitch P2 of the axis of abscissa in a section of pitch P2, the next functional value X(n+2) is generated by means of the right chaotic function Fcd2.

Fourth condition: In the case the first defined functional value X(n+1) is generated in a section of pitch P1 of the axis of abscissa in a section of pitch P2, the next functional value X(n+2) is generated by means of the left chaotic function Fcu2.

Only when a sequence of numbers varies between the sections P2, P1 from the section P1 to the section P2 and from the section P2 to the section P1, functions Fcd1 and Fcu2 of formulae 24, 26 having large curvature are used. Thus, in the sectional variation of a sequence of numbers, function Fcd1 becomes function Fcu1 in the same section P1 and function Fcu2 becomes function Fcd2 in the same section P2 in many cases. As a result of this, the pattern composing unit of pitch length P1 or P2 may not be aligned in the state of individual (one) unit.

The function Fcu1 and Fcd1 of formulae 23 and 24 in the above mentioned section P1 intersect a virtual line Ha (shown in FIG. 36) in the lateral direction that passes an intermediate level point (K1 in ordinate X n+1) in the longitudinal direction of a defined region in the side apart from the origin than a middle point Xa of the section in the axis of abscissa. However, in each section, two chaotic functions of left chaotic function Fcu passing in the side to the origin than a middle point Xa and right chaotic function Fcd passing in the opposite side can be used, chaotic functions satisfying the conditions may be used in the invention. The case that these are used is also included in the scope of art of the invention.

(39) Now, in the case of the number s being two, it is described for the step that by using such chaotic function in the embodiment, a sequence of numbers is generated, and converted to a pitch sequence of pattern composing units. Formulae 23 to 26 are taken for an example. FIG. 35 are magnified, and shown in FIG. 36.

Figure 36:
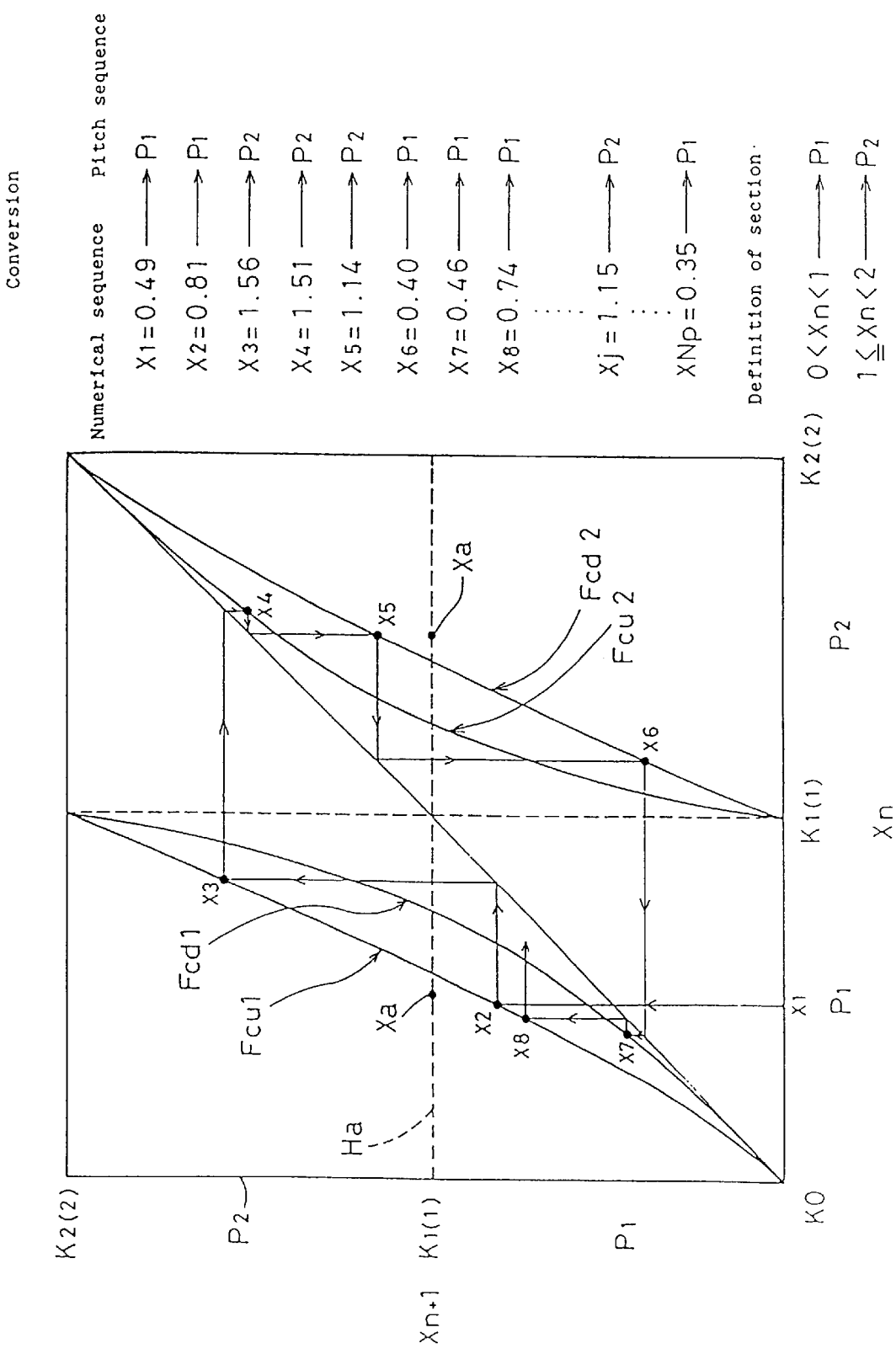
FIG. 36 is a diagram illustrating a method for obtaining a sequence of numbers by using a chaotic function.

In the longitudinal and lateral sectioning lines K0 to K2 assuming the sections are even, K1 is set to 1, K2 to 2 in FIG. 36.

When an initial value X1 is at 0.49 (set free by using, for example, a random number generator or random number table and so on), X2=0.81 can be obtained from the chaotic function Fcu1 of Formula 23 by first condition. Then, X3=1.56 can be obtained from the chaotic function Fcu1 of Formula 23 by first condition.

Since the X3 falls within a section P2 for the axis of abscissa Xn, a left chaotic function Fcu2 or right chaotic function Fcd2 defined for the section P2 is employed. However, a succeeding functional value X3 is generated in a section P1 of a lower pitch of the axis of abscissa. Therefore, according to the fourth condition, a next functional value X(n+1), that is, X4=1.51 is produced by means of the left chaotic function Fcu2. In the same section P2, according to the third condition, a next functional value X5=1.14 is produced by means of the same right chaotic function Fcd1. In the same manner, X6=0.40 is produced.

As X6 falls within a section of lowest pitch P1, a left chaotic function Fcu1 or right chaotic function Fcd1 defined for the section is employed. However, because X6 is produced in the section P2 of lower pitch of the axis of abscissa, a next functional value X(n+1), that is, X7=0.46 is produced by means of the left chaotic function Fcd1 by second condition. According to the second condition, X8=0.74 is produced by means of the function Fcu1. In this way, a sequence of numbers is sequentially produced.

(40) Then, in order to convert the sequence of numbers into a pitch sequence, it is required to allow the sections to be in correspondence with different pitches, respectively. In the example of FIG. 36, a section of 0<Xn<1 corresponds to P1, that of $1 \leq Xn<2$ to P2, respectively.

In such manner, a sequence of numbers, 0.49, 0.81, 1.56, 1.51, 1.14, 0.40, 0.46, 0.74 . . . , can be converted to a pitch sequence of pattern composing units, that is, P1, P1, P2, P2, P2, P1, P1, P1 . . . .

(41) Thus, a pitch sequence of pattern composing units can be produced by using a chaotic function, and selecting a sequence of numbers in a mode of the invention including such alignment (sequence) of pattern composing units that one or more pitches adjacently disposed in the order of length is skipped over according to the first embodiment, and that of the invention according to the second embodiment without skipping over a pitch, and the number s of pitch length is two according the third embodiment.

However, as already described, although conditions necessary for reducing a tire's noise can be fulfilled, sufficient conditions may not be satisfied.

It is because a bias may be included in a sequence of numbers produced, since a sequence of numbers produced by a chaotic function is very irregular (unpredictable), while the total number of pattern composing units in an alignment of pattern composing units, that is, the total number of pitches (Np) is not very large. In order to achieve reduction of a tire's noise, it is required to eliminate such bias, and select an optimum alignment. As a result of repeated studies, it was found that a verification should be conducted for the following requirements.

An irregularity index Vr is less than 2 (which corresponds to (3) of each embodiment.

An autocorrelation coefficient Ru is less than 0.5 as u>5 (which corresponds to (4) of each embodiment.

A maximum variance coefficient PSDrmax should satisfy a following formula (which corresponds to (5) of each embodiment.

$$PSDrmax \leq \{100/(Ps/P1)^{10}\} \times (1/Rn) + 5 \times \{(1/Rn)+1\}$$

Rn is a value of non-dimension of the total number of pitches Np and Rn=Np/60

The ratio SQmax/Np between the number SQmax of pattern composing units of an identical pitch sequentially disposed and the total number of pattern composing units in the sequence of pattern composing units of tire is 0.15 or less (which corresponds to (6) of each embodiment.

By satisfying the requirements of verification, confirmation of chaotic characteristics, elimination of bias and optimization of various performances can be achieved. Thus, in a tire according to the invention, an alignment (sequence) of pattern composing units obtained according to a chaotic function, and verified is employed. (In the verification, when the number of pitch is two, pitch P1 as lowest pitch and pitch P2 as highest pitch are selected.)

In a mode according to the third embodiment such that the number s of pitch length is two, a next condition is satisfied.

The ratio Rsp/Np between the total number Rsp (pitch individual coefficient) of pattern composing units of an identical pitch without continuous sequence and in individual disposed and the total number of pattern composing units in the sequence of pattern composing units of tire is 0.1 or less (which corresponds to (7) of the third embodiment.

(42) Irregularity index Vr

The irregularity index Vr is for confirming absence of a specific periodicity in a pitch sequence, and checking is performed to the eighth order. Periodicity is checked to eight degrees, because vibrations and noises caused by order components of a radial force variation (RFV) when a tire is rolling is generally of up to the eighth order as shown in Table 2. If no specific periodicity is present to the eighth order, it is considered that no problem will be caused.

In the specification, the irregularity index Vr is a value defined by Formula 27 in Table (formulae), and should be 2 or less. In Formula 27, ar and br are determined in Formulae 28 and 29 in Table (formulae).

Figure 37:
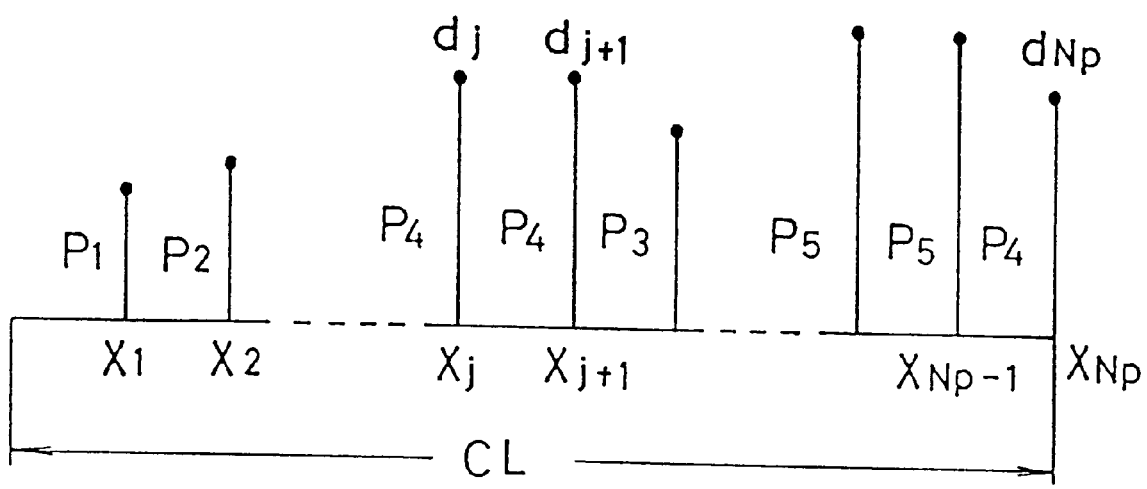
FIG. 37 is a diagram explaining Xj of an irregularity index Vr.

In the formula, dj is a jth pitch nondimensional of an alignment of pattern composing units dj=Pj/mean pitch Pj: a pitch of jth pattern composing unit in an alignment of pattern forming units Mean pitch: entire circumferential length CL of tire/total number Np of pitches of an alignment of pattern composing units (see FIG. 37)

Xj: position of a jth pitch

Figure 38:
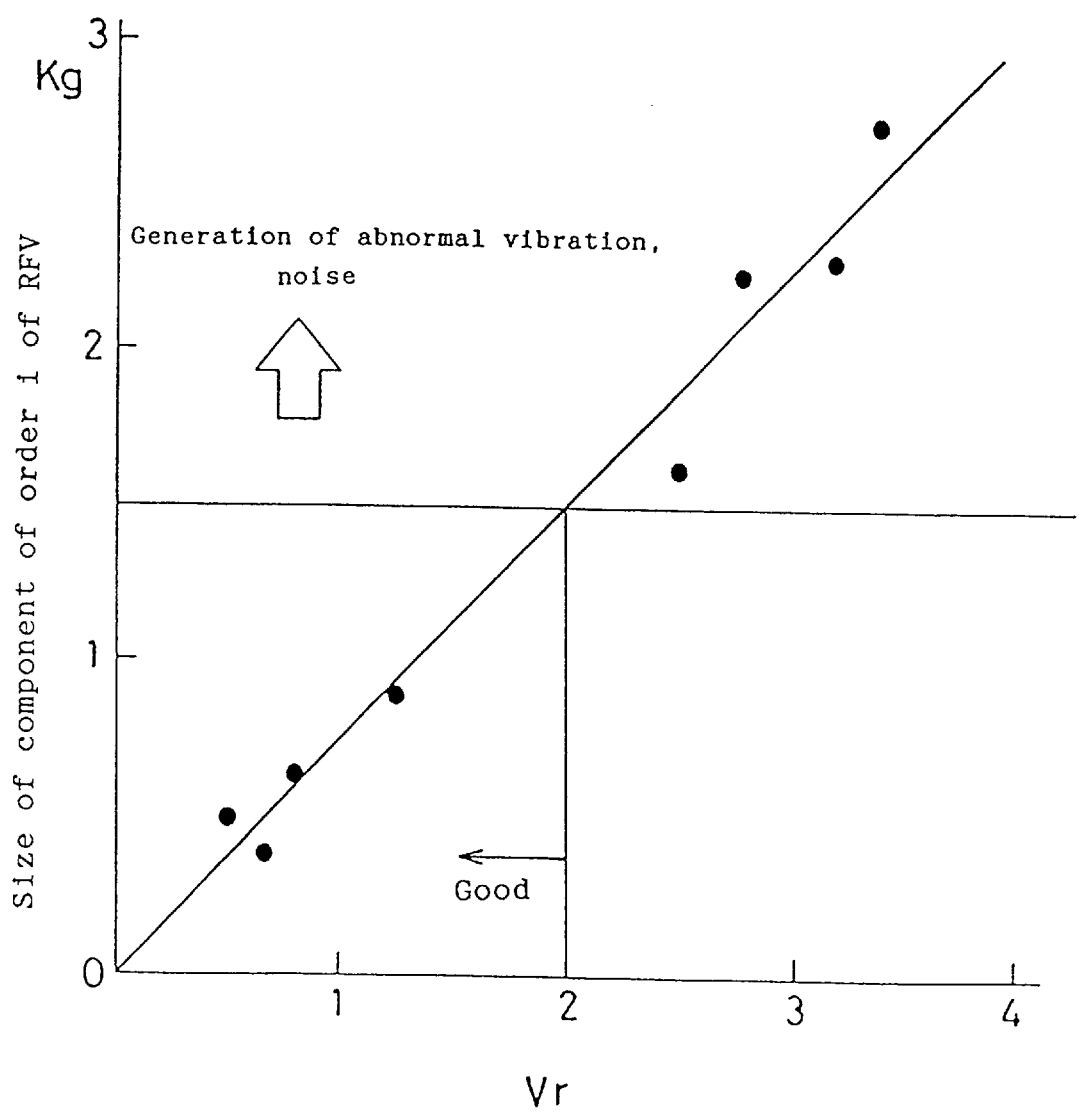
FIG. 38 is a diagram showing a relationship between the irregularity index Vr and r order component of RFV.

The irregularity index Vr indicate a degree of periodicity of r-th order component. As the irregularity index Vr is higher, a higher degree of periodicity of r-th order is indicated. As shown in FIG. 38, the irregularity index Vr and a degree of r-th order component of the RFV are positively correlated with each other. It was found that the irregularity index Vr should be 2 or less to prevent vibrations and noises caused by the RFV. It is preferably 1.7 or less, or more preferably 1.5 or less. Vr is not generally 0, but rather more than 0.

(43) Autocorrelation coefficient Ru

An autocorrelation coefficient Ru is a coefficient defined by Formula 30 in Table (formulae) in the specification. In Formula 30, A is determined in Formula 31 in Table (formulae).

In Formula 30, pitches of pattern composing units are represented by P1, P2, . . . Ps from the lowest, and integers 1, 2 . . . s are allocated to the pitches. A pitch sequence in an alignment of pattern composing units represented by such integers is defined as PQ(j). That is, if a pitch sequence of pattern composing units are P1, P1, P2, P3, P3 . . . , PQ(1)=1, PQ(2)=1, PQ(3)=2, PQ(4)=3, PQ(5)=3 . . . . A variable u represents an amount of offset of the pitch sequence PQ(J) from j.

In Formula 30, a numerator is a so-called autocorrelation function, and a denominator a normalized constant. An autocorrelation function is divided by a normalized constant, because a degree of irregularity of a period cannot be determined by a general autocorrelation function due to variation of amplitude.

The autocorrelation coefficient Ru is at 1, when a variation of pitch sequence is sinusoidal (having a complete periodicity), and an amount of offset u is consistent with a periodical duration. As the periodicity is reduced, irregularity is increased, and the amount of offset u is increased, Ru is closer to 0. It means that no correlation is present between pitches remote from each others and an alignment is irregular.

The autocorrelation coefficient Ru is distinguished by the maximum value Ru of Ru values obtained within a range of u>5. The inventors found that a pitch sequence of preferred degree of irregularity can be obtained by setting the maximum autocorrelation coefficient Ru within a range of u>5 at less than 0.5. More preferably, it should be ⅓ or less. The maximum value of Ru is 0 or more.

(44) Maximum dispersion coefficient PSDrmax

In the specifications a maximum dispersion coefficient PSDrmax is defined as a maximum value with an order r within a range of 150 or less out of values obtained by Formula 32 in Table (formulae). In Formula 32, Ar and Br are determined in Formulae 33 and 34 in Table (formulae).

CL represents an entire circumferential length of tire, and Xj a position of jth pitch.

Figure 39:
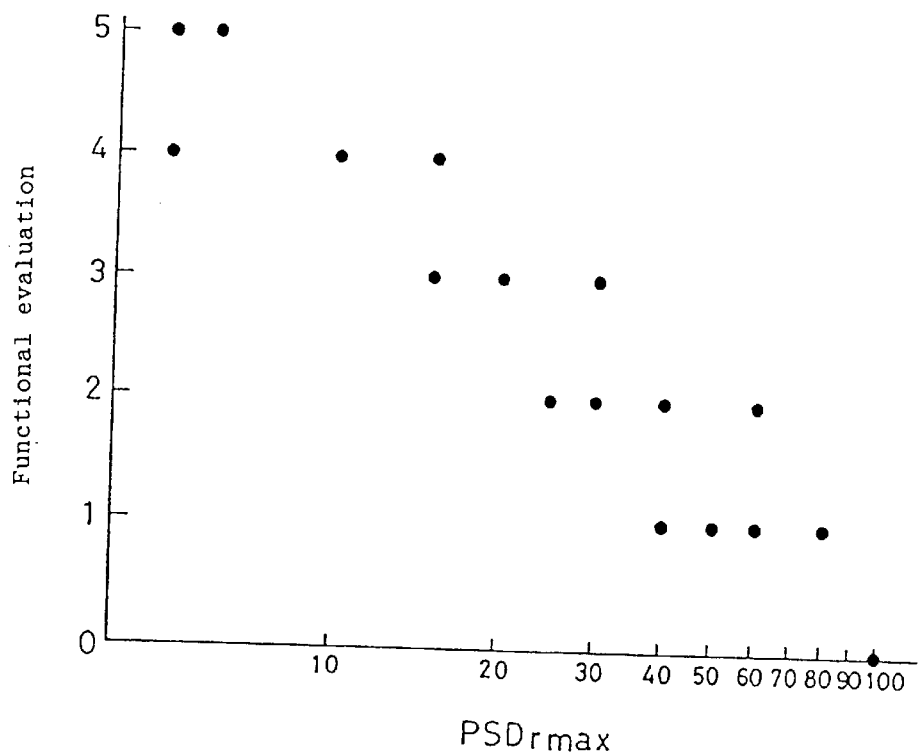
FIG. 39 is a diagram showing a result of functional evaluation of PSDrmax and pitch noise.

Dispersion (change to a white noise) of a pitch noise is related with the PSDrmax value obtained by order-analyzing a pitch sequence by means of Formula 32. As shown in FIG. 39, at a higher value of PSDrmax, dispersion of noises is poor, and noises come to be more similar to a pure sound, and the score (functional evaluation) of the functional test becomes poor.

On the other hand, PSDrmax depends on the ratio of the shortest pitch P1 and longest pitch Ps (Ps/P1), and the total number of pitches Np. Therefore, defining, for example, Ps/P1 in a range of 1.1 to 1.7 at 0.1 increments, and Rn (=Np/60) at 0.67. 1.17 and 1.67, the pitch sequence was determined in each combination by using the chaotic function.

Figure 40:
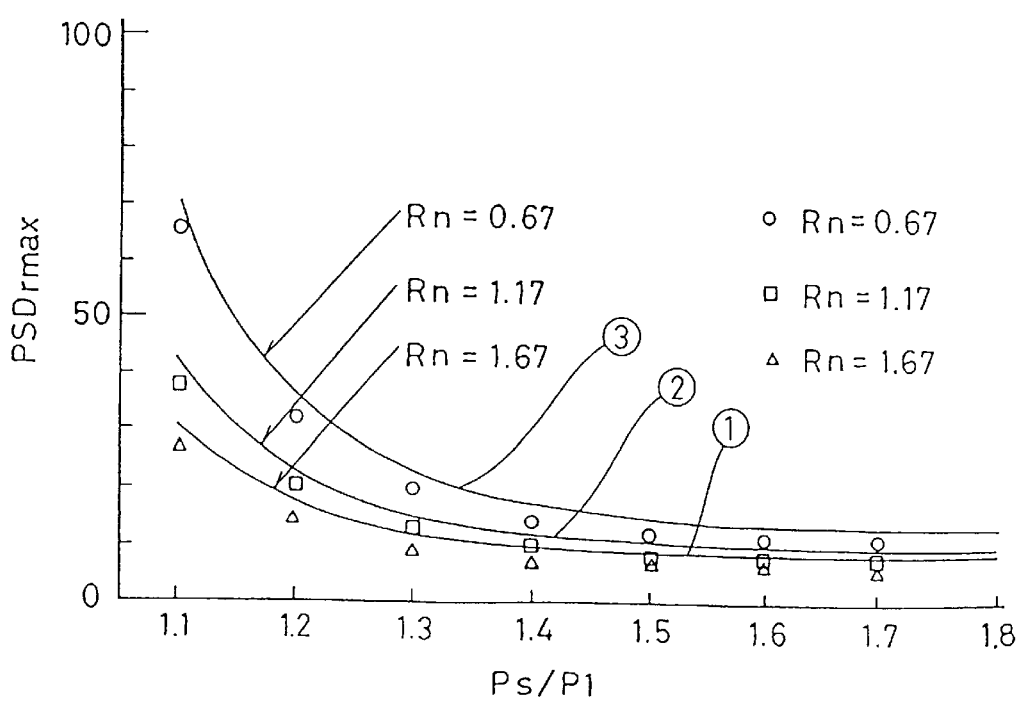
FIG. 40 is a diagram showing a minimum value of PSDrmax in the combination of Ps/P1 and RN.

In calculation, by computer processing, 50 pitch sequences were determined in each combination. From the pitch sequence, the PSDrmax was determined from Formula 32. Of the values of PSDrmax of 50 pitch sequences in each combination, the smallest value of PSDrmax is picked up in FIG. 40. FIG. 40 shows the obtained values and curves 1, 2, 3 providing each value with a preferable allowance range.

In the pitch sequence, verification of PSDrmax is to satisfy the following formula determined by referring to curves 1, 2, 3.

By this verification, depending on the combination, the pitch sequence of a relatively small PSDrmax is selected.

That is, concerning the given Ps/P1, Rn (=Np/60), PSDrmax is verified in the following formula.

$$PSDrmax \leq \{100/(Ps/P1)^{10}\} \times (1/Rn) + 5 \times \{(1/Rn)+1\}$$

where Rn is a dimensionless value of the total number of pitches Np, and, as stated above, Rn=Np/60.

(45) The ratio SQmax/Np between the number SQmax of pattern composing units of a same pitch disposed in sequence and the total number Np of pitches of pattern composing units in an alignment of pattern composing units should be 0.15 or less.

Figure 41:
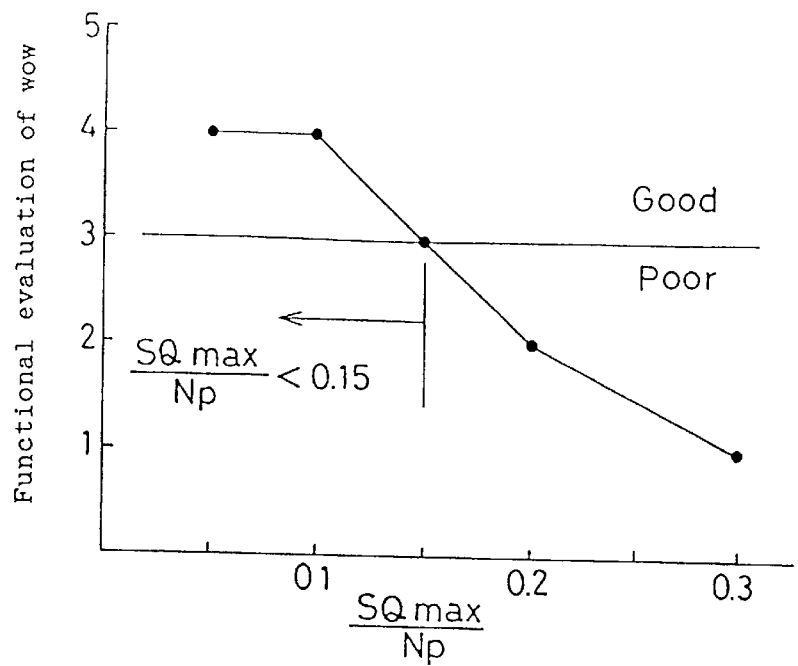
FIG. 41 is a diagram showing a result of functional evaluation of SQmax and wow noise.

It has already been noted that the lowest and highest pitches should be appropriately aligned in sequence. However, if identical pitches are disposed in an excessive sequence, an uncomfortable sound pulsating and sounding "wowowow", which is generally known as a wow sound, is caused. A relation between the wow sound and the ratio between the maximum value SQmax of a sequence of identical pitches and the number Np of pitches is shown in FIG. 41.

As the ratio SQmax/Np is increased, the wow sound is worse, the functional evaluation is thereby poorer, and it was found a range of SQmax/Np at 0.15 or less is preferable. SQmax/Np is more than 0.

(46) The ratio Rsp/Np between the total number Rsp (pitch individual coefficient) of pattern composing units of an identical pitch without continuous sequence and in individual disposed and the total number of pattern composing units aligned in the circumferential direction of tire is 0.1 or less in a mode of the third embodiment that the number s of pitch length is two.

The total number Rsp is, as described more detail, a sum of the total number (individual P1 pitch number) of pitches P1 of pattern composing units of pitch P1 without continuous 2 or more and in individual unit and the total number (individual P2 pitch number) of pitches P2 of pattern composing units of pitch P2 without continuous 2 or more and in individual unit.

In a mode of the third embodiment in which the number s of pitch length is two, if the ratio Rsp/Np is more than 0.1, many pattern composing units of individual pitch are generated, so the noise is tend to increase. Accordingly, individual pitch ratio Rsp/Np is 0.1 or less. The ratio is 0 or more, preferably 0.04 to 0.08.

(47) As described above, in a pneumatic tire according to the invention, an alignment (sequence) of pattern composing units is obtained according to a procedure below.

1. A sequence of numbers is produced by means of a chaotic function.
2. The sequence of numbers is converted to a pitch sequence of pattern composing units.
3. Adequacy of Vr, Ru, PSDrmax, SQmax/Np is confirmed (in a mode of the third embodiment that the number s of pitch length is two, the individual pitch ratio Rsp/Np is included), and verified.

Figure 43:
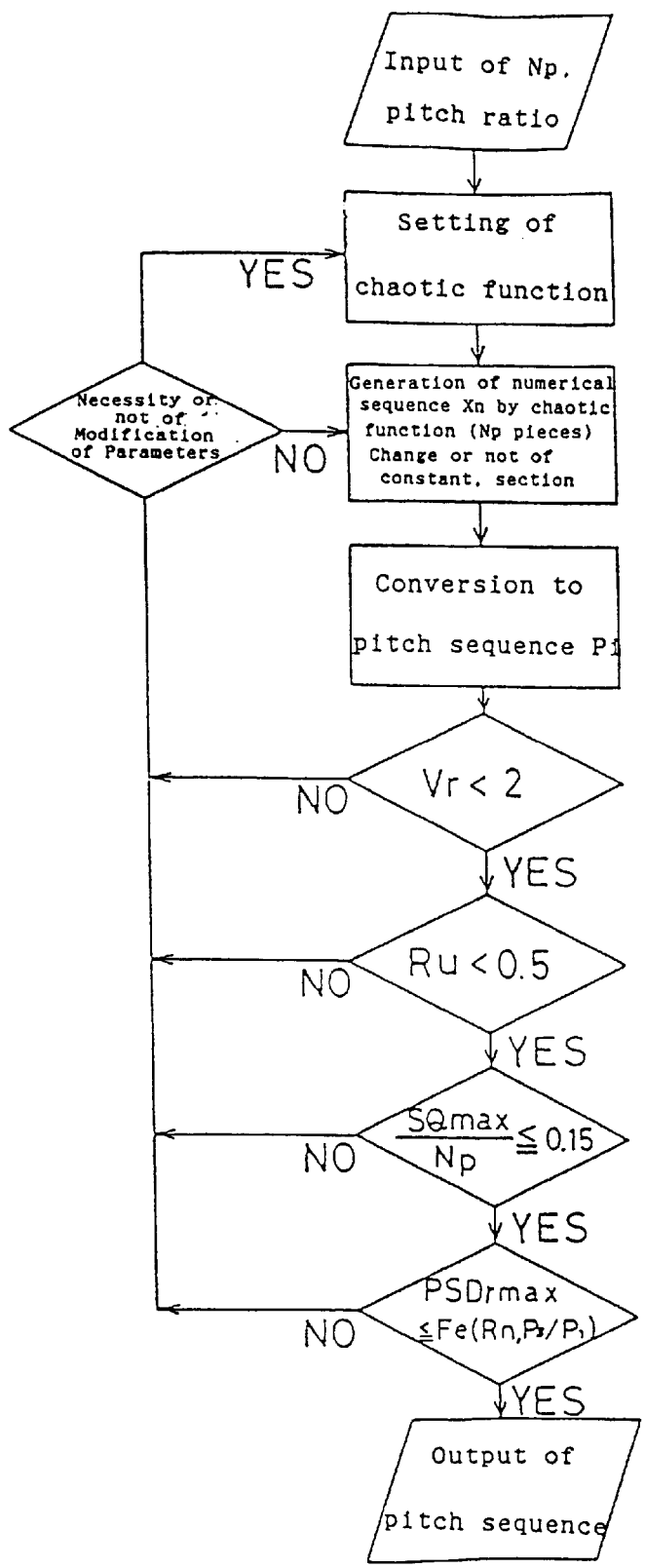
FIG. 43 is a flowchart of a computer program for obtaining a sequence of numbers.

If they are verified, and rejected in step 3, another sequence of numbers is produced by using a different initial value, and the process is repeated. Such procedure is automatically computed in repetition according to a flowchart of a program shown in FIG. 43 by using a computer in a mode of the first embodiment that a sequence of pattern composing units in order of pitch length is skipped more than one pitch, noting that in the second embodiment that none is skipped.

Figure 44:
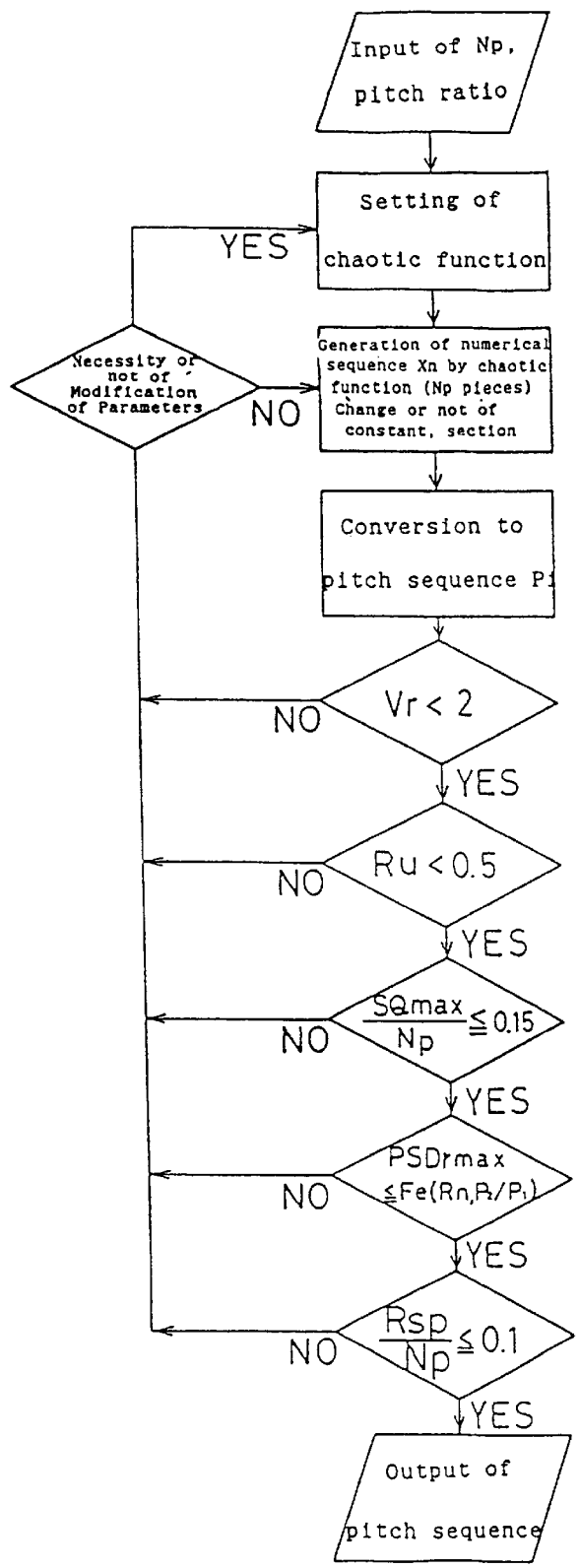
FIG. 44 is a flowchart of a computer program for obtaining a sequence of numbers when the pitch number s is two.

In a mode of the third embodiment that the number s of pitch length is two, Such procedure is automatically computed in repetition according to a flowchart of a program shown in FIG. 44 by using a computer.

(48) Preferably, computation is repeated such that the number of pattern composing units of each pitch is in consistent with an expected value. For example, in the case the number s of types of pitches is four, when such conditions are added that the total number Np of pattern composing units of an alignment of pattern composing units is 64, and the numbers Np1 to Np4 of pitches P1, P2, P3 and P4 are 16, computation is repeated until such conditions are fulfilled. In such case, the initial value may be sequentially changed. Also, the chaotic function and constant employed can be changed.

Further, in the embodiment, integral values are allocated to the sectioning lines K0 to Ks in conversion from a sequence of numbers to a pitch alignment, and all sections of the axes of abscissa and ordinate have an identical length. However, sections may be different in length such that both sections of the lowest and highest pitches are smaller or larger than others.

By such operation, for example, in the case the total number Np of pitches of an alignment of pattern composing units is 64, the number of pattern composing units for pitches P1, P2, P3, P4 can be adjusted to Np1=19, Np2=13, Np3=13, Np4=19, while the requirements of the invention are fulfilled. This corresponds to "Necessity or not of Modification of Parameters" in the program chart of FIG. 37. Values of K0 to Ks are set such that the number of pitches allocated can be most easily generated. For example, when the number s of types is three, if there are 21 pattern composing units for all pitches, K0=0, K1=1.13, K2=1.87, K3=3.0. On the contrary, the number of pattern composing units is 18, 27, 18, K0=0, K1=1.05, K2=1.95, K3=3.0.

An example is described below.

Figure 45:
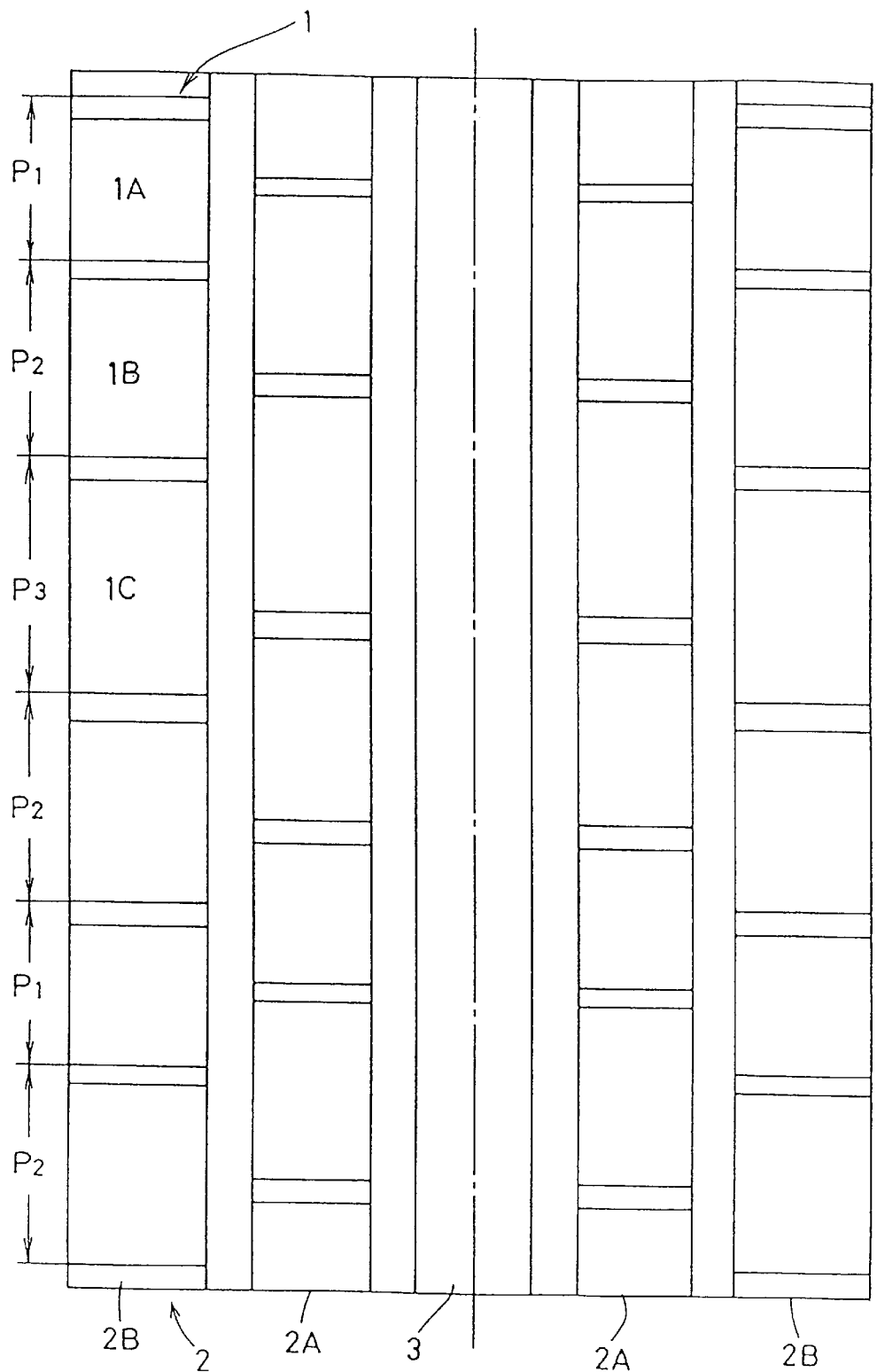
FIG. 45 is a plan view showing a tread pattern of an embodiment of the invention.

A pneumatic tire is provided with, as shown in FIG. 45, alignments (sequences) 2A, 2A, 2B, 2B (generally referred to as alignments (sequences) 2) of pattern composing units that comprise pattern composing units 1A, 1B, 1C (generally referred to as pattern composing units 1) ... of plural s types of different pitches that is a circumferential length aligned in the circumferential direction of tire in a tire tread and disposed symmetrically on both sides of a center rib 3 that passes tire's equator.

In the embodiment, the pattern composing units 1A, 1B, 1C ... are block patterns comprising blocks. However, they may be a rib pattern, lug pattern or a combination of them. In such case, a convex part of a staggered rib grooves a portion between lug grooves or the like forms a pattern composing unit 1. A pneumatic tire can also be arranged as a radial tires bias tire, tire for a passenger car, trucks buss and motorcycle and the like.

In a block pattern shown in FIG. 45, according to the embodiment, alignments (sequences) 2A, 2A and 2B, 2B of pattern composing units are identical in the total number and alignment (sequence) of pattern composing units, and different from each other only in phase. However, they may be identical in the total number of pattern composing units in the circumferential direction and different in alignment of the pattern composing units.

Figure 46:
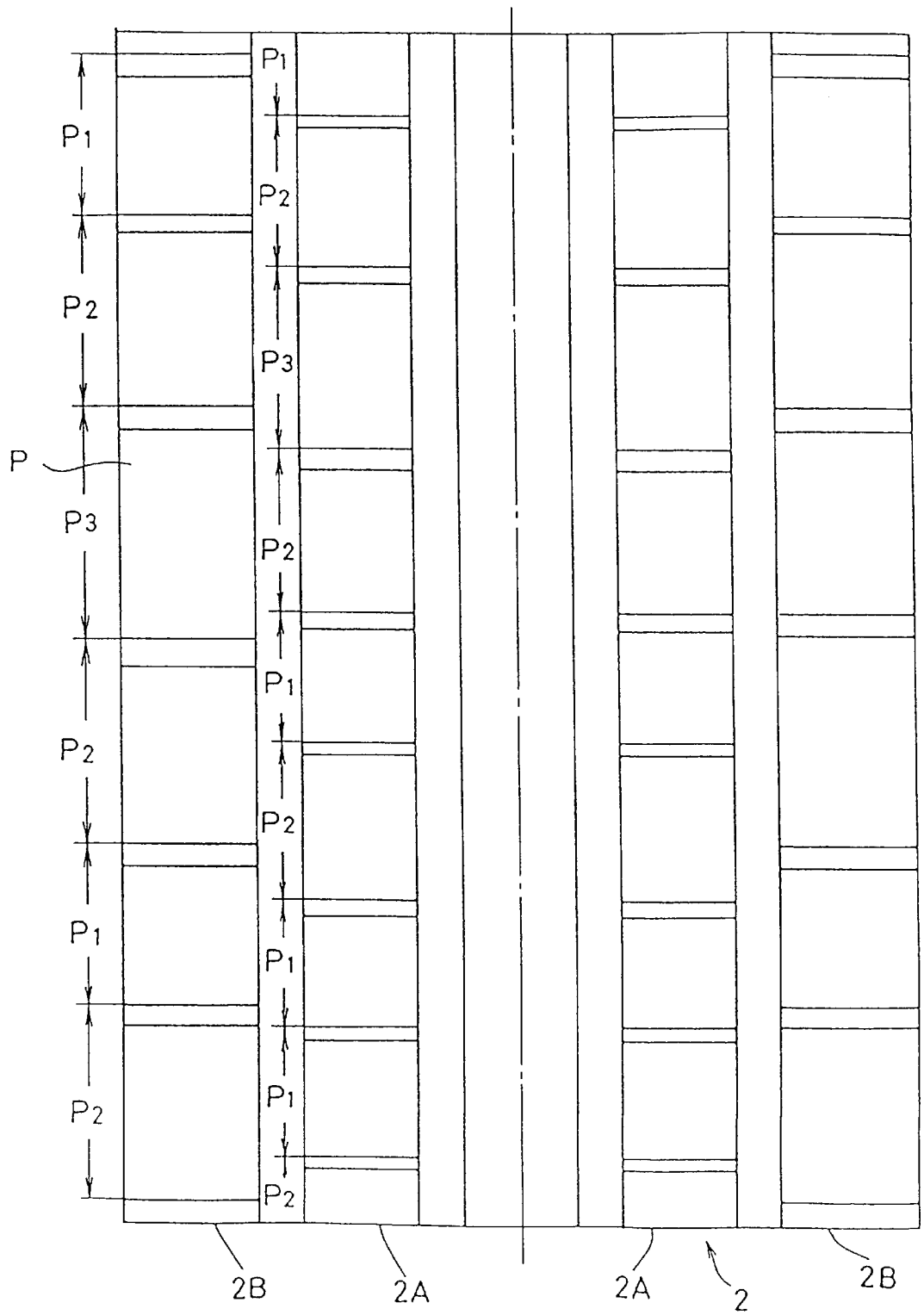
FIG. 46 is a plan view showing a tread pattern of another embodiment of the invention.

Further, as shown in FIG. 46, the alignments (sequences) 2A, 2A and 2B, 2B may be different in the total number of pattern composing units in the circumferential direction of tire. The alignments (sequences) 2 of pattern composing units can also be changed freely between three and seven, and is calculated by the computer.

A pitch is a length of pattern composing unit 1 in the circumferential direction of tires and is defined, in the case of a block pattern, as a sum of lengths of the block and one of the lateral groove.

Embodiment 1

1) Regarding the invention according to the first embodiment, a prototype of radial tire of 205/65R15 in size was produced, and tested. Alignments 2A, 2A and 2B, 2B of pattern composing units shown in FIG. 45 were identical in the number and alignment of the pattern composing units, and different from each other only in phase by about ⅓ of mean pitch. Specifications are shown in Tables 3 to 5. Comparison examples 1, 2 shown in Table 6 were verified for the irregularity index Vr, autocorrelation coefficient Ru, maximum dispersion coefficient PSDrmax and SQmax/Np, RFV was order-analyzed, and a pitch sound was functionally evaluated. A result is comprehensively shown in Table 2 to 6 (pattern composing units and pitches are shown in the Tables).

By way of precaution, a prototype of tire having a tread pattern shown in FIG. 3 of Japanese Patent Publication No. 58-2844 (Japanese Laid-open Patent No. 55-8904) was produced with specifications identical with those of the tire, and a result of similar functional evaluation and verifications is shown in Comparison example 3 of Table 6. A tire according to an invention described in Japanese Patent Publication No. 3-23366 (Japanese Laid-open Patent No. 54-115801) is shown as Comparison example 4 in Table 6.

By the repetitive computation using a computer programs pitch sequences of Comparison 3 shown in FIG. 3 of Japanese Patent Publication No. 58-2844 (Japanese Laid-open Patent No. 55-8904) and Comparison 4 according to an invention described in Japanese Patent Publication No. 3-23366 (Japanese Laid-open Patent No. 54-115801) were not produced. In the tire of Comparison example 3, Vr was as high as 2.46, the third order component of RFV was thereby 1.92 kg, a degree of irregularity was low, and Ru was also as much as 0.76. Comparison example 4 is unpreferable in that Vr is as high as 2.16, and the fifth order component of RFV is, therefore, as high as 1.72 kg.

Thus, a pneumatic tire according to the invention can be distinguished from conventional tires by a tread pattern.

2) Prototypes of tire having a same size and alignments 2A, 2A and 2B, 2B of pattern composing units identical with that of (1) in the total number of pattern composing units in the circumferential direction of tire and different therefrom only in alignment were produced, and a result of similar test is shown in Table 7.

3) Moreover, a prototype of tire having alignments 2A, 2A and 2B, 2B of pattern composing units in FIG. 46 different in the total number of pattern composing units in the circumferential direction of tire was produced, and a result of similar test is shown in Table 8.

All tires according to the embodiment are not high in a specific order of RFV, and show a preferable result of functional evaluation of a pitch sound.

The functional evaluations were conducted by mounting a tire of the size on a FR vehicle of 2.5 liter, and using it at an air pressure of 200 kPa. For a functional evaluation of in-vehicle noise, the five point method was employed, and 3 or a higher score shows a preferable level. The tires were evaluated by stopping the engine at 100 kph, and coasting the vehicle. Measurement of RFV was conducted according to JASO C607.

Embodiment 2

1) Regarding the invention of the second embodiment, a prototype of radial tire of 205/65R15 in size was produced, and tested. Alignments 2A, 2A and 2B, 2B of pattern composing units shown were identical in the number and alignment of the pattern composing units, as shown in FIG. 45, and different from each other only in phase by about ⅓ of mean pitch. Specifications are shown in Tables 9 and 10. The irregularity index Vr, autocorrelation coefficient Ru, maximum dispersion coefficient PSDrmax and SQmax/Np were verified, RFV was order-analyzed, and a pitch noise was functionally evaluated. A result is comprehensively shown in the Tables (pattern composing units are shown as pitches in the Tables).

By the repetitive computation using a computer program, pitch sequences of Comparison 3 shown in FIG. 3 of Japanese Patent Publication No. 58-2844 (Japanese Laid-open Patent No. 55-8904) and Comparison 4 according to an invention described in Japanese Patent Publication No. 3-23366 (Japanese Laid-open Patent No. 54-115801) were not produced in the embodiment.

2) Prototypes of tire having a same size and alignments 2A, 2A and 2B, 2B of pattern composing units identical with that of (1) in the total number of pattern composing units in the circumferential direction of tire and different therefrom only in alignment were produced, and a result of similar test is shown in Table 11.

3) Moreover, a prototype of tire having alignments 2A, 2A and 2B, 2B of pattern composing units of FIG. 46 different in the total number of pattern composing units in the circumferential direction of tire was produced, and a result of similar test is shown in Table 12.

All tires according to the embodiment are not high in a specific order of RFV, and show a preferable result of functional evaluation of a pitch sound.

Embodiment 3

Figure 47:
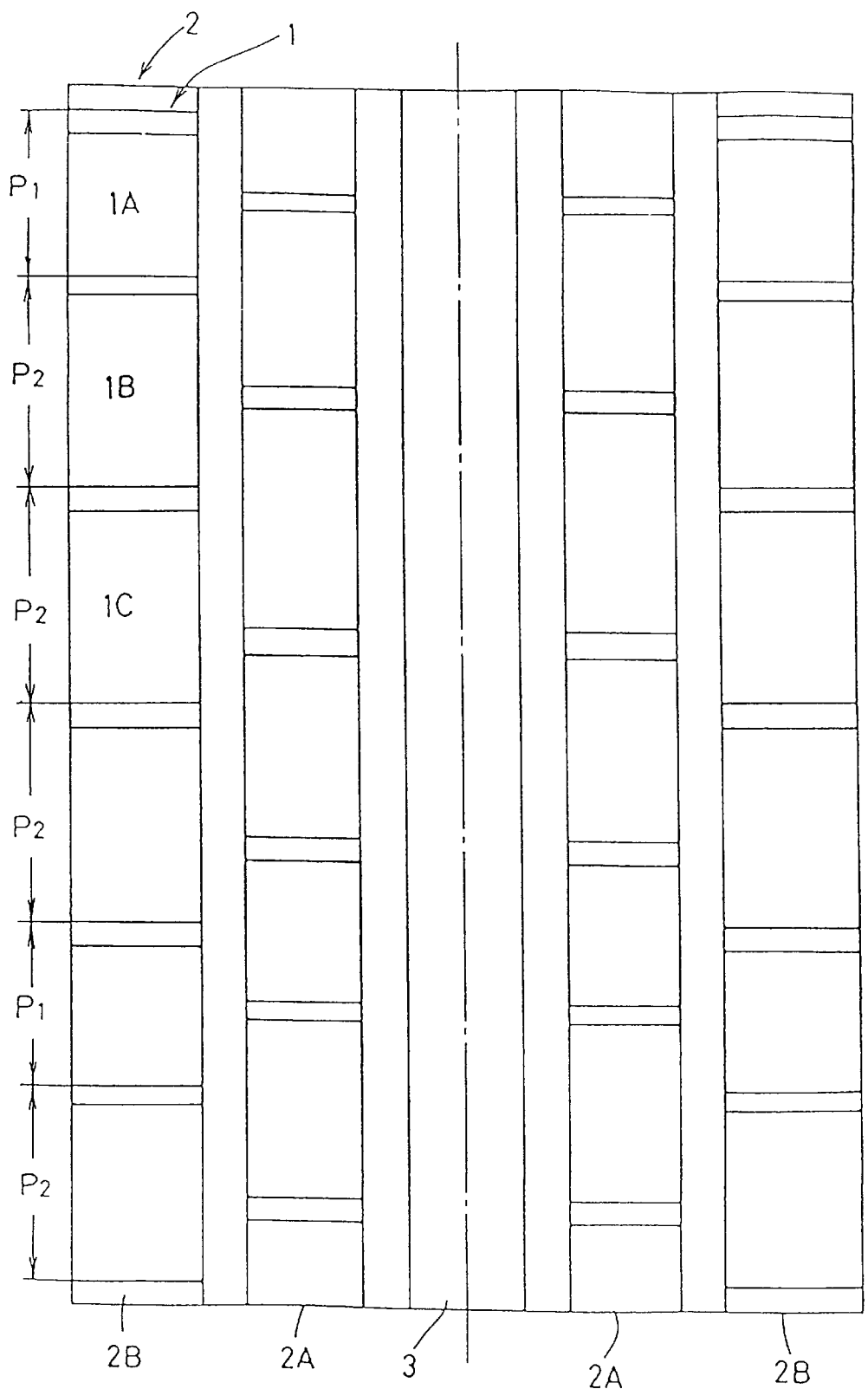
FIG. 47 is a plan view showing a tread pattern of the embodiment when the pitch number s is two.

1) Regarding the invention of the third embodiment, a prototype of radial tire of 205/65R15 in size was produced, and tested. Alignments 2A, 2A and 2B, 2B of pattern composing units shown in FIG. 47 were identical in the number and alignment of the pattern composing units, and different from each other only in phase by about ⅓ of mean pitch. Specifications are shown in Table 13. It was verified for the irregularity index Vr, autocorrelation coefficient Ru, maximum dispersion coefficient PSDrmax and SQmax/Np, RFV was order-analyzed, and a pitch sound was functionally evaluated. A result is shown in Table.

2) By way of precaution, a prototype of tire having a tread pattern shown in FIG. 3 of Japanese Laid-open Patent No. 4-363234 was produced with specifications identical with those of the tire, and a result of similar functional evaluation and verifications is shown in Comparison example 1-1 of Table 14. A tire according to an invention described in above Patent is shown as Comparison example 1-2. As Comparison 2-1, FIG. 4 of Japanese Laid-open Patent No. 50-20402, and as Comparison 2-2, FIG. 9 of above Patent.

Test results are same as above embodiments.

In Tables 13 and 14, (Fe) in PSDrmax is a value as Fe from formula $\{100/(Ps/P1)^{10}\}\times(1/Rn)+5\times\{(1/Rn)+1\}$.

3) Embodiments 1 and 2 in Table 13 use approximately the same pitch ratio as Comparison 1-1 to 2-2 in Table 14, functional test results of pitch sound is improved. The pitch ratio of embodiments 3 and 4 in Table 13 are as small as 1:111, and the results of the functional tests of the pitch sound are poor but relatively maintained in good level.

TABLE 1

| * | Case | Pitch condition | Possibility of pitch change |
|---|---|---|---|
| 3 | 1 | P3/P1 ≦ 1.5 | P1→P1, P2, P3 P2→P1, P2, P3 P3→P1, P2, P3 |
| 4 | 1 | P4/P2 ≦ 1.5 | P1→P1, P2 P3→P1, P2, P3, P4 |
|   |   | P3/P1 ≦ 1.5 | P2→P1, P2, P3, P4 P4→P3, P4 |
|   | 2 | P3/P1 ≦ 1.5 | P1→P1, P2, P3 P3→P2, P3, P4 |
|   |   | P4/P2 ≦ 1.5 | P2→P1, P2, P3, P4→P2, P3, P4 |
|   | 3 | P3/P1 ≦ 1.5 | P1→P1, P2, P3 P3→P1, P2, P3, P4 |
|   |   | P4/P2 ≦ 1.5 | P2→P1, P2, P3, P4 P4→P2, P3, P4 |
|   | 4 | P4/P1 ≦ 1.5 | P1→P1, P2, P3, P4 P3→P1, P2, P3, P4 |
|   |   |   | P2→P1, P2, P3, P4 P4→P1, P2, P3, P4 |
| 5 | 1 | P4/P2 ≦ 1.5 | P1→P1, P2 P3→P2, P5→P4, P5, |
|   |   |   | P2→P1, P2, P3, P4 P4→P1, P2, P3, P5 |
|   | 2 | P3/P1 ≦ 1.5 | P1→P1, P2, P3 P3→P2, P3, P4 P4→P3, P4, P5 |
|   |   | P5/P3 ≦ 1.5 | P2→P1, P2, P3 P5→P3, P4, P5 |
|   | 3 | P3/P1 ≦ 1.5 | P1→P1, P2 P2→P1, P2, P3 P5→P4, P5 |
|   |   | P5/P3 ≦ 1.5 | P3→P1, P2, P3, P4, P5 P4→P3, P4, P5 |
|   | 4 | P3/P1 ≦ 1.5 | P1→P1, P2, P3 P3→P2, P3, P4 P5→P3, P4, P5 |
|   |   | P4/P2 ≦ 1.5 |   |
|   |   | P5/P3 ≦ 1.5 | P2→P1, P2, P3, P4 P4→P2, P3, P4, P5 |
|   | 5 | P4/P2 ≦ 1.5 | P1→P1, P2 P2→P1, P2, P3, P4 P5→P4, P5 |
|   |   | P3/P1 ≦ 1.5 |   |
|   |   | P5/P3 ≦ 1.5 | P3→P1, P2, P3, P4, P5 P4→P2, P3, P4, P5 |
|   | 6 | P3/P1 ≦ 1.5 | P1→P1, P2, P3 P2→P1, P2, P3 P4→P1, P2, P3 |
|   |   | P5/P3 ≦ 1.5 | P3→P1, P2, P3, P4, P5 P5→P1, P2, P3 |
|   | 7 | P3/P1 ≦ 1.5 | P1→P1, P2, P3 P2→P1, P2, P3, P4 P5→P3, P4, P5 |
|   |   | P4/P2 ≦ 1.5 |   |
|   |   | P5/P3 ≦ 1.5 | P3→P1, P2, P3, P4, P5 P4→P2, P3, P4, P5 |

TABLE 1-continued

| * Case | Pitch condition | Possibility of pitch change |
|---|---|---|
| 8 | P5/P2 ≦ 1.5<br>P4/P1 ≦ 1.5 | P1→P1, P2 P3→P2, P3, P4 P5→P4, P5<br>P2→P1, P2, P3, P4, P5 P4→P1, P2, P3, P4, P5 |
| 9 | P4/P1 ≦ 1.5 | P1→P1, P2, P3, P4 P5→P2, P3, P4, P5<br>P2→P1, P2, P3 P3→P2, P3, P4 P4→P3, P4, P5 |
| 10 | P4/P1 ≦ 1.5<br>P5/P2 ≦ 1.5 | P1→P1, P2, P3, P4 P3→P2, P3, P4 P5→P2, P3, P4, P5<br>P2→P1, P2, P3, P4, P5 P4→P1, P2, P3, P4, P5 |
| 11 | P5/P2 ≦ 1.5<br>P4/P1 ≦ 1.5 | P1→P1, P2 P3→P1, P2, P3, P4, P5 P5→P4, P5<br>P2→P1, P2, P3, P4, P5 P4→P1, P2, P3, P4, P5 |
| 12 | P4/P1 ≦ 1.5<br>P5/P2 ≦ 1.5 | P1→P1, P2, P3, P4 P2→P1, P2, P3 P4→P3, P4, P5<br>P3→P1, P2, P3, P4, P5 P5→P2, P3, P4, P5 |
| 13 | P5/P2 ≦ 1.5<br>P4/P1 ≦ 1.5 | P1→P1, P2, P3 P2→P1, P2, P3, P4, P5 P5→P3, P4, P5<br>P3→P1, P2, P3, P4, P5 P4→P1, P2, P3, P4, P5 |
| 14 | P4/P1 ≦ 1.5<br>P5/P2 ≦ 1.5 | P1→P1, P2, P3, P4 P2→P1, P2, P3, P4, P5<br>P3→P1, P2, P3, P4, P5 P4→P1, P2, P3, P4, P5<br>P5→P1, P2, P3, P4, P5 |

*Pattern composing unit

TABLE 2

| VF order | Vibration, noise problem |
|---|---|
| order 1 | Shimmy, |
| order 2 | Shake |
| order 3 | Low frequency |
| order 4 | dark noise |
| order 5 | |
| order 6 | Beat noise |
| order 7 | |
| order 8 | |
| order 9 and above | No problem |

TABLE 3

| | No. of pitches | No. of types | Pitch ratio (dimensionless) | Chaotic function Type | Z | Absolute value of ε | | Pitch sequence |
|---|---|---|---|---|---|---|---|---|
| Embodiment 1 | 63 | 3 | P1 0.81<br>P2 1.013<br>P3 1.215 | Formula 3, 4, 5<br>3 Pitch Case 1 | Z1 1.1<br>Z2 3.0 | ε 1 0.15 | P3<br>P1 | ooo  ooo o oo  oo   o oooo    o  o o<br>                oo ooo  o oo o  oo o   o oo oooo o  o<br>oooooo       ooooo   o ooooo    o ooo o    o |
| Embodiment 2 | 80 | 4 | P1 0.796<br>P2 0.937<br>P3 1.077<br>P4 1.218 | Formula 3, 4, 5<br>4 Pitch Cace 1 | Z1 1.15<br>Z2 3.0 | ε 1 0.15 | P4<br>P1 | o  o      ooo  o o oo    o    o o    ooo o   o   oo<br>   o  o         o  o o o     ooo o  oooo     o  oo o     o<br>      oo  o  oo o      o      o  o o  o       o o oo oo<br>o    ooo  oo    o       ooooo    oo       ooooo      o    o    o |

| | | Check item | | | | Functional | Order number of |
|---|---|---|---|---|---|---|---|
| | | Vr | Ru max | PSD u max | SQmax Np | evaluation of pitch sound | analysis result RFV |
| Embodiment 1 | Order 3 | 0.26 | 7.26 | 0.10 | | 4.0 | Order 3 |
| | 1.13 | | | | | | 0.83 |
| | Order 4 | | | | | | Order 4 |
| | 1.46 | | | | | | 0.87 |
| | Order 5 | | | | | | Order 5 |
| | 1.18 | | | | | | 0.74 |
| | Order 6 | | | | | | Order 6 |

TABLE 3-continued

|  |  |  |  |  |  |  |
|---|---|---|---|---|---|---|
|  |  |  | 0.88 |  |  | 0.39 |
|  |  |  | Order 7 |  |  | Order 7 |
|  |  |  | 1.33 |  |  | 0.54 |
|  |  |  | Order 8 |  |  | Order 8 |
|  |  |  | 0.95 |  |  | 0.21 |
|  | Embodiment 2 | Order 3 | 0.31 | 8.08 | 0.06 | 4.0 | Order 3 |
|  |  | 0.53 |  |  |  | 0.66 |
|  |  | Order 4 |  |  |  | Order 4 |
|  |  | 1.37 |  |  |  | 0.73 |
|  |  | Order 5 |  |  |  | Order 5 |
|  |  | 0.49 |  |  |  | 0.27 |
|  |  | Order 6 |  |  |  | Order 6 |
|  |  | 0.73 |  |  |  | 0.48 |
|  |  | Order 7 |  |  |  | Order 7 |
|  |  | 1.41 |  |  |  | 0.53 |
|  |  | Order 8 |  |  |  | Order 8 |
|  |  | 1.50 |  |  |  | 0.58 |

TABLE 4

|  | No. of pitches | No. of types | Pitch ratio (dimensionless) | Chaotic function Type | Z | Absolute value of ε | Pitch sequence |
|---|---|---|---|---|---|---|---|
| Embodiment 3 | 100 | 5 | P1 0.744<br>P2 0.868<br>P3 0.993<br>P4 1.117<br>P5 1.241 | Formula 3, 4, 5<br>5 Pitch<br>Case 1 | Z1 1.08<br>Z2 3.0<br>Z3 3.0 | ε 1 0.10<br>ε 2 0.10 | P5 ... P1 ... (pattern) |
| Embodiment 4 | 100 | 5 | P1 0.747<br>P2 0.872<br>P3 0.996<br>P4 1.121<br>P5 1.245 | Formula 3, 4, 5<br>5 Pitch<br>Case 2 | Z1 1.1<br>Z2 4.0<br>Z3 4.0 | ε 1 0.10<br>ε 2 0.10 | P5 ... P1 ... (pattern) |
| Embodiment 5 | 80 | 4 | P1 0.797<br>P2 0.937<br>P3 1.057<br>P4 1.196 | Formula 3, 4, 5<br>4 Pitch<br>Case 4 | Z1 1.08<br>Z2 2.0 | ε 1 0.10 | P4 ... P1 ... (pattern) |
| Embodiment 6 | 60 | 5 | P1 0.786<br>P2 0.897<br>P3 1.008<br>P4 1.119<br>P5 1.250 | Formula 3, 4, 5<br>5 Pitch<br>η-2 8 | Z1 1.15<br>Z2 3.0<br>Z3 3.0 | ε 1 0.2<br>ε 2 0.2 | P5 ... P1 ... (pattern) |

|  |  | Check item |  |  |  |  |  |
|---|---|---|---|---|---|---|---|
|  |  | Vr | Ru max | PSD u max | SQmax Np | Functional evaluation of pitch sound | Order number of analysis result RFV |
|  | Embodiment 3 | Order 3<br>0.53<br>Order 4<br>1.20<br>Order 2<br>1.61 | 0.25 | 4.93 | 0.05 | 4.0 | Order 3<br>0.63<br>Order 4<br>0.74<br>Order 5<br>0.61 |

TABLE 4-continued

| | | | | | | | |
|---|---|---|---|---|---|---|---|
| | | Order 6 1.59 | | | | | Order 6 0.52 |
| | | Order 7 1.03 | | | | | Order 7 0.48 |
| | | Order 8 0.74 | | | | | Order 8 0.12 |
| | Embodiment 4 | Order 3 0.80 | 0.38 | 6.46 | 0.04 | 4.0 | Order 3 0.29 |
| | | Order 4 0.66 | | | | | Order 4 0.45 |
| | | Order 5 0.76 | | | | | Order 5 0.38 |
| | | Order 6 0.13 | | | | | Order 6 0.30 |
| | | Order 7 1.30 | | | | | Order 7 0.48 |
| | | Order 8 0.89 | | | | | Order 8 0.33 |
| | Embodiment 5 | Order 3 0.64 | 0.25 | 11.05 | 0.08 | 4.0 | Order 3 0.83 |
| | | Order 4 0.80 | | | | | Order 4 0.69 |
| | | Order 5 1.48 | | | | | Order 5 0.71 |
| | | Order 6 0.81 | | | | | Order 6 0.34 |
| | | Order 7 0.63 | | | | | Order 7 0.25 |
| | | Order 8 0.57 | | | | | Order 8 0.20 |
| | Embodiment 6 | Order 3 0.99 | 0.28 | 7.22 | 0.13 | 4.0 | Order 3 0.71 |
| | | Order 4 1.25 | | | | | Order 4 0.75 |
| | | Order 5 0.69 | | | | | Order 5 0.38 |
| | | Order 6 1.68 | | | | | Order 6 0.59 |
| | | Order 7 1.85 | | | | | Order 7 0.34 |
| | | Order 8 1.42 | | | | | Order 8 0.47 |

TABLE 5

| | No. of pitches | No. of types | Pitch ratio (dimensionless) | Chaotic function Type | Z | Absolute value of $\epsilon$ | Pitch sequence | |
|---|---|---|---|---|---|---|---|---|
| Embodiment 7 | 100 | 5 | P1 0.756 P2 0.882 P3 1.008 P4 1.134 P5 1.260 | Formula 3, 4, 5 5 Pitch Case 5 | Z1 1.06 Z2 5.0 Z3 5.0 | $\epsilon$ 1 0.08 $\epsilon$ 2 0.08 | P5 P1 | (pitch sequence pattern) |
| Embodiment 8 | 80 | 5 | P1 0.705 P2 0.856 P3 1.008 P4 1.159 P5 1.310 | Formula 3, 4, 5 5 Pitch Case 3 | Z1 1.08 Z2 4.0 Z3 4.0 | $\epsilon$ 1 0.10 $\epsilon$ 2 0.10 | P5 P1 | (pitch sequence pattern) |
| Embodiment 9 | 60 | 5 | P1 0.748 P2 0.873 P3 0.998 | Formula 3, 4, 5 5 Pitch Case 7 | Z1 1.08 Z2 4.0 Z2 4.0 | $\epsilon$ 1 0.1 $\epsilon$ 2 0.2 | P5 P1 | (pitch sequence pattern) |

TABLE 5-continued

| | | | | | | | | | | | |
|---|---|---|---|---|---|---|---|---|---|---|---|
| | | | P4 1.123 P5 1.247 | | | | | | | | |
| Embodiment 10 | 52 | 4 | P1 0.780 P2 0.918 P3 1.056 P4 1.193 | Formula 3, 4, 5 4 Pitch Case 3 | Z1 1.08 Z2 5.0 | ε 1 0.1 | P4 P1 | o  oo  o  ooo  oo    o  o  ooo<br>o  ooo  oo  o  o  ooo    oo  o  o<br>ooo    o  oo  oo  oo  o<br>o  ooo  o    ooooo  o  o | | | |

| | | Check item | | | | Functional | Order number of |
|---|---|---|---|---|---|---|---|
| | | Vr | Ru max | PSD u max | SQmax Np | evaluation of pitch sound | analysis result RFV |
| | Embodiment 7 | Order 3 0.73 | 0.23 | 6.12 | 0.07 | 4.0 | Order 3 0.82 |
| | | Order 4 0.49 | | | | | Order 4 0.58 |
| | | Order 5 1.10 | | | | | Order 5 0.43 |
| | | Order 6 1.37 | | | | | Order 6 0.45 |
| | | Order 7 0.61 | | | | | Order 7 0.26 |
| | | Order 8 0.71 | | | | | Order 8 0.19 |
| | Embodiment 8 | Order 3 1.65 | 0.12 | 7.34 | 0.10 | 4.0 | Order 3 0.68 |
| | | Order 4 0.96 | | | | | Order 4 0.39 |
| | | Order 5 1.42 | | | | | Order 5 0.43 |
| | | Order 6 1.72 | | | | | Order 6 0.51 |
| | | Order 7 1.81 | | | | | Order 7 0.46 |
| | | Order 8 0.45 | | | | | Order 8 0.23 |
| | Embodiment 9 | Order 3 0.35 | 0.25 | 10.36 | 0.08 | 4.0 | Order 3 0.33 |
| | | Order 4 0.96 | | | | | Order 4 0.42 |
| | | Order 5 1.14 | | | | | Order 5 0.39 |
| | | Order 6 1.29 | | | | | Order 6 0.51 |
| | | Order 7 1.78 | | | | | Order 7 0.62 |
| | | Order 8 0.53 | | | | | Order 8 0.18 |
| | Embodiment 10 | Order 3 0.67 | 0.32 | 11.06 | 0.10 | 4.0 | Order 3 0.66 |
| | | Order 4 0.62 | | | | | Order 4 0.29 |
| | | Order 5 1.90 | | | | | Order 5 0.84 |
| | | Order 6 0.35 | | | | | Order 6 0.23 |
| | | Order 7 1.12 | | | | | Order 7 0.45 |
| | | Order 8 0.63 | | | | | Order 8 0.18 |

TABLE 6

| | No. of pitches | No. of types | Pitch ratio (dimensionless) | Chaotic function Type | Z | Absolute value of ε | Pitch sequence | |
|---|---|---|---|---|---|---|---|---|
| Comparison example 1 | 72 | 3 | P1 0.80<br>P2 1.00<br>P3 1.20 | — | — | — | P3<br>P1 | (pitch sequence pattern) |
| Comparison example 2 | 100 | 5 | P1 0.753<br>P2 0.878<br>P3 1.004<br>P4 1.129<br>P5 1.255 | — | — | — | P5<br><br>P1 | (pitch sequence pattern) |
| Comparison example 3 | 72 | 3 | P1 0.806<br>P2 0.995<br>P3 1.184 | — | — | — | P3<br>P1 | (pitch sequence pattern) |
| Comparison example 4 | 60 | 3 | P1 0.80<br>P2 1.00<br>P3 1.20 | — | — | — | P3<br>P1 | (pitch sequence pattern) |

| | | Check item | | | | Functional evaluation of pitch sound | Order number of analysis result RFV |
|---|---|---|---|---|---|---|---|
| | | Vr | Ru max | PSD u max | SQmax Np | | |
| Comparison example 1 | | Order 3 2.82<br>Order 4 0.71<br>Order 5 0.32<br>Order 6 0.37<br>Order 7 0.24<br>Order 8 0.20 | 0.714 | 11.22 | 0.139 | 3.0 | Order 3 2.26<br>Order 4 0.96<br>Order 5 0.61<br>Order 6 0.38<br>Order 7 0.16<br>Order 8 0.10 |
| Comparison example 2 | | Order 3 0.68<br>Order 4 3.29<br>Order 5 0.06<br>Order 6 0.64<br>Order 7 0.58<br>Order 8 0.20 | 0.709 | 3.86 | 0.07 | 3.5 | Order 3 0.95<br>Order 4 2.78<br>Order 5 0.14<br>Order 6 0.28<br>Order 7 0.33<br>Order 8 0.11 |
| Comparison example 3 | | Order 3 2.46<br>Order 4 0.37<br>Order 5 0.18<br>Order 6 0.16<br>Order 7 0.21<br>Order 8 0.32 | 0.76 | 13.6 | 0.11 | 3.0 | Order 3 1.92<br>Order 4 0.88<br>Order 5 0.23<br>Order 6 0.31<br>Order 7 0.15<br>Order 8 0.19 |
| Comparison example 4 | | Order 3 0.24 | 0.44 | 12.61 | 0.07 | 3.0 | Order 3 0.79 |

TABLE 6-continued

|  |  |
|---|---|
| Order 4 | Order 4 |
| 1.40 | 0.79 |
| Order 5 | Order 5 |
| 2.16 | 1.72 |
| Order 6 | Order 6 |
| 1.13 | 0.56 |
| Order 7 | Order 7 |
| 0.97 | 0.43 |
| Order 8 | Order 8 |
| 0.18 | 0.21 |

TABLE 7

|  |  | No. of pitches | No. of types | Pitch ratio (dimensionless) | Chaotic function | | Absolute value of $\epsilon$ | Pitch sequence | |
|---|---|---|---|---|---|---|---|---|---|
|  |  |  |  |  | Type | Z |  | | |
| Embodiment 11 | Face side of center line | 63 | 3 | P1 0.810 P2 1.013 P3 1.215 | Formula 3, 4, 5 3 Pitch Case 1 | Z1 1.1 Z2 3.0 | $\epsilon$ 1 0.15 | P3 ooo ooo o oo oo o oooo o o o<br>oo ooo o ooo o oo o o oo oooo o o<br>P1 oooooo ooooo o ooooo o ooo o o | |
| | Back side of center line | 63 | 3 | P1 0.792 P2 0.991 P3 1.189 | 3, 4, 5 3 Case 1 | Z1 1.1 Z2 3.0 | $\epsilon$ 1 0.15 | P3 o o o ooo o oooo oooo oo ooo o o<br>o oo oo o oo oo o o oo oo oo o oooo<br>P1 o o oo o oooo o o o oo o oooo | |

|  |  |  | Check item | | | | | |
|---|---|---|---|---|---|---|---|---|
|  |  |  | Vr | Ru max | PSD max | SQmax Np | Functional evaluation of pitch sound | Order number of analysis result RFV |
| Embodiment 11 | Face side of center line | | Order 3 1.13 Order 4 1.46 Order 5 1.18 Order 6 0.88 Order 7 1.33 Order 8 0.95 | 0.26 | 7.26 | 0.10 | 4.0 | Order 3 0.81 Order 4 0.73 Order 5 0.48 Order 6 0.33 Order 7 0.42 Order 8 0.36 |
| | Back side of center line | | Order 3 1.16 Order 4 0.77 Order 5 0.81 Order 6 0.50 Order 7 0.65 Order 8 1.57 | 0.24 | 7.49 | 0.08 | | |

TABLE 8

| | | No. of pitches | No. of types | Pitch ratio (dimensionless) | Chaotic function Type | Z | Absolute value of $\epsilon$ | Pitch sequence | |
|---|---|---|---|---|---|---|---|---|---|
| Embodiment 12 | Shoulder rib | 60 | 3 | P1 0.808 P2 1.010 P3 1.212 | Formula 3, 4, 5 3 Pitch Case 1 | Z1 1.1 Z2 3.0 | $\epsilon$ 1 0.15 | P3 P1 | (pitch sequence pattern) |
| | Middle rib | 72 | 3 | P1 0.793 P2 0.992 P3 1.190 | Formula 3, 4, 5 3 Pitch Case 1 | Z1 1.1 Z2 3.0 | $\epsilon$ 1 0.15 | P3 P1 | (pitch sequence pattern) |

| | | Check item | | | | Functional evaluation of pitch sound | Order number of analysis result RFV |
|---|---|---|---|---|---|---|---|
| | | Vr | Ru max | PSD u max | SQmax Np | | |
| Embodiment 12 | Shoulder rib | Order 3 0.45 Order 4 1.42 Order 5 0.65 Order 6 0.83 Order 7 0.59 Order 8 0.71 | 0.12 | 7.92 | 0.08 | 4.0 | Order 3 0.76 Order 4 0.63 Order 5 0.21 Order 6 0.34 Order 7 0.41 Order 8 0.39 |
| | Middle rib | Order 3 1.50 Order 4 0.71 Order 5 0.86 Order 6 0.68 Order 7 0.57 Order 8 0.93 | 0.26 | 6.37 | 0.07 | | |

TABLE 9

| | No. of pitches | No. of types | Pitch ratio (dimensionless) | Chaotic function Type | Z | Absolute value of $\epsilon$ | Pitch sequence | |
|---|---|---|---|---|---|---|---|---|
| Embodiment 1 | 72 | 3 | P1 0.809 P2 1.011 P3 1.213 | Formula 16, 18, 17 | Z1 1.1 | $\epsilon$ 1 0.10 | P3 P1 | (pitch sequence pattern) |
| Embodiment 2 | 100 | 5 | P1 0.751 P2 0.876 P3 1.001 P4 1.126 P5 | Formula 16, 18, 17 | Z1 1.15 | $\epsilon$ 1 0.20 $\epsilon$ 2 0.20 | P5 P1 | (pitch sequence pattern) |

TABLE 9-continued 1.252

|  | | Check item | | | | Functional evaluation of pitch sound | Order number of analysis result RFV |
|---|---|---|---|---|---|---|---|
|  | | Vr | Ru max | PSD u max | SQmax Np | | |
| | Embodiment 1 | Order 3 0.61 | 0.330 | 7.59 | 0.07 | 4.0 | Order 3 0.49 |
| | | Order 4 0.71 | | | | | Order 4 0.53 |
| | | Order 5 0.68 | | | | | Order 5 0.38 |
| | | Order 6 0.81 | | | | | Order 6 0.62 |
| | | Order 7 0.64 | | | | | Order 7 0.31 |
| | | Order 8 0.32 | | | | | Order 8 0.17 |
| | Embodiment 2 | Order 3 1.51 | 0.35 | 5.76 | 0.04 | 4.0 | Order 3 0.73 |
| | | Order 4 1.58 | | | | | Order 4 0.67 |
| | | Order 5 0.95 | | | | | Order 5 0.41 |
| | | Order 6 0.69 | | | | | Order 6 0.37 |
| | | Order 7 1.62 | | | | | Order 7 0.54 |
| | | Order 8 0.68 | | | | | Order 8 0.29 |

TABLE 10

| | No. of pitches | No. of types | Pitch ratio (dimen-sionless) | Chaotic function Type | Z | Absolute value of $\epsilon$ | | Pitch sequence |
|---|---|---|---|---|---|---|---|---|
| Embodiment 3 | 63 | 3 | P1 0.810 P2 1.013 P3 1.215 | Formula 13, 14, 15 | Z1 1.2 Z2 2.0 | $\epsilon$ 1 0.15 | P3 P1 | oooo  o    ooo    o oooo    o  ooo  oo<br>  o  o o    o o o  oo  o  oo    o oo   o    o o o   o o o<br>oo ooo  o      o    oo  oo      oooo        oooooo     o    o |
| Embodiment 4 | 80 | 4 | P1 0.798 P2 0.938 P3 1.079 P4 1.220 | Formula 13, 14, 15 | Z1 1.1 Z2 3.0 | $\epsilon$ 1 0.15 | P4 P1 | oo     ooooo         o o    o       oooo      o       oo           o<br>    oo   o   o   oo    o o oo o o      o    o  oo o     o o         o<br>       o o        oo  o  o        o    o oo oo     o o    o   o oo      o o<br>           oo         oo   ooo         oo        o     ooo    o oooooo  o |
| Embodiment 5 | 100 | 5 | P1 0.751 P2 0.876 P3 1.001 P4 1.126 P5 1.252 | Formula 13, 14 15 | Z1 1.1 Z2 3.0 Z3 3.0 | $\epsilon$ 1 0.15 $\epsilon$ 2 0.15 | P5 P1 | ooo       oo o      o   oooooo         ooo           ooo<br>     o  o       o  o o       o o o   oo    oo    oo  oo       o    o oo<br>  o    oooo  oo     ooo    o  o         o  o  o    o       oo        o    o   oo<br>       o o            o  o                 oo    o  oo          oo        o o o o<br>   o           ooo                                oo      oooooo   ooo        o o oo o |

|  | | Check item | | | | Functional evaluation of pitch sound | Order number of analysis result RFV |
|---|---|---|---|---|---|---|---|
|  | | Vr | Ru max | PSD u max | SQmax Np | | |
| | Embodiment 3 | Order 3 1.13 | 0.33 | 8.20 | 0.095 | 4.0 | Order 3 0.75 |
| | | Order 4 1.69 | | | | | Order 4 0.73 |
| | | Order 5 1.34 | | | | | Order 5 0.66 |

TABLE 10-continued

| | | | | Check item | | | | Functional | Order number of |
| --- | --- | --- | --- | --- | --- | --- | --- | --- | --- |
| | | | Vr | Ru max | PSD u max | SQmax Np | | evaluation of pitch sound | analysis result RFV |
| | | | | Order 6 0.68 | | | | | Order 6 0.18 |
| | | | | Order 7 0.67 | | | | | Order 7 0.32 |
| | | | | Order 8 0.83 | | | | | Order 8 0.36 |
| | Embodiment 4 | | Order 3 0.78 | 0.32 | 7.26 | 0.075 | | 4.0 | Order 3 0.63 |
| | | | Order 4 0.51 | | | | | | Order 4 0.33 |
| | | | Order 5 0.81 | | | | | | Order 5 0.82 |
| | | | Order 6 0.80 | | | | | | Order 6 0.46 |
| | | | Order 7 1.25 | | | | | | Order 7 0.52 |
| | | | Order 8 0.18 | | | | | | Order 8 0.21 |
| | Embodiment 5 | | Order 3 0.19 | 0.37 | 5.86 | 0.06 | | 4.0 | Order 3 0.56 |
| | | | Order 4 1.55 | | | | | | Order 4 0.20 |
| | | | Order 5 1.68 | | | | | | Order 5 0.86 |
| | | | Order 6 0.30 | | | | | | Order 6 0.83 |
| | | | Order 7 1.07 | | | | | | Order 7 0.72 |
| | | | Order 8 0.31 | | | | | | Order 8 0.30 |

TABLE 11

| | | No. of pitches | No. of types | Pitch ratio (dimen- sionless) | Chaotic function | | | Pitch sequence | |
| --- | --- | --- | --- | --- | --- | --- | --- | --- | --- |
| | | | | | Type | Z | Absolute value of $\epsilon$ | | |
| Embodi- ment 6 | Face side of center line | 72 | 3 | P1 0.798 P2 0.997 P3 1.197 | Formula 19, 20, 21 | Z1 1.1 Z2 4.0 | | P3   ○    ○○○○    ○○  ○  ○○○○ ○○○   ○   ○○  ○○  ○○ ○○<br>   ○   ○○○○   ○   ○○○ ○○○○    ○   ○○○○ ○○ ○○  ○○  ○<br>P1  ○○ ○○○○   ○○      ○○○ ○ ○    ○ ○          ○ ○  ○○   ○   ○       ○○ | |
| | Back side of center line | 72 | 3 | P1 0.809 P2 1.011 P3 1.213 | Formula 16, 17, 18 | Z1 1.1 | $\epsilon$ 1 0.1 | P3  ○ ○   ○○○    ○   ○○○○    ○○  ○○○○○  ○ ○○       ○         ○<br>   ○○○  ○  ○    ○○  ○ ○○○ ○   ○○  ○ ○   ○  ○ ○○ ○○○○<br>P1  ○   ○○○    ○○○○○ ○○      ○ ○○    ○         ○    ○○○○ ○○   ○○ ○   ○ | |

| | | | Check item | | | | Functional | Order number of |
| --- | --- | --- | --- | --- | --- | --- | --- | --- |
| | | | Vr | Ru max | PSD u max | SQmax Np | evaluation of pitch sound | analysis result RFV |
| | Embodi- ment 6 | Face side of center line | Order 3 1.38 | 0.234 | 17.71 | 0.06 | 4.0 | Order 3 0.73 |
| | | | Order 4 0.46 | | | | | Order 4 0.56 |
| | | | Order 5 0.89 | | | | | Order 5 0.42 |
| | | | Order 6 0.68 | | | | | Order 6 0.39 |
| | | | Order 7 1.02 | | | | | Order 7 0.58 |
| | | | Order 8 0.64 | | | | | Order 8 0.23 |
| | | Back side of center line | Order 3 0.61 | 0.330 | 7.59 | 0.07 | | |
| | | | Order 4 0.71 | | | | | |
| | | | Order 5 | | | | | |

TABLE 11-continued 0.68
Order 6
0.81
Order 7
0.64
Order 8
0.32

TABLE 12

| | | No. of pitches | No. of types | Pitch ratio (dimensionless) | Chaotic function | | Absolute value of $\epsilon$ | Pitch sequence | |
|---|---|---|---|---|---|---|---|---|---|
| | | | | | Type | Z | | | |
| Embodiment 7 | Shoulder rib | 60 | 3 | P1 0.789 P2 0.987 P3 1.184 | Formula 20, 19, 21 | Z1 1.1 Z2 4.0 | | P3 P1 | o oo o o o ooooo o ooo o oo oo o<br>o oo ooo oo oooo ooo oooo o oo<br>oo ooo o ooo oo oo o o o o |
| | Middle rib | 72 | 3 | P1 0.798 P2 0.997 P3 1.197 | Formula 20, 19, 21 | Z1 1.1 Z2 4.0 | | P3 P1 | o oooo oo o oooo ooo o oo oo oo oo<br>o oooo o ooo oooo o oooo oo oo oo o<br>oo oooo oo ooo oo o o oo oo o o oo |

| | | Check item | | | | Functional evaluation of pitch sound | Order number of analysis result RFV |
|---|---|---|---|---|---|---|---|
| | | Vr | Ru max | PSD u max | SQmax Np | | |
| Embodiment 7 | Shoulder rib | Order 3 1.14 Order 4 0.74 Order 5 1.26 Order 6 0.36 Order 7 0.60 Order 8 0.13 | 0.205 | 11.34 | 0.08 | 4.0 | Order 3 0.82 Order 4 0.66 Order 5 0.69 Order 6 0.28 Order 7 0.44 Order 8 0.16 |
| | Middle rib | Order 3 1.38 Order 4 0.46 Order 5 0.89 Order 6 0.68 Order 7 1.02 Order 8 0.64 | 0.234 | 17.71 | 0.06 | | |

55

TABLE 13

| | No. of pitch | Pitch ratio | Chaos function parameter | | Pitch sequence |
|---|---|---|---|---|---|
| Embodiment 1 | 50 | 1.295 | Z1 = 1.15 Z2 = 5.0 | P2 P1 | oooo\ooooooo/ooooo\oooo/oo\oo/ooo/oo\oooo/ooo\oo/o\oooo/oo |
| Embodiment 2 | 58 | 1.291 | Z1 = 1.10 | P2 | oooooo\ooooo/ooo\oooo/oo/oo\oo/oooo\oooo/oo\oooo/oo\ooo/oo\ooo/oo/o\ooo |

TABLE 13-continued

| | | | | | Pitch sequence |
|---|---|---|---|---|---|
| Embodiment 3 | 60 | 1.111 | Z2 = 6.0<br>Z1 = 1.15<br>Z2 = 8.0 | P1<br>P2<br>P1 | ooooo/ᵒᵒᵒ\oo/ᵒᵒᵒᵒᵒᵒᵒ\oo/ᵒᵒ\o/ᵒᵒᵒ\oooo/ᵒᵒᵒᵒᵒᵒ\ooooo/ᵒᵒᵒ\o/ᵒ\oooooo/ᵒᵒ\o/\o/ᵒᵒᵒ\o |
| Embodiment 4 | 72 | 1.111 | Z1 = 1.10<br>Z2 = 10.0 | P2<br>P1 | oo/ᵒᵒᵒᵒᵒ\ooo/ᵒ\oo/ᵒᵒ\ooooo/\ooo/\oooo/oo/ᵒᵒᵒᵒᵒ/ᵒᵒᵒ\ooo/ᵒᵒᵒᵒ/ᵒᵒᵒᵒᵒᵒ/ᵒᵒ\oooo |

| | max value of Vr of order 3 to 8 | Ru max | PSDr max (Fe) | SQ max/Np | Rsp/Np | Functional evaluation of pitch sound |
|---|---|---|---|---|---|---|
| Embodiment 1 | 1.28 | 0.199 | 8.4 (20.1) | 0.12 | 0.06 | 4 |
| Embodiment 2 | 1.01 | 0.171 | 8.6 (18.2) | 0.10 | 0.05 | 4 |
| Embodiment 3 | 0.41 | 0.199 | 41.9 (44.9) | 0.10 | 0.07 | 2+ |
| Embodiment 4 | 0.36 | 0.166 | 37.8 (38.3) | 0.08 | 0.07 | 2+ |

TABLE 14

| | No. of pitch | Pitch ratio | Chaos function parameter | | Pitch sequence |
|---|---|---|---|---|---|
| Comparison example 1-1 | 66 | 1.295 | — | P2<br>P1 | ᵒ\oooo/ᵒᵒᵒ\oo/ᵒᵒᵒᵒ\ooo/\o/oo/ᵒ\oo/ᵒ\ooo/ᵒᵒ\oooooo/\oo/ᵒᵒᵒᵒ/ᵒᵒ\ooo/ᵒᵒᵒ/ᵒ\/ᵒᵒᵒᵒ |
| Comparison example 1-2 | 69 | 1.295 | — | P2<br>P1 | ooooo\ooooo/\o/ᵒᵒᵒᵒ\oo/ᵒᵒ\oo/ᵒᵒᵒ\ooo/ᵒᵒ/ᵒ\oo/ᵒᵒᵒᵒ\ooo/\oo/ᵒᵒᵒ\oooo |
| Comparison example 2-1 | 50 | 1.295 | — | P2<br>P1 | o/\oᵒᵒᵒ\ooo/ᵒᵒᵒᵒᵒ/ᵒᵒ\oo/\oooooo/ᵒᵒ/\oo/ᵒᵒᵒᵒᵒ/ᵒᵒᵒ\oo/\oooo |
| Comparison example 2-2 | 60 | 1.295 | — | P2<br>P1 | ooooo/ᵒᵒᵒᵒᵒᵒ\o/\o/\o/ᵒᵒ\oo/ᵒᵒᵒ/oo/\o/\o/\ooo/\oo/ᵒᵒᵒᵒ/ᵒᵒ\oo/\o/\ooo/ᵒᵒ\oo |

| | max value of Vr of order 3 to 8 | Ru max | PSDr max (Fe) | SQ max/Np | Rsp/Np | Functional evaluation of pitch sound |
|---|---|---|---|---|---|---|
| Comparison example 1-1 | 1.05 | 0.212 | 14.7 (16.4) | 0.08 | <u>0.18</u> | 3+ |
| Comparison example 1-2 | 0.89 | 0.246 | 13.4 (15.9) | 0.07 | <u>0.19</u> | 3 |
| Comparison example 2-1 | 1.30 | 1.0 | <u>28.2</u> (20.1) | 0.10 | 0.16 | 3– |
| Comparison example 2-2 | 1.06 | 0.199 | 14.4 (17.5) | 0.12 | <u>0.25</u> | 3 |

Comparison examples are different at under lines.

TABLE (formulae)

Formula 1   $[0 \leq Xn < 0.5]$ $X(n+1) = X(n) + U(X(n))^Z$ $[0.5 \leq Xn \leq 1.0]$ $X(n+1) = a \cdot Xn + b$ $a, b, U$ : Constant

TABLE-continued (formulae)

Formula 2   $[0 \leq Xn \leq 0.5]$ $X(n+1) = Xn + 2^{Z-1} \cdot (1-2\varepsilon) \cdot Xn^Z + \varepsilon$ $[0.5 < Xn \leq 1]$ $X(n+1) = Xn - 2^{Z-1} \cdot (1-2\varepsilon) \cdot (1-Xn)^Z - \varepsilon$ $\varepsilon$ : Constant Formula 3   $X(n+1) = Xn + \dfrac{K(1+j) - K1}{(K1 - K0)^{Z1}} \cdot (Xn - K0)^{Z1}$ Formula 4   $X(n+1) = Xn - \dfrac{K(s-1) - K(s-1-j)}{(Ks - K(s-1))^{Z1}} \times (Ks - Xn)^{Z1}$ TABLE-continued (formulae)

Formula 5: $X(n+1) = Xn + a \cdot SGN(Xt) \times (SGN(Xt) \cdot Xt)^{Zg} + C$

Formula 6: $Xn+1 = Xn + \dfrac{K(1+j) - K1}{(K1-K0)} \cdot (Xn - K0)^{Z1}$

Formula 7: $X(n+1) = Xn - \dfrac{K(s-1) - K(s-1-j)}{(Ks - K(s-1))^{Z1}} \times (Ks - Xn)^{Z1}$ Formula 8: $X(n+1) = Xn + a \cdot \tan\left(b \cdot \left(Xn - \dfrac{Ki + K(i+1)}{2} - \varepsilon g\right)\right) + C$ Formula 9: $X(n+1) = Xn + \dfrac{K(1+j) - K1}{(K1-K0)^{Z1}} \times (Xn - K0)^{Z1}$ Formula 10: $X(n+1) = Xn - \dfrac{K(s-1) - K(s-1-j)}{(Ks - K(s-1))^{Z1}} \times (Ks - Xn)^{Z1}$ Formula 11: $X(n+1) = \dfrac{K(o+1) - Ko}{K(i+1) - Ki} \cdot (Xn - Ki) + Ko + \dfrac{Kp - K(o+1)}{(K(i+1) - Ki)^{Zg}} \cdot (Xn - Ki)^{Zg}$ Formula 12: $X(n+1) = \dfrac{Kp - K(p-1)}{K(i+1) - Ki} \cdot (Xn - Ki) + K(p-1) - \dfrac{K(p-1) - Ko}{(K(i+1) - Ki)^{zg}} \cdot (K(i+1) - Xn)^{Zg}$ Formula 13: $X(n+1) = Xn + \dfrac{K2 - K1}{(K1 - K0)^{Z1}} \cdot (Xn - K0)^{Z1}$ Formula 14: $X(n+1) = Xn - \dfrac{K(s-1) - K(s-2)}{(Ks - K(s-1))^{Z1}} \times (Ks - Xn)^{Z1}$ Formula 15: $X(n+1) = Xn + a \cdot SGN(Xt) \times (SGN(Xt) \cdot Xt)^{Zg} + C$ Formula 16: $X(n+1) = Xn + \dfrac{K2 - K1}{(K1 - K0)^{Z1}} \cdot (Xn - K0)^{z1}$ Formula 17: $X(n+1) = Xn - \dfrac{K(s-1) - K(s-2)}{(Ks - K(s-1))^{Z1}} \times (Ks - Xn)^{Z1}$ Formula 18: $X(n+1) = Xn + a \cdot \tan\left(b \cdot \left(Xn - \dfrac{Ki + K(i+1)}{2} - \varepsilon g\right)\right) + C$ Formula 19: $X(n+1) = Xn + \dfrac{K2 - K1}{(K1 - K0)^{Z1}} \times (Xn - K0)^{Z1}$ Formula 20: $X(n+1) = Xn - \dfrac{K(s-1) - K(s-2)}{(Ks - K(s-1))^{Z1}} \times (Ks - Xn)^{Z1}$ Formula 21: $X(n+1) = \dfrac{Ki - K(i-1)}{K(i+1) - Ki} \cdot (Xn - Ki) + K(i-1) + \dfrac{K(i+2) - Ki}{(K(i+1) - Ki)^{zg}} \cdot (Xn - Ki)^{zg}$ Formula 22: $X(n+1) = \dfrac{K(i+2) - K(i+1)}{K(i+1) - Ki} \cdot (Xn - Ki) + K(i+1) - \dfrac{K(i+1) - K(i-1)}{(K(i+1) - Ki)^{Zg}} \cdot (K(i+1) - Xn)^{Zg}$ Formula 23: $X(n+1) = Xn + Xn^{z1}$ Formula 24: $X(n+1) = Xn + Xn^{Z2}$ Formula 25: $X(n+1) = Xn - (2 - Xn)^{z1}$ Formula 26: $X(n+1) = Xn - (2 - Xn)^{Z2}$ Formula 27: $Vr = 10 \cdot \sqrt{(ar^2 + br^2)}/r (r = 1 \sim 8)$ Formula 28: $ar = \sum_{j=1}^{Np} dj \cdot \sin(2\pi r \cdot Xj/CL)$ Formula 29: $br = \sum_{j=1}^{Np} dj \cdot \cos(2\pi r \cdot Xj/CL)$ Formula 30: $Ru = \dfrac{\sum_{j=1}^{Np} PQ(j) \times PQ(j+u)] - A}{\sum_{j=1}^{Np} (PQ(j))^2 - A}$ Formula 31: $A = \dfrac{\left(\sum_{j=1}^{Np} PQ(j)\right)^2}{Np}$ Formula 32: $PSDr\max = Fe(Rn, Ps/P1) = 100 \times (Ar^2 + Br^2)/Np^2$ Formula 33: $Ar = \sum_{j=1}^{Np} \sin(2\pi r \cdot Xj/CL)$ Formula 34: $Br = \sum_{j=1}^{Np} \cos(2\pi r \cdot Xj/CL)$

We claim:

1. A pneumatic tire having a tire tread including a pattern formed by a verified sequence of pattern composing units of different pitch P of number S, each pitch being a circumferential length, wherein lateral and longitudinal sectioning lines are provided in a coordinate plane for forming plural rectangular regions by dividing axes of abscissa and ordinate perpendicularly thereto in a positive direction from an origin of the coordinate plane into s sections, respectively, in a rectangular system of coordinates;

the pattern composing units are allocated in the order of lower pitches to larger pitches from the origin to the sections of the axes of abscissa and ordinate;

defined regions of a chaotic function fc represented by X(n+1)=fc(Xn) are defined for the sections of the axis of abscissa, where Xn is the abscissa and X(n+1) is the ordinate; and the pattern composing units are arranged in order of a sequence of functional values of X(n+1) sequentially obtained using chaotic functions that are defined for the sections of the axis of abscissa in the defined regions, and satisfy requirements (1) and (2), and said verified sequence satisfies verifications (3) to (7) below, and the number S is two:

(1) a chaotic function fc is a derivative f'c>1 in all sections of the axis of abscissa;
(2) at a starting point (Xc) of lower side and a terminal point (Xe) of higher side of sections with lowest and highest pitches defined, $fc(Xe) > fc(Xc)$ in the section of the lowest pitch;

and $fc(Xc) > fc(Xe)$ in the section of the highest pitch;

(3) an irregularity index Vr is less than 2, index Vr being defined as follows:

$$Vr = 10 \cdot \sqrt{(ar^2 + br^2)} / r (r = 1-8),$$

with $$ar = \sum_{j=1}^{Np} dj \cdot \sin(2\pi r \cdot Xj/CL),$$

and $$br = \sum_{j=1}^{Np} dj \cdot \cos(2\pi r \cdot Xj/CL),$$

and where
dj=Pj/mean pitch,
Pj is a pitch of jth pattern composing unit in a sequence of pattern forming units,
mean pitch is an entire circumferential length CL of tire/total number Np of pitches of a sequence of pattern composing units, and
Xj is the position of a jth pitch;
(4) an autocorrelation coefficient Ru is lower than 0.5 at u>5, Ru being defined as follows:

$$Ru = \frac{\left(\sum_{j=1}^{Np} PQ(j) \times PQ(j+u)\right) - A}{\sum_{j=1}^{Np} (PQ(j))^2 - A},$$

and where the variable u represents an amount of offset of PQ(j) from j wherein PQ(j) is an integer corresponding to a pitch of a pattern composing unit in the sequence;

$$A = \frac{\left(\sum_{j=1}^{Np} PQ(j)\right)^2}{Np},$$

(5) a maximum variance coefficient PSDrmax satisfies the following formula $$PSDrmax \leq \{100/(Ps/P1)^{10}\} \times (1/Rn) + 5 \times \{(1/Rn) + 1\}$$

where P1 is a shortest pitch, Ps is a longest pitch, Rn is Np/60, and Np is total number of pattern composing units in pattern composing unit row;
(6) the ratio SQmax/Np between the number SQmax of pattern composing units of an identical pitch sequentially disposed and the total number of pattern composing units in the sequence of pattern composing units of tire is 0.15 or less, the sequence has different pitches P1 and P2, a pitch ratio P2/P1 is 1.05 to 1.50, and each of said defined regions of two sections of the axis of abscissa is sums of two regions aligned in the longitudinal direction; and
(7) the ratio Rsp/Np between the total number Rsp of individual pattern composing units without continuing of the pattern composing units of an identical pitch and the total number of pattern composing units in the sequence of pattern composing units of the tire is 0.1 or less.

2. The pneumatic tire according to claim 1, wherein two chaotic functions, a left chaotic function Fcu passing in a side closer to the origin and a right chaotic function Fcd are set for each two sections of the axis of the abscissa.

3. The pneumatic tire according to claim 2, wherein in the section of pitch P1 of the axis of abscissa, a next functional value X(n+2) is provided by the left chaotic function Fcu, when a preceding defined functional value X(n+1) is provided in the section of pitch P1 of the axis of abscissa, or is at an initial value, and a next functional value X(n+2) is provided by the right chaotic function Fcd, when the a preceding defined functional value X(n+1) is provided in the section of pitch P2 of the axis of abscissa;

in the section of pitch P2 of the axis of abscissa, a next functional value X(n+2) is provided by the right chaotic function Fcd, when a preceding defined functional value X(n+1) is provided in the section of pitch P2 of the axis of abscissa, and a next functional value X(n+2) is provided by the left chaotic function Fcu, when the preceding defined functional value X(n+1) is provided in the section of pitch P1 of the axis of abscissa.

4. A pneumatic tire having a tire tread including a pattern formed by a verified sequence of pattern composing units of different pitch P of number S, each pitch being a circumferential length, wherein lateral and longitudinal sectioning lines are provided in a coordinate plane for forming plural rectangular regions by dividing axes of abscissa and ordinate perpendicularly thereto in a positive direction from an origin of the coordinate plane into s sections, respectively, in a rectangular system of coordinates;

the pattern composing units are allocated in the order of lower pitches to larger pitches from the origin to the sections of the axes of abscissa and ordinate;

defined regions of a chaotic function fc represented by X(n+1)=fc(Xn) are defined for the sections of the axis of abscissa, where Xn is the abscissa and X(n+1) is the ordinate; and the pattern composing units are arranged in order of a sequence of functional values of X(n+1) sequentially obtained using chaotic functions that are defined for the sections of the axis of abscissa in the defined regions, and satisfy requirements (1) and (2), said verified sequence satisfies verifications (3) to (6) below and the number S is three or more:
(1) a chaotic function fc is a derivative $f'c \geq 1$ in all sections of the axis of abscissa;
(2) at a starting point (Xc) of lower side and a terminal point (Xe) of higher side of sections with lowest and highest pitches defined, $fc(Xe) > fc(Xc)$ in the section of the lowest pitch;

and f'c(Xc)>f'c(Xe) in the section of the highest pitch;

(3) an irregularity index Vr is less than 2, index Vr being defined as follows:

$$Vr = 10 \cdot \sqrt{(ar^2 + br^2)} \Big/ r (r = 1\text{–}8),$$

with $$ar = \sum_{j=1}^{Np} dj \cdot \sin(2\pi r \cdot Xj/CL),$$

and $$br = \sum_{j=1}^{Np} dj \cdot \cos(2\pi r \cdot Xj/CL),$$

and where
dj=Pj/mean pitch,
Pj is a pitch of jth pattern composing unit in a sequence of pattern forming units,
mean pitch is an entire circumferential length CL of tire/total number Np of pitches of a sequence of pattern composing units, and
Xj is the position of a jth pitch;
(4) an autocorrelation coefficient Ru is lower than 0.5 at u>5, Ru being defined as follows:

$$Ru = \frac{\left(\sum_{j=1}^{Np} PQ(j) \times PQ(j+u)\right) - A}{\sum_{j=1}^{Np} (PQ(j))^2 - A},$$

and where the variable u represents an amount of offset of PQ(j) from j wherein PQ(j) is an integer corresponding to a pitch of a pattern composing unit in the sequence;

$$A = \frac{\left(\sum_{j=1}^{Np} PQ(j)\right)^2}{Np},$$

and
(5) a maximum variance coefficient PSDrmax satisfies the following formula

PSDrmax ≦ {100/(Ps/P1)^10}×(1/Rn)+5×{(1/Rn)+1} where P1 is a shortest pitch, Ps is a longest pitch, Rn is Np/60, and Np is total number of pattern composing units in pattern composing unit row;
(6) the ratio SQmax/Np between the number SQmax of pattern composing units of an identical pitch sequentially disposed and the total number of pattern composing units in the sequence of pattern composing units of tire is 0.15 or less; and
each defined region is a sum of regions at 1.5 or less in the ratio of higher to lower pitches allocated to a region aligning longitudinally in each said section of the axis of abscissa, and includes the pattern composing units arranged by skipping over a pitch or more adjacently disposed in the order of length.

5. The pneumatic tire according to claim 4, wherein two chaotic functions, left and right chaotic functions Fcu and Fcd intersecting a lateral virtual line Ha that passes a longitudinally intermediate level height of the defined region in left and right sides, are set for each section except those with the lowest and highest pitches of the axis of abscissa;
   in the same section of the axis of abscissa, a next functional value X(n+2) is provided by the right or left chaotic function Fcu, Fcd that is identical to a preceding functional value X(n+1) in the section defined by the right or left chaotic function Fcu, Fcd;
   the next functional value X(n+2) is provided by the left chaotic function Fcu, when the preceding functional value X(n+1) is provided in a section in a side of a lower pitch of the axis of abscissa, or is at an initial value; and
   the next functional value X(n+2) is provided by the right chaotic function Fcd, when the preceding defined functional value X(n+1) is provided in a section in a side of a higher pitch.

6. The pneumatic tire according to claim 5, wherein the left chaotic function Fcu intersects a lateral virtual line Ha that passes a longitudinally intermediate height point of a defined range in a side closer to the origin than a middle point Xa in the direction of the axis of abscissa of the section and the right chaotic function Fcd intersects the line in the opposite side.

7. A pneumatic tire having a tire tread including a pattern formed by a verified sequence of pattern composing units of different pitch P of number S, each pitch being a circumferential length, wherein lateral and longitudinal sectioning lines are provided in a coordinate plane for forming plural rectangular regions by dividing axes of abscissa and ordinate perpendicularly thereto in a positive direction from an origin of the coordinate plane into s sections, respectively, in a rectangular system of coordinates;
   the pattern composing units are allocated in the order of lower pitches to larger pitches from the origin to the sections of the axes of abscissa and ordinate;
   defined regions of a chaotic function fc represented by X(n+1)=fc(Xn) are defined for the sections of the axis of abscissa, where Xn is the abscissa and X(n+1) is the ordinate; and
   the pattern composing units are arranged in order of a sequence of functional values of X(n+1) sequentially obtained using chaotic functions that are defined for the sections of the axis of abscissa in the defined regions, and satisfy requirements (1) and (2), and said verified sequence satisfies verifications (3) to (6) below, and the number s is three or more:
   (1) a chaotic function fc is a derivative f'c≧1 in all sections of the axis of abscissa;
   (2) at a starting point (Xc) of lower side and a terminal point (Xe) of higher side of sections with lowest and highest pitches defined, f'c(Xe)>f'c(Xc) in the section of the lowest pitch;

and f'c(Xc)>f'c(Xe) in the section of the highest pitch;

(3) an irregularity index Vr is less than 2, index Vr being defined as follows:

$$Vr = 10 \cdot \sqrt{(ar^2 + br^2)} \Big/ r(r = 1\text{--}8),$$

with $$ar = \sum_{j=1}^{Np} dj \cdot \sin(2\pi r \cdot Xj/CL),$$

and $$br = \sum_{j=1}^{Np} dj \cdot \cos(2\pi r \cdot Xj/CL),$$

and where dj=Pj/mean pitch,

Pj is a pitch of jth pattern composing unit in a sequence of pattern forming units, mean pitch is an entire circumferential length CL of tire/total number Np of pitches of a sequence of pattern composing units, and Xj is the position of a jth pitch;

(4) an autocorrelation coefficient Ru is lower than 0.5 at u>5, Ru being defined as follows:

$$Ru = \frac{\left(\sum_{j=1}^{Np} PQ(j) \times PQ(j+u)\right) - A}{\sum_{j=1}^{Np} (PQ(j))^2 - A},$$

and where the variable u represents an amount of offset of PQ(j) from j wherein PQ(j) is an integer corresponding to a pitch of a pattern composing unit in the sequence;

$$A = \frac{\left(\sum_{j=1}^{Np} PQ(j)\right)^2}{Np},$$

and (5) a maximum variance coefficient PSDrmax satisfies the following formula $$PSDrmax \leq \{100/(Ps/P1)^{10}\} \times (1/Rn) + 5 \times \{(1/Rn)+1\}$$

where P1 is a shortest pitch, Ps is a longest pitch, Rn is Np/60, and Np is total number of pattern composing units in pattern composing unit row;

(6) the ratio SQmax/Np between the number SQmax of pattern composing units of an identical pitch sequentially disposed and the total number of pattern composing units in the sequence of pattern composing units of tire is 0.15 or less; and each said defined region has a sequence of pattern composing units arranged without skipping over a pitch adjacently disposed in the order of length of the pitch by setting the defined region as defined in (a), (b) and (c) below for the sections of the axis of abscissa:

(a) in a section with the lowest pitch of the axis of abscissa, the defined region is a sum of regions with an identical pitch and those with pitches adjacently disposed thereto in the longitudinal direction in a higher side out of all regions aligned longitudinally in the lowest section of the axis of abscissa;

(b) in a section with the highest pitch of the axis of abscissa, the defined region is a sum of regions with an identical pitch and those with pitches adjacently disposed thereto in the longitudinal direction in a lower side out of all regions aligned longitudinally in the highest section of the axis of abscissa; and (c) in sections with an intermediate pitch of the axis of abscissa, the defined region is a sum of regions with an identical pitch and those with pitches adjacently disposed thereto in the longitudinal direction in higher and lower sides out of all regions aligned longitudinally in the sections of the axis of abscissa.

8. The pneumatic tire according to claim 7, wherein two chaotic functions, left and right chaotic functions Fcu and Fcd intersecting lateral virtual line Ha that passes a longitudinally intermediate level height of the defined region in left and right sides, are set for each section except those with the lowest and highest pitches of the axis of abscissa;

in the same section of the axis of abscissa, a next functional value X(n+2) is provided by the right or left chaotic functions Fcu, Fcd that is identical to a preceding functional value X(n+1) in the section defined by the right or left chaotic function Fcu, Fcd;

the next functional value X(n+2) is provided by the left chaotic function Fcu, when the first defined functional value X(n+1) is provided in a section in a side of a lower pitch of the axis of abscissa, or is at an initial value; and the next functional value X(n+2) is provided by the right chaotic function Fcd, when the first defined functional value X(n+1) is provided in a section in a side of a higher pitch.

9. The pneumatic tire according to claim 8, wherein the left chaotic function Fcu intersects the lateral virtual line Ha that passes a longitudinally intermediate level height of a defined region in a side closer to the origin than a middle point Xa in the direction of the axis of abscissa of the section and the right chaotic function Fcd intersects the lateral virtual line Ha in the opposite side.

\* \* \* \* \*